(12) United States Patent
Branch et al.

(10) Patent No.: US 10,795,560 B2
(45) Date of Patent: Oct. 6, 2020

(54) SYSTEM AND METHOD FOR DETECTION AND VISUALIZATION OF ANOMALOUS MEDIA EVENTS

(71) Applicant: Disney Enterprises, Inc., Burbank, CA (US)

(72) Inventors: Joel Branch, Burbank, CA (US);
Samuel J. Reisner, Burbank, CA (US);
James S. Williams, Burbank, CA (US);
Chenna Varri, Burbank, CA (US);
Tasneem Brutch, Burbank, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 359 days.

(21) Appl. No.: 15/281,914

(22) Filed: Sep. 30, 2016

(65) Prior Publication Data
US 2018/0095652 A1    Apr. 5, 2018

(51) Int. Cl.
*G06F 3/0484* (2013.01)
*H04L 12/58* (2006.01)
(Continued)

(52) U.S. Cl.
CPC ........... *G06F 3/04847* (2013.01); *G08B 5/36* (2013.01); *G08B 25/008* (2013.01); *H04L 51/14* (2013.01); *H04L 51/20* (2013.01); *H04L 51/32* (2013.01)

(58) Field of Classification Search
CPC .... G06F 21/552; G06F 21/554; G06F 21/566; G06F 11/0709; G06F 11/079;
(Continued)

(56) References Cited

U.S. PATENT DOCUMENTS 5,354,063 A * 10/1994 Curchod ............ A63B 24/0021
                                                         473/155
5,729,471 A *  3/1998 Jain ...................... H04N 13/139
                                                         725/131
(Continued)

FOREIGN PATENT DOCUMENTS

EP      2 487 636 A1     8/2012
WO    2016166764 A1    10/2016

OTHER PUBLICATIONS

Wang et al., Anomaly_Detection_Through_Enhanced_Sentiment_Analysis_On_Social_Media_Data, IEEE 2014 6th International Conference on Cloud Computing (Year: 2014).*
(Continued)

*Primary Examiner* — Renee D Chavez
*Assistant Examiner* — Carl P Lobo
(74) *Attorney, Agent, or Firm* — McCormick, Paulding & Huber PLLC

(57) ABSTRACT

Methods and systems for detection and visualization of anomalous media events are described, where AV media data of a sporting event (game) are analyzed to identify AV media segments indicative of unscripted anomalous events (AE's) that elicit a social media response (SMR), and selectable AE graphic visualization (or AE GUI) is provided showing the position of the AE on the court or field of play graphic, corresponding to the actual field of play, as a form of augmented reality. The graphic may also show the level of interest and the sentiment allocation (positive, negative, neutral) for each AE, a social media source allocation, details about the AE, social media posts, and other graphic display features related to the AE. Feedback may also be provided to adjust the logic that identifies AE. AE Alerts may also be sent to users autonomously or based on user-set parameters.

36 Claims, 27 Drawing Sheets

(51) Int. Cl.
*G08B 25/00* (2006.01)
*G08B 5/36* (2006.01)

(58) Field of Classification Search
CPC ...... G06F 19/00; G06F 9/542; G06F 11/0727; G06F 11/0793; G06F 17/30551; G06F 17/30598; G06F 17/5009; G06F 2201/815; G06F 2201/86; G06F 2221/2101; G06F 11/008; G06F 11/0772; G06F 11/3438; G06F 11/3452; G06F 11/3466; G06F 15/18; G06F 17/274; G06F 17/2785; G06F 17/30477; G06F 17/30554; G06F 17/30557; G06F 17/30675; G06F 17/30867; G06F 16/24578; G06F 16/7867; G06F 16/43; G06F 16/44; G06F 16/3334; G06F 16/48; G06F 16/78; G06F 16/248; G06F 3/04817; G06F 16/144; G06F 16/22; G06F 16/334; G06F 16/35; G06F 16/367; G06F 16/904; G06F 3/04847; G06F 3/0481; G06F 3/04842; G06F 3/017; G06F 3/0482; G06F 3/0485; G06F 9/451; G06F 2221/211; G06F 16/90335; G06F 3/0488; G06F 16/29; G06F 16/739; G06F 16/9577; G06F 16/245; G06F 16/24573; G06F 16/2477; G06F 16/26; G06F 16/40; G06F 16/447; G06F 16/487; G06F 16/489; G06F 16/532; G06F 16/743; G06F 16/9535; G06F 16/957; G06F 3/048; G06F 3/147; H04L 51/32; H04L 67/22; H04L 51/10; H04L 51/14; H04L 51/20; H04L 51/34; H04N 21/44222; H04N 21/4312; G06Q 50/01; G06Q 30/0269; G06Q 30/0261; G08B 5/36; G08B 25/008

See application file for complete search history.

(56) References Cited

U.S. PATENT DOCUMENTS

| | | | | |
|---|---|---|---|---|
| 5,860,862 A * | 1/1999 | Junkin | ............ | G06Q 10/107 463/1 |
| 5,993,314 A * | 11/1999 | Dannenberg | ............ | A63F 13/06 463/1 |
| 6,151,571 A | 11/2000 | Pertrushin | | |
| 6,707,487 B1 * | 3/2004 | Aman | ............ | A63B 24/0003 348/169 |
| 6,976,031 B1 | 12/2005 | Toupal et al. | | |
| 7,667,596 B2 * | 2/2010 | Ozdemir | ............ | G08B 13/196 340/539.22 |
| 7,865,887 B2 * | 1/2011 | Kaiser | ............ | G06F 9/542 709/224 |
| 7,899,611 B2 * | 3/2011 | Downs | ............ | G08G 1/0104 701/117 |
| 8,073,190 B2 * | 12/2011 | Gloudemans | ............ | G06T 15/20 345/419 |
| 8,224,766 B2 * | 7/2012 | Skibiski | ............ | G06Q 30/02 706/55 |
| 8,391,825 B2 * | 3/2013 | Arseneau | ............ | G06F 1/1626 455/3.01 |
| 8,516,374 B2 | 8/2013 | Fleischman et al. | | |
| 8,600,984 B2 * | 12/2013 | Fleischman | ............ | G06Q 50/01 707/725 |
| 8,702,504 B1 | 4/2014 | Hughes et al. | | |
| 8,775,431 B2 | 7/2014 | Jason | | |
| 8,943,534 B2 * | 1/2015 | Reisner | ............ | H04N 21/2668 725/32 |
| 9,077,744 B2 * | 7/2015 | Beutel | ............ | H04L 63/1416 |
| 9,094,615 B2 * | 7/2015 | Aman | ............ | H04N 5/262 |
| 9,160,692 B2 * | 10/2015 | Socolof | ............ | G06Q 10/02 |
| 9,266,017 B1 * | 2/2016 | Parker | ............ | A63F 13/65 |
| 9,363,441 B2 * | 6/2016 | Crookham | ............ | H04N 5/23245 |
| 9,378,240 B2 | 6/2016 | Jason | | |
| 9,390,501 B2 * | 7/2016 | Marty | ............ | A63B 24/0003 |
| 9,671,940 B1 * | 6/2017 | Malik | ............ | G06F 3/0481 |
| 9,674,435 B1 * | 6/2017 | Monari | ............ | H04N 13/243 |
| 9,778,830 B1 * | 10/2017 | Dubin | ............ | A63F 13/65 |
| 9,912,424 B2 * | 3/2018 | Sheppard | ............ | H04H 60/66 |
| 9,965,683 B2 * | 5/2018 | Verdejo | ............ | G06K 9/00577 |
| 10,133,818 B2 * | 11/2018 | Fleischman | ............ | G06Q 30/02 |
| 10,555,023 B1 * | 2/2020 | McCarthy | ............ | G11B 27/031 |
| 10,574,601 B2 * | 2/2020 | Shioya | ............ | H04L 51/16 |
| 2001/0048484 A1 * | 12/2001 | Tamir | ............ | H04N 5/272 348/589 |
| 2002/0194002 A1 | 12/2002 | Petrushin | | |
| 2005/0286774 A1 | 12/2005 | Porikli | | |
| 2006/0106743 A1 * | 5/2006 | Horvitz | ............ | G06N 99/005 706/21 |
| 2006/0277481 A1 * | 12/2006 | Forstall | ............ | G06F 16/957 715/764 |
| 2007/0118909 A1 * | 5/2007 | Hertzog | ............ | G06F 21/552 726/23 |
| 2007/0300157 A1 * | 12/2007 | Clausi | ............ | G06F 3/04883 715/719 |
| 2008/0244453 A1 * | 10/2008 | Cafer | ............ | G06F 3/04817 715/835 |
| 2009/0067719 A1 | 3/2009 | Sridhar et al. | | |
| 2009/0091583 A1 * | 4/2009 | McCoy | ............ | A63F 13/02 345/633 |
| 2009/0144122 A1 * | 6/2009 | Ginsberg | ............ | G06Q 10/04 705/7.31 |
| 2009/0164904 A1 * | 6/2009 | Horowitz | ............ | G06F 16/739 715/723 |
| 2009/0264190 A1 * | 10/2009 | Davis | ............ | G07F 17/32 463/26 |
| 2009/0271821 A1 * | 10/2009 | Zalewski | ............ | A63F 13/12 725/37 |
| 2009/0287694 A1 * | 11/2009 | McGowan | ............ | G06F 17/30604 |
| 2010/0030350 A1 * | 2/2010 | House | ............ | A63B 24/0021 700/91 |
| 2011/0013087 A1 * | 1/2011 | House | ............ | A63B 24/0021 348/564 |
| 2011/0154200 A1 * | 6/2011 | Davis | ............ | H04N 21/8133 715/716 |
| 2011/0225519 A1 * | 9/2011 | Goldman | ............ | G06F 3/0481 715/757 |
| 2011/0244954 A1 * | 10/2011 | Goldman | ............ | A63F 13/53 463/30 |
| 2012/0123854 A1 | 5/2012 | Anderson et al. | | |
| 2012/0151043 A1 * | 6/2012 | Venkataraman | ...... | H04L 43/045 709/224 |
| 2012/0166955 A1 * | 6/2012 | Bender | ............ | G06F 16/958 715/733 |
| 2012/0215903 A1 * | 8/2012 | Fleischman | ............ | G06Q 50/01 709/224 |
| 2012/0291059 A1 * | 11/2012 | Roberts | ............ | H04N 21/41407 725/25 |
| 2013/0086501 A1 * | 4/2013 | Chow | ............ | G06F 16/2477 715/772 |
| 2013/0095909 A1 * | 4/2013 | O'Dea | ............ | G07F 17/323 463/25 |
| 2013/0226758 A1 * | 8/2013 | Reitan | ............ | G06Q 40/00 705/35 |
| 2013/0238658 A1 * | 9/2013 | Burris | ............ | G06F 16/29 707/770 |
| 2013/0268620 A1 * | 10/2013 | Osminer | ............ | H04N 21/251 709/217 |
| 2013/0271602 A1 * | 10/2013 | Bentley | ............ | H04N 7/18 348/143 |
| 2014/0052785 A1 * | 2/2014 | Sirpal | ............ | G06F 3/017 709/204 |
| 2014/0081636 A1 * | 3/2014 | Erhart | ............ | G06Q 50/01 704/236 |
| 2014/0129559 A1 * | 5/2014 | Estes | ............ | G06F 16/245 707/737 |

(56) References Cited

U.S. PATENT DOCUMENTS

| | | | | |
|---|---|---|---|---|
| 2014/0143043 | A1* | 5/2014 | Wickramasuriya | H04N 21/41407 705/14.45 |
| 2014/0376876 | A1* | 12/2014 | Bentley | A63F 13/00 386/227 |
| 2015/0070506 | A1* | 3/2015 | Chattopadhyay | G09K 9/00718 348/159 |
| 2015/0131845 | A1* | 5/2015 | Forouhar | G06F 16/71 382/100 |
| 2015/0148129 | A1* | 5/2015 | Austerlade | H04L 43/04 463/31 |
| 2015/0237464 | A1* | 8/2015 | Shumaker | H04L 51/20 709/204 |
| 2015/0244969 | A1* | 8/2015 | Fisher | H04N 5/772 386/224 |
| 2015/0248817 | A1* | 9/2015 | Steir | A63F 13/12 463/7 |
| 2015/0248917 | A1* | 9/2015 | Chang | G11B 27/28 386/282 |
| 2015/0318945 | A1* | 11/2015 | Abdelmonem | H04L 5/006 370/329 |
| 2015/0348070 | A1* | 12/2015 | Boettcher | G06Q 30/0203 705/7.32 |
| 2015/0358680 | A1* | 12/2015 | Feldstein | H04N 21/478 725/43 |
| 2015/0375117 | A1* | 12/2015 | Thompson | A63F 13/35 463/9 |
| 2015/0382076 | A1* | 12/2015 | Davisson | H04H 20/04 725/62 |
| 2016/0034712 | A1* | 2/2016 | Patton | H04W 4/21 726/28 |
| 2016/0105733 | A1* | 4/2016 | Packard | H04N 21/8549 725/32 |
| 2016/0110083 | A1* | 4/2016 | Kranendonk | G06F 16/9577 715/753 |
| 2016/0132754 | A1* | 5/2016 | Akhbardeh | G06T 7/20 382/103 |
| 2016/0320951 | A1* | 11/2016 | Ernst | G06F 3/04842 |
| 2016/0342685 | A1* | 11/2016 | Basu | G06F 16/367 |
| 2016/0359993 | A1* | 12/2016 | Hendrickson | H04L 51/32 |
| 2017/0064240 | A1* | 3/2017 | Mangat | H04N 5/445 |
| 2017/0255696 | A1* | 9/2017 | Pulitzer | H04W 4/21 |
| 2017/0300755 | A1* | 10/2017 | Bose | G06K 9/00342 |
| 2018/0060439 | A1* | 3/2018 | Kula | H04L 51/32 |
| 2018/0082120 | A1* | 3/2018 | Verdejo | G06K 9/00577 |
| 2018/0082122 | A1* | 3/2018 | Verdejo | G06K 9/00771 |
| 2018/0189691 | A1* | 7/2018 | Oehrle | G06N 5/02 |
| 2018/0336575 | A1* | 11/2018 | Hwang | G06F 16/34 |
| 2019/0205652 | A1* | 7/2019 | Ray | G06K 9/00724 |
| 2019/0299057 | A1* | 10/2019 | Vollbrecht | G06T 7/246 |

OTHER PUBLICATIONS

"Bottari: Location based Social Media Analysis with Semantic Web," Celino, Irene (http://citeseerx.ist.psu.edu/viewdoc/download?doi=10.1.1.225.8097&rep1&type=pdf).

"Recursive Deep Models for Semantic Compositionality Over a Sentiment Treebank," Socher, Richard (http://nlp.stanford.edu/~socherr/EMNLP2013_RNTN.pdf).

"Detection of Abrupt Spectral Changes Using Support Vector Machines: An Application to Audio Signal Segmentation," Davy, Manuel (http://www.mee.tcd.ie/~moumir/articles/davy_1733.pdf).

"Automatic Recognition of Offensive Team Formation in American Football Plays," Atmosukarto, Indriyati (http://vision.ai.illinois.edu/publications/atmosukarto_cvsports13.pdf).

"Video Object Tracking Using Adaptive Kalman Filter," Weng, Shiuh-Ku (http://dl.acm.org/citation.cfm?id=1223208).

Real-Time Tracking of Game Assets in American Football for Automated Camera Selection and Motion Capture, Gandhi, Heer (http://www.sciencedirect.com/science/article/pii/S1877705810003036).

Sharghi, Aidean, et al. "Query-Focused Extractive Video Summarization," Center for Research in Computer Vision at UCF, 2016, pp. 1-18.

Kim, Gunhee, et al. "Joint Summarization of Large-Scale Collections of Web Images and Videos fro Storyline Reconstruction," 2014 IEEE Conference on Computer Vision and Pattern Recognition, pp. 4225-4232.

Gupta, Abhinav, et al. "Understanding Videos, Constructing Plots, Learning a Visually Grounded Storyline Model from Annotated Videos," 2009, pp. 1-8.

Raventos, A, et al. "Automatic Summarization of Soccer Highlights Using Audio-Visual Descriptors," 2015, pp. 1-19.

Tjondronegoro, Dian, et al. "Sports Video Summarization Using Highlights and Play-Breaks," 2003, pp. 1-8.

Chauhan, D, et al. "Automatic Summarization of Basketball Sport Video,"—2016 2nd International Conference on Next Generation Computing Technologies (NGCT-2016) Dehradun, India Oct. 14-16, 2016, pp. 670-673.

Nichols, Jeffrey, et al. "Summarzing Sporting Events Using Twitter," IBM Research, San Jose, CA, 2012, pp. 1-10.

Fan, Y.C., et al. "A Framework for Extracting Sports Video Highlights Using Social Media," Department of Computer Science, National Chung Hsing University, Taichung, Taiwan, Springer International Publishing Switzerland 2015, pp. 670-677.

Agresti, Alan; Categorical Data Analysis, Second Edition—2002, pp. 436-454, Canada.

SAS/STAT(R) 9.22 User's Guide—Overview: PHREG Procedure https://support.sas.com/documentation/cdl/en/statug/63347/HTML/default/viewer.htm#statug_phreg_sect001.htm.

Andersen, P.K., et al. "Cox's Regression Model for Counting Processes: A Large Sample Study," The Annals of Statistics, 1982, vol. 10, pp. 1100-1120.

Powell, Teresa M., et al. "Your 'Survival' Guide to Using Time-Dependent Covariates," SAS Global Forum 2012, pp. 168-177.

Wackersreuther, Bianca, et al. "Frequent Subgraph Discovery in Dynamic Networks", 2010, pp. 155-162, Washington DC.

Cook, et al. "Substructure Discovery Using Minimum Description Length and Background Knowledge," Journal of Artificial Intelligence Research (JAIR), 1 (1994) pp. 231-255.

Kazantseva, Anna, et al. Linear Text Segmentation Using Affinity Propagation, Proceedings of the 2011 Conference on Empirical Methods in Natural Language Processing, pp. 284-293, Edinburgh, Scotland, UK, Jul. 27-31, 2011. Association for Computational Linguistics.

Choi, Freddy, "Advances in Domain Independent Linear Text Segmentation," Artificial Intelligence Group, Department of Computer Science, University of Manchester, England, 2000, pp. 26-33.

Lamprier, S., et al, "SegGen: A Genetic Algorithm for Linear Text Segmentation," France, 2017, pp. 1647-1652.

Hearst, Marti, "TextTiling: Segmenting Text into Multi-Paragraph Subtopic Passages," 1997, Association for Computational Linguistics, pp. 33-64.

Beeferman, Doug, et al. "Statistical Models for Text Segmentation," School of Computer Science, PA, 1999, pp. 1-36.

Indriyat Atmosukarto, Automatic Recognition of Offensive Team Formation in American Football Plays (Year: 2013).

* cited by examiner

Fig. 4

AE Listing Table

| No. | Action/ Type | Var. Situation | Team/ Player | Date/ Time | Game Clock | AE Length | Factor (s) | Location/ Coord. | Video Clip Link | # SMRs |
|---|---|---|---|---|---|---|---|---|---|---|
| AE1 | Def. Stop | N/A | Players X,Y | 5/12/16 4:00 pm | 8:20 Q1 | 60 sec. | 5 | 1 yd line-O | Video1 | 1k |
| AE2 | TD | Last 30 Sec. | Team B | 5/12/16 4:55pm | 0:10 Q2 | 30 sec. | 3 | 22 yd line-O | Video2 | 8k |
| AE3 | Field Goal | Close Game | Team A | 5/12/16 5:20pm | 7:50 Q3 | 10 sec. | 1 | 32 yd line-O | Video3 | 3k |
| AE4 | Fumble | N/A | Team A | 5/12/16 5:50pm | 9:03 Q4 | 5 sec. | 5 | 2 yd line - D | Video4 | 15k |
| AE5 | Tough Catch | Close Game | Team B; Player K | 5/12/16 6:15pm | 1:10 Q4 | 3 sec. | 4 | 10 yd line – O | Video5 | 4k |
| ... | | | | | | | | | | |

Fig. 4A

Game Metadata

| Sport | Home Team | Away Team | Gm Start Date/Time | Gm End Date/Time | Game Location | Fixed Game Situation | Score | Offense Team | Game Clock |
|---|---|---|---|---|---|---|---|---|---|
| Football | Team A | Team C | 2/12/16 4:00 pm | 2/12/16 8:00 pm | Stadium A, City A, State A | Play-off | 14-7 Team A | Team A | 8:22 Q3 |

450 — 452 Sport, 454 Home Team, 456 Away Team, 458 Gm Start Date/Time, 460 Gm End Date/Time, 462 Game Location, 464 Fixed Game Situation, 466 Score, 468 Offense Team, 470 Game Clock

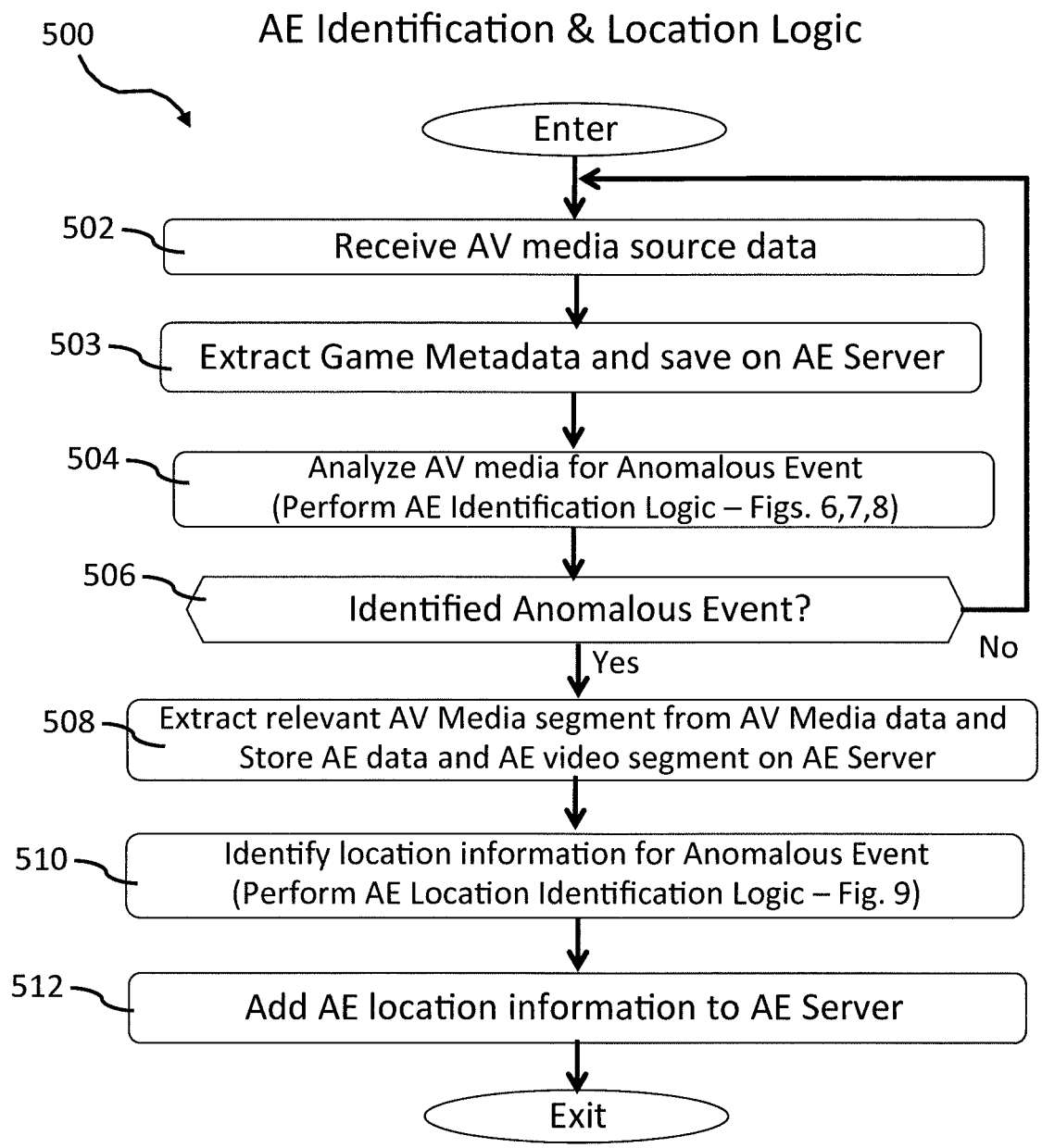

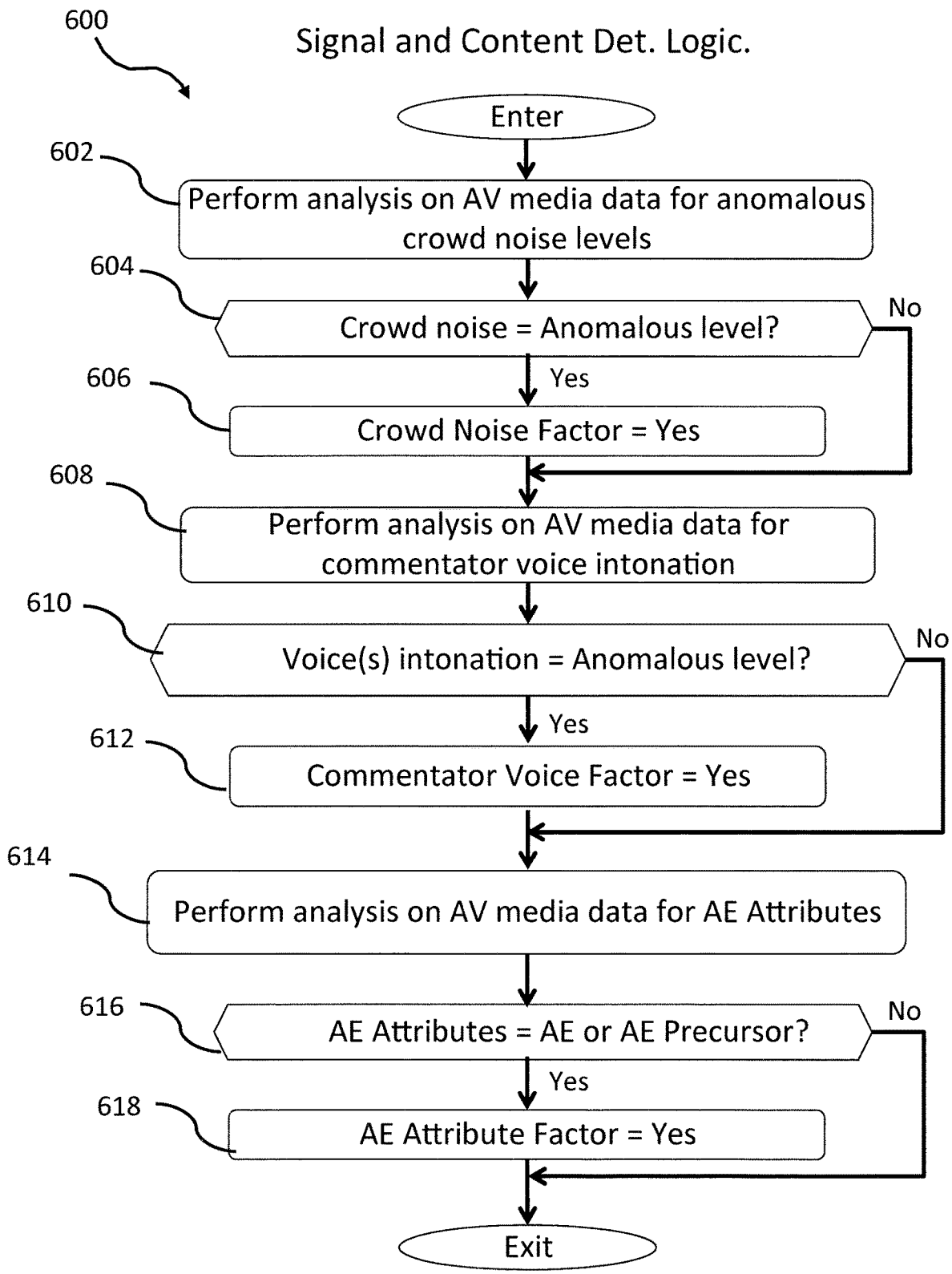

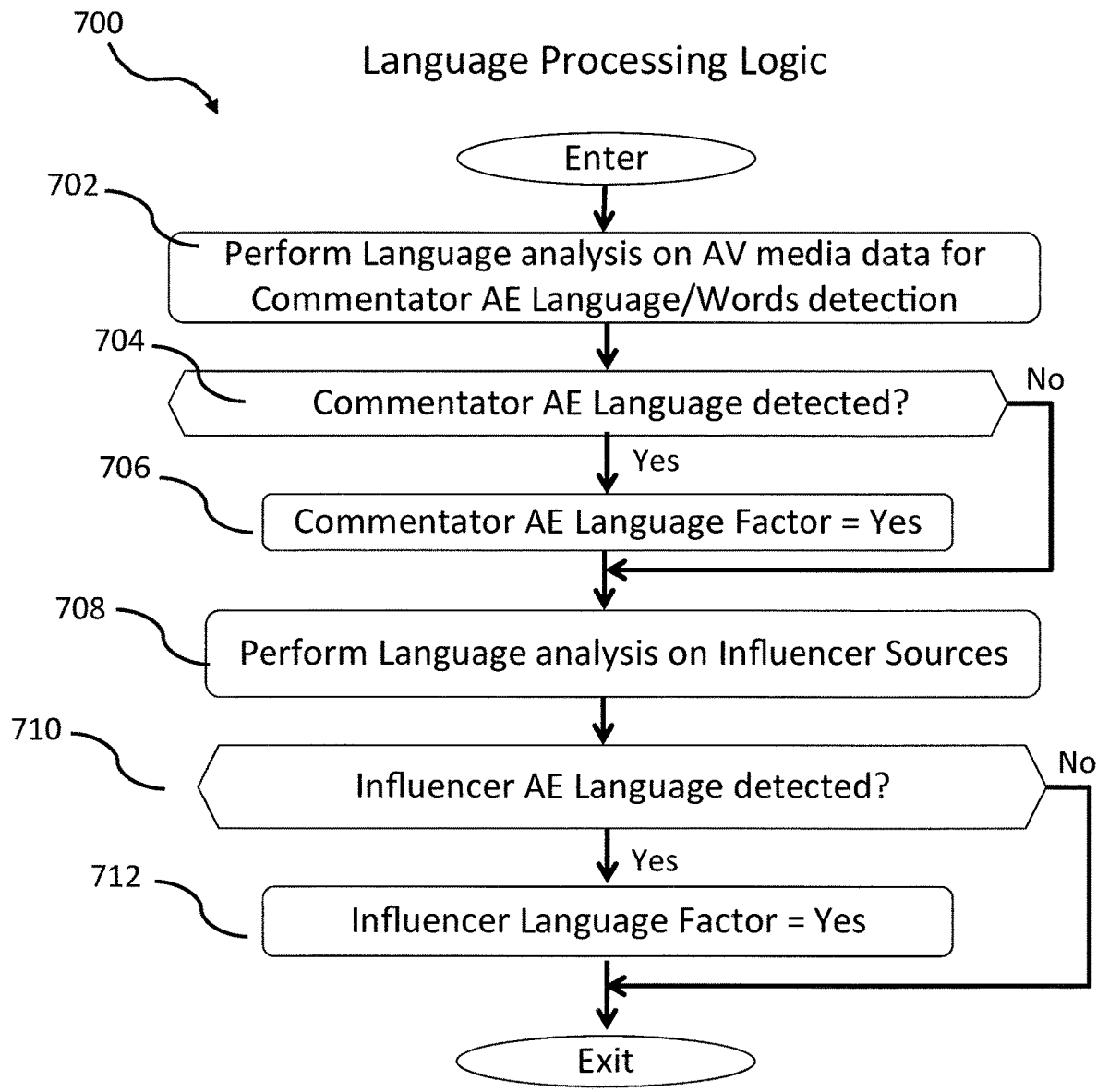

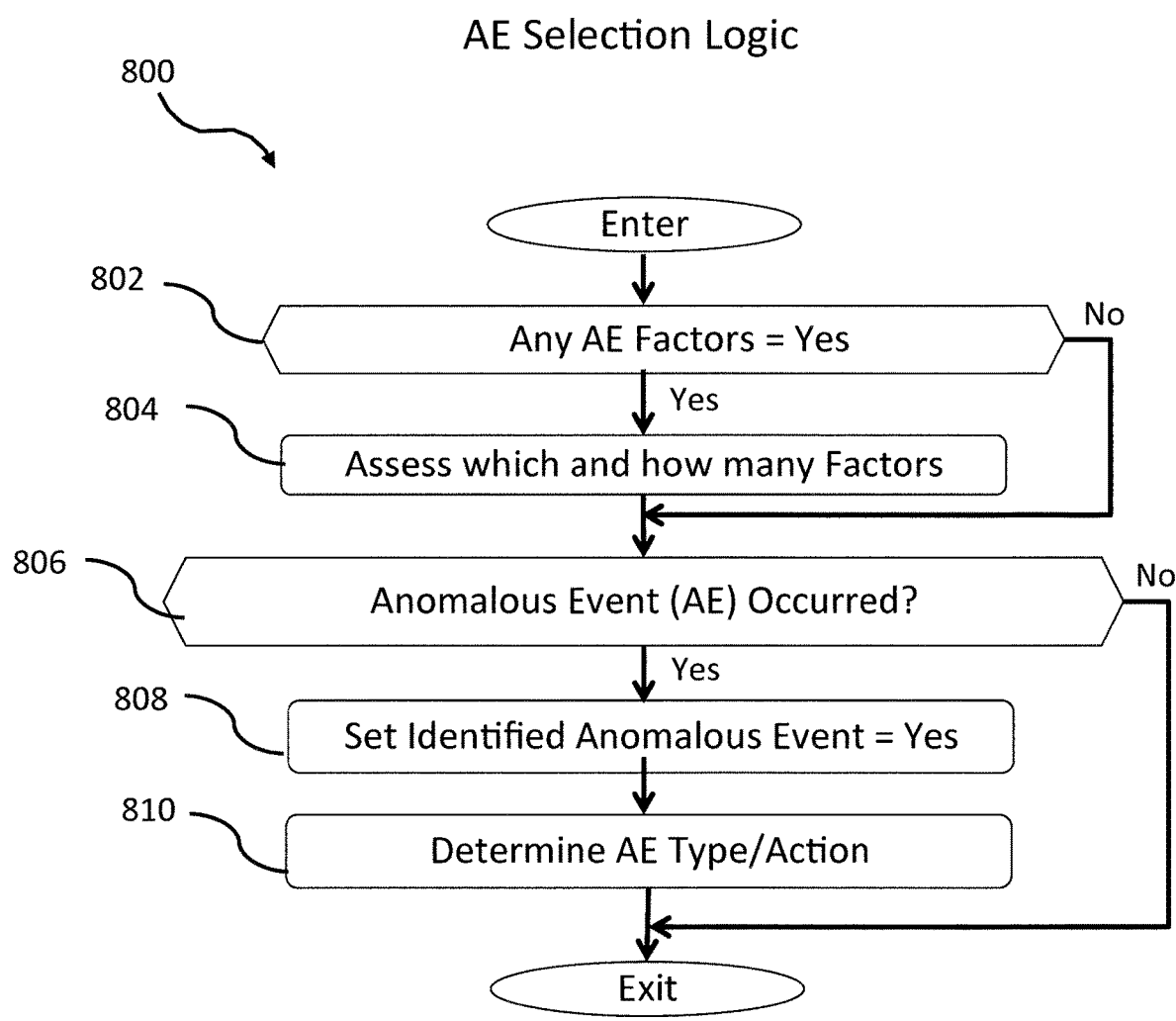

Fig. 11

Social Media Response (SMR) Table 1100

| No. 1102 | Content 1104 | Date/Time 1106 | SM Source 1108 | Topic 1110 | Attributes 1112 | AE# 1114 | Sent. 1116 |
|---|---|---|---|---|---|---|---|
| SMR1 | Content 1 | 5/12/16 4:00 pm | Facebook | Topic 1 | Attributes 1 | AE1 | Like |
| SMR2 | Content 2 | 5/12/16 4:01 pm | Twitter | Topic 2 | Attributes 2 | AE1 | Dislike |
| SMR3 | Content 3 | 5/12/16 4:04 pm | Blog | Topic 3 | Attributes 3 | AE1 | Neutral |
| SMR4 | Content 4 | 5/12/16 4:04 pm | Twitter | Topic 4 | Attributes 4 | N/A | N/A |
| SMR5 | Content 5 | 5/12/16 4:46pm | Twitter | Topic 5 | Attributes 5 | AE2 | Dislike |
| SMR6 | Content 6 | 5/12/16 4:48pm | Facebook | Topic 6 | Attributes 6 | AE2 | Like |
| SMR7 | Content 7 | 5/12/16 5:23pm | Twitter | Topic 7 | Attributes 7 | AE3 | Dislike |
| SMR8 | Content 8 | 5/12/16 5:23pm | Blog | Topic 8 | Attributes 8 | N/A | N/A |
| SMR9 | Content 9 | 5/12/16 5:51pm | Twitter | Topic 9 | Attributes 9 | AE4 | Dislike |
| SMR10 | Content 10 | 5/12/16 6:16pm | Google+ | Topic 10 | Attributes 10 | AE5 | Dislike |
| SMR11 | Content 11 | 5/12/16 6:19pm | Instagram | Topic 11 | Attributes 11 | AE5 | Like |
| SMR12 | Content 12 | 5/12/16 6:20pm | Instagram | Topic 12 | Attributes 12 | AE3 | Dislike |
| SMR13 | Content 13 | 5/12/16 6:21pm | Flickr | Topic 13 | Attributes 13 | AE4 | Neutral |
| SMR14 | Content 14 | 5/12/16 6:21pm | Digg | Topic 14 | Attributes 14 | AE4 | Like |
| ... | | | | | | | |

Fig. 19

User Attributes Table 1900

| User ID | Sports | Teams | Players | Phys. Loc. | Age | Gen-der | Hobb-ies | AE Likes | AE Dis-Likes | Alert Settings |
|---|---|---|---|---|---|---|---|---|---|---|
| User 1 | Football; Hockey | Team A; Team B | Player A; Player B | State A | 30 | M | Sports | AE1; AE4 | AE2; AE5 | Team A |
| User 2 | Football; Baseball; | Team C; Team D | Player C; Player D | State C | 45 | M | Fishing | AE1; AE3; AE5 | None | None |
| User 3 | Football; | Team E; | Player E; | State E | 52 | F | Hiking | AE2 | AE1; AE4; AE5 | Team E |
| ... | | | | | | | | | | |

AE App Settings

Display Format: ⟋ 2302
- ☐ AE Pylon Sentiment: ⟋ 2308
  - 2310 ⟋ - Shape:  ☐ Cylinder  ☐ Square Cylinder  ☐ Cone
  - - Color:  –Positive (like): __BLACK__ <>(drop-down color list)
  - 2312 ⟋  –Negative (dislike): __GREY__ <>(drop-down color list)
  -   –Neutral (no opinion): __WHITE__ <>(drop-down color list)
- ☐ AE Pylon Social Media Source: ⟋ 2320
  - 2324 ⟋ - Shape:  ☐ Cylinder  ☐ Square Cylinder  ☐ Cone
  - - Color: –Facebook color: __BLACK__ <>(drop-down color list)
  -  –Twitter color: __GREY__ <>(drop-down color list)
  - 2326 ⟋ –Instagram color: __WHITE__ <>(drop down color list)
  -  –Google-plus color: __BLUE__ <>(drop down color list)
- ☐ Show SMR Posts ⟋ 2330   ☐ Pylon height prop. to SMR total ⟋ 2332
- ☐ Show Video   ☐ Show AE Details   ☐ Show Game Metadata ⟋ 2336
- 2344  2340 SMR Sample Window: ___ min., ___ hrs., ___ days after AE ⟋ 2338    2342
- ☐ Separate <u>Sentiment</u> Graphic:   ☐ Pie chart   ☐ Bar chart   ☐ All AEs   ☐ Specific AEs
- ☐ Separate <u>Social Media</u> Graphic:   ☐ Pie chart   ☐ Bar chart   ☐ All AEs   ☐ Specific AEs
- ☐ AE Time Selector? ⟋ 2350   ☐ AE Type Selector? ⟋ 2352   ☐ AE Timeline? ⟋ 2354   2346
- ☐ AE Filter:   ☐ Same Age Group   ☐ Same Fan Base   ☐ Same Location ⟋ 2362
  - 2360

User Attributes: ⟋ 2304
- ☐ Sports: __Football; Baseball__ <>(drop-down list – multi-pick) ⟋ 2370
  - ☐ Football AE Types: __Scoring; Catches; Fumbles__ <>(drop-down) ⟋ 2372
  - ☐ Baseball AE Types: __Scoring; Catches; Errors__ <>(drop-down)
- ☐ Teams: __Team A; Team C__ <>(drop-down list)
- ☐ Players: __Player A; Player C__ <>(drop-down list)
- ☐ Gen. AE Types: __Scoring; Fights; Catches; Drops; Fumbles__ <>(drop-down)
- ☐ Game Situation:   ☐ Playoff   ☐ Close Game   ☐ Last 2 Min
- 2374

- ☐ Age Group: ☐ <18; ☐ 18-21; ☐ 22-30; ☐ 31-40; ☐ 41-50; ☐ 51-60; ☐ 61-70; ☐ >70
- ☐ Location/Home Address: __City X, State Y__ <>(drop-down list)
- ☐ Hobbies: __Fishing__ <>(drop-down list)

2380

Alert Settings: ⟋ 2306
- ☐ Alerts On ⟋ 2390      ☐ Allow Autonomous Alerts ⟋ 2392
- ☐ Alert me when an AE occurs for my: ⟋ 2394
  - ☐ Sports   ☐ Teams   ☐ Players   ☐ AE Types   ☐ Game Situation ⟋ 2396
- ☐ Exclude the following: ⟋ 2398
  - ☐ Sports   ☐ Teams   ☐ Players   ☐ AE Types   ☐ Game Situation ⟋ 2399

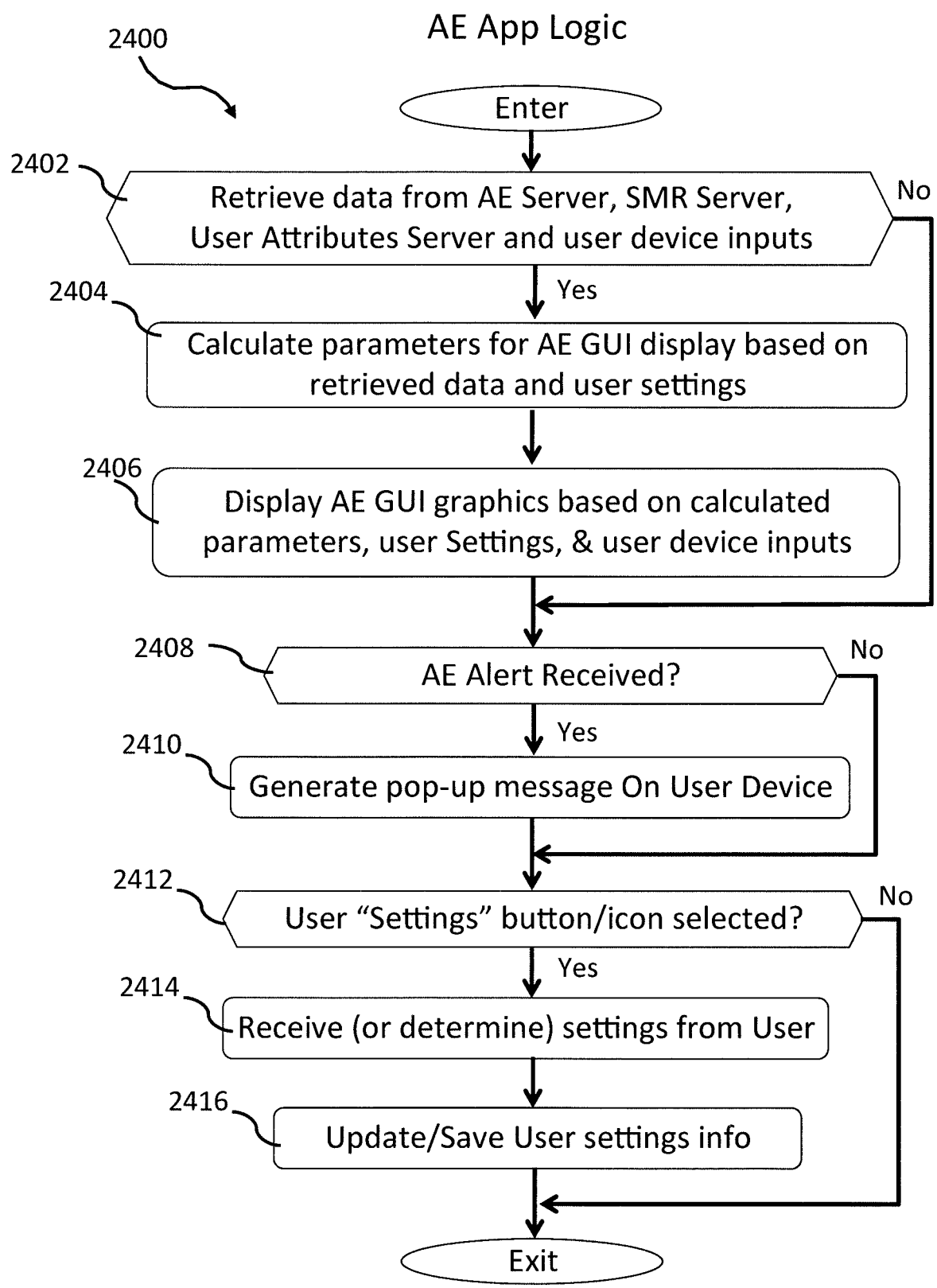

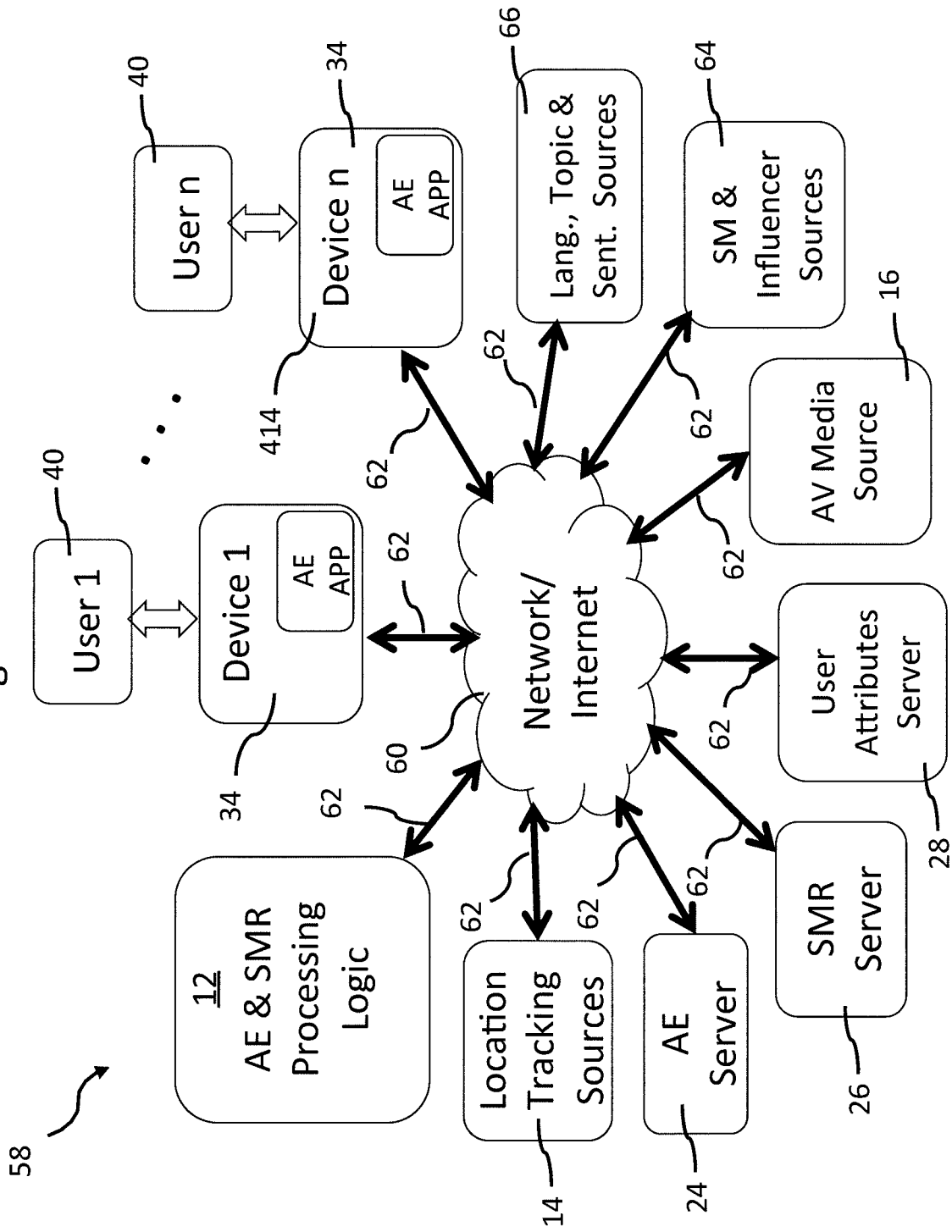

SYSTEM AND METHOD FOR DETECTION AND VISUALIZATION OF ANOMALOUS MEDIA EVENTS

BACKGROUND

Facilitating the querying and indexing of media content, such as video and audio, is a process that requires extensive time due to manual processes. Such media querying and indexing is currently done via manual inspection and review of the media content as one traverses it forward and backward in time. In addition, manual annotation of points in time (e.g., embedding text descriptions of scenes within a video) is sometimes performed to enable faster and more descriptive querying. This is adequate for applications where the annotations will not change over time (e.g., for a movie or recorded stage production) or where the annotations mainly pertain to descriptions or interpretations of the actual media.

However, querying and indexing of unscripted media, such as sports media, or other media that is naturally the subject of viewer opinion (or sentiment), has additional requirements. In particular, consumers also have a desire to view segments of sports media that are associated with or connected to, or that elicit, result in, cause, or generate, crowd (or general viewing public) reaction, response, opinion, or emotion, especially since sports content viewing is often a communal event. Additionally, such crowd-related data may change over time or may vary based on type of event, sport, action, location, or other factors or variables.

Accordingly, it would be desirable to have a method and system that provides indexing and querying of sports (or similar) media and provides the ability to identify segments of media that are of interest to sports fans (or the general public) within a larger sporting (or other) event, and present it to a user in view of the aforementioned factors or requirements.

BRIEF DESCRIPTION OF THE DRAWINGS

FIG. 4 is a table showing a sample listing of anomalous events and certain features or attributes associated with anomalous events, in accordance with embodiments of the present disclosure.

FIG. 4A is a table showing game metadata, in accordance with embodiments of the present disclosure.

FIG. 5 is a flow diagram of one of the components in FIG. 2, in accordance with embodiments of the present disclosure.

FIG. 6 is a flow diagram of one of the components of FIG. 3, in accordance with embodiments of the present disclosure.

FIG. 7 is a flow diagram of another one of the components of FIG. 3, in accordance with embodiments of the present disclosure.

FIG. 8 is a flow diagram of another one of the components of FIG. 3, in accordance with embodiments of the present disclosure.

FIG. 11 is a table showing a sample listing of social media responses and certain fields associated with the responses, in accordance with embodiments of the present disclosure.

FIG. 19 is a table showing a sample listing of user attributes, in accordance with embodiments of the present disclosure.

FIG. 23 is a screen illustration of a settings screen for setting options for the anomalous event software application (AE App), in accordance with embodiments of the present disclosure.

FIG. 24 is a flow diagram of the anomalous event software application (AE App), in accordance with embodiments of the present disclosure.

FIG. 25 is a block diagram of various components of the system of FIG. 1, connected via a network, in accordance with embodiments of the present disclosure.

DETAILED DESCRIPTION

As discussed in more detail below, the present disclosure is directed to methods and systems for identifying segments of audiovisual (AV) media (by time and location) associated with unscripted (or unplanned or unpredictable) "anomalous" events (or "AEs" or "mini-events") within a larger sporting event (such as a football game or other sporting event), that elicit a social media response (or reaction), by a given segment of the population, and providing a selectable graphic visualization (or graphic user interface or GUI) showing the level of interest and the sentiment (e.g., positive, negative, neutral) for each Anomalous Event (AE). The GUI may also show the position (or location) on the court or field of play (as actions during sporting events occur at specific locations on the court or field of play), as opposed to movies and similar scripted media, which are not associated with physical locations in the real world. The present disclosure also provides methods and systems for associating spatiotemporal anomalous events identified in AV media events with social media content and signals (e.g., sentiment), and provides a spatiotemporal visualization on an analogous playing field graphic, e.g., as an augmented reality.

For example, an amazing catch made by a football player on a given sports team, is an unplanned, anomalous event (AE) within the football game that a sports fan may like to know happened, or know more details about, and may also like to know the extent to which others had opinions, reactions or responses to the catch.

The visualization or GUI may also provide the user with the ability to view details about each AE, such as when it occurred and how long each AE segment lasted, and the ability to view the AE video segment. Users may also select and adjust how they view the AE in the GUI (e.g., the format of the display) and the time window within a sporting event to view the AEs.

Feedback may also be provided to adjust or re-tune the logic that identifies the AEs, and provides the ability for users to set-up and receive alerts when AEs occur having certain user-selectable or autonomously-determined criteria.

Figure 1:
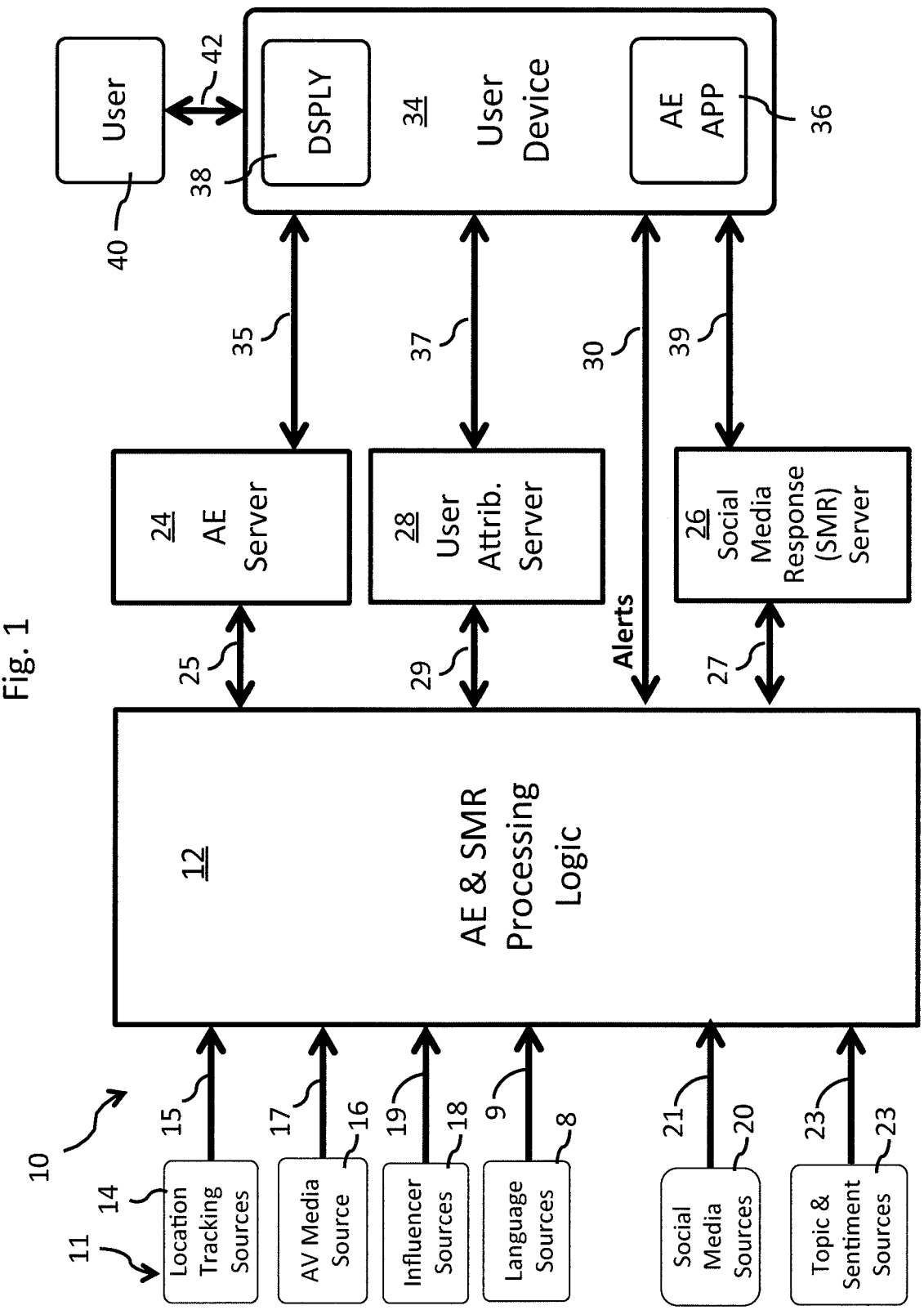
FIG. 1 is a top-level block diagram of components of an anomalous event detection and visualization system, in accordance with embodiments of the present disclosure.

FIG. 1 illustrates various components (or devices or logic) of a digital media anomalous event detection and visualization system 10 of the present disclosure, which includes an Anomalous Event and Social Media Response (AE & SMR) Processing Logic 12, which receives inputs from a plurality of data sources 11, including AE location tracking sources 14 on a line 15, such as a player, referee, ball, car, horse, or any other person or object that may be involved in an AE or associated with tracking the location of an AE (which may be collectively referred to herein as a "AE sports object"), AV (audio/visual) media sources 16 on a line 17, Influencer sources 18 on a line 19, AE Language Sources 8 on a line 9, Social Media sources 20 on a line 21, and Topic & Sentiment sources 22 on a line 23. The AE & SMR Processing Logic 12 communicates with an Anomalous Event (AE) Server 24 on a line 25, a Social Media Response (SMR) Server 26 on a line 27, and a User Attribute Server 28 on a line 29. The servers 24,26,28 communicate with a user device 34, such as a smart phone (discussed more hereinafter), on lines 35,37,39, respectively. The user device 34 may have an Anomalous Event software application (AE App) 36 (discussed more hereinafter) loaded thereon and a display 38 and communicates with a user 40, as shown by a line 42. Also, the logic 12 may communicate with the user device 34 (e.g., alerts or other information) on a line 30, as discussed herein.

The AV (audio/visual) media sources 16 provide digital source media data for a given event (streamed live or pre-recorded), e.g., a sporting event (or other event that has unplanned or unpredictable anomalous events occur), for analysis by the AE & SMR Logic 12 and ultimately for viewing on the display 38 of the user device 34 by the user 40, as discussed herein. The AV media sources 12 may include, for example, one or more video cameras, audio/visual players, production or master control centers/rooms, playback servers, media routers and the like.

The user device 34 may be a computer-based device, which may interact with the user 40. The user device 34 may be a smartphone, a tablet, a smart TV, a laptop, cable set-top box, or the like. The device 34 may also include the AE App 36 loaded thereon, for providing a desired graphic user interface or GUI or visualization (as described herein) for display on the user device 34. The AE App 36 runs on, and interacts with, a local operating system (not shown) running on the computer (or processor) within the user device 34, and may also receive inputs from the user 40, and may provide audio and video content to audio speakers/headphones (not shown) and the visual display 38 of the user device 34. The user 40 may interact with the user device 34 using the display 38 (or other input devices/accessories such as a keyboard, mouse, or the like) and may provide input data to the device 34 to control the operation of the AE software application running on the user device (as discussed further herein).

The display 38 also interacts with the local operating system on the device 34 and any hardware or software applications, video and audio drivers, interfaces, and the like, needed to view or listen to the desired media and display the appropriate graphic user interface (GUI) for the AE App, such as the AE visualization, and to view or listen to an AE segment on the user device 34.

The AE & SMR Processing Logic 12 identifies segments of media (by time and location) associated with the "Anomalous Events" (AEs) within a sporting (or other) event AV media stream or file, and stores the AE details onto the Anomalous Event Server (AE Server) 24, as described further herein. The logic 12 also searches (or watches or scans) various social media sources (e.g., online social networks, blogs, news feeds, webpage content, and the like) and identifies social media responses (SMRs) (including readers' comments from various online sources) associated with each of the AE's, determines the sentiment of the SMRs, and stores the SMRs on the Social Media Response (SMR) Server 26, as described further herein. The logic 12 may also use information about the user 40 stored in the User Attributes Server 28 (or the user device 34 or otherwise) to update the AE & SMR Processing Logic 12, and the logic 12 may also provide alerts to the user device 34 when an AE has occurred (or is occurring) based on user settings and predictive logic, as described further herein. The AE App 36 running on the user device 34 provides a graphic user interface (GUI) visualization of the AEs on the display 38 based on the information in the AE Server and SMR servers and based on inputs and options settings from the user 40, as described herein. The logic and processes of the system 10 described herein may analyze the game or event in realtime, e.g., using live AV media data (such as a live video stream, or video that is being played as if it were live), and provide the associated realtime AE information, or may analyze the game or event after it has happened or been broadcast, e.g., using pre-recorded AV media data input. Also, the system 10 may analyze a single game or event or a plurality of games occurring at the same time, or simultaneously analyze some live games and some games that are pre-recorded. It may also analyze an entire season (or group of games) for a given sport or event type, or may analyze games from multiple different sports. The user may select the types of sports and games the system 10 analyzes and provides AE information for, as discussed more hereinafter.

Figure 2:
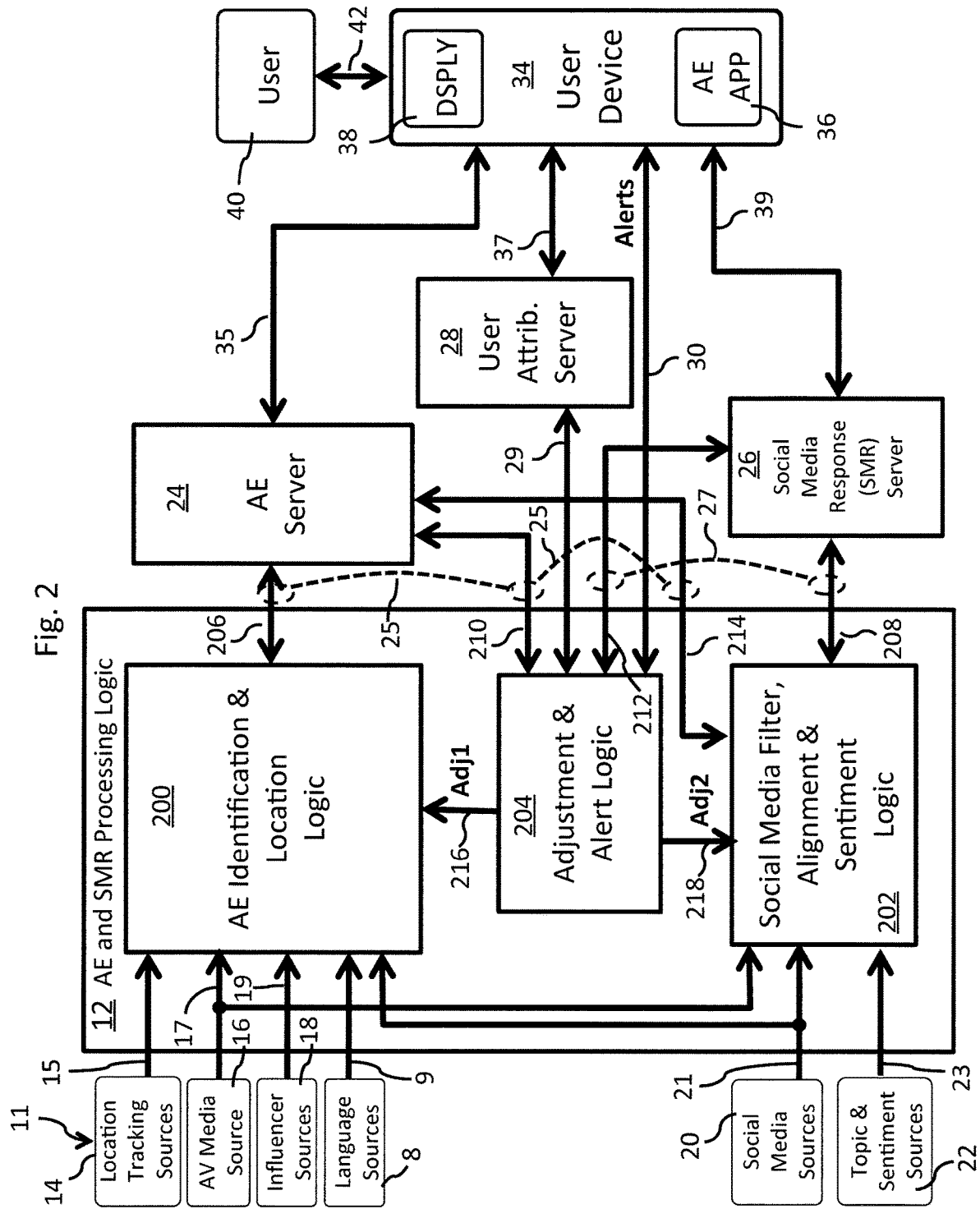
FIG. 2 is a more detailed block diagram of components of FIG. 1, in accordance with embodiments of the present disclosure.

Referring to FIG. 2, the AE & SMR Logic 12 may be viewed as having three components: AE Identification & Location Logic 200; Social Media Filter, Alignment, and Sentiment Logic 202; and Adjustment & Alert Logic 204. The AE Identification & Location Logic 200 identifies the Anomalous Events (AEs) segments within the AV media source data for a given sporting (or other) event and saves them in the AE Server 24 to build (or populate) an AE Listing table or AE database, as shown in FIG. 4 and discussed more hereinafter. The line 25 (FIGS. 1, 2) showing communication between the AE & SMR Processing Logic 12 and the AE Server 24 is broken-down in FIG. 2 to show communication with the components 200, 202, 204 on lines 206, 210, 214, respectively. The Social Media Filter, Alignment, and Sentiment Logic 202 analyzes social media data for responses (or potential responses) to the AEs during the sporting event (social media response or SMR) and saves them in the SMR Server 26, as shown in FIG. 11, and discussed more hereinafter. The logic 202 also aligns the AE's listed in the SE Server 24 with potential SMRs in the SMR Server 26 to obtain a list of SMRs related to the anomalous events (AEs) listed in the AE Server 24. The line 27 (FIGS. 1, 2) showing communication between the AE & SMR Processing Logic 12 and the SMR Server 26 is broken-down in FIG. 2 to show communication with the components 202, 204 on lines 208, 212, respectively. The Adjustment and Alert Logic 204 receives inputs from the AE Server, the SMR Server and the User Attribute Server 28 and adjusts the logic 200 on a line 216 (Adj1) to improve or optimize the performance of the logic 200, and also provides Alerts to the User Device 34 (directly, or via social media, or otherwise), as discussed hereinafter. The User Attribute Server 28 also communicates with the user device 34 on the line 37 to receive information from the user device 34 regarding user attributes, preferences, settings and the like, as discussed hereinafter.

Figure 3:
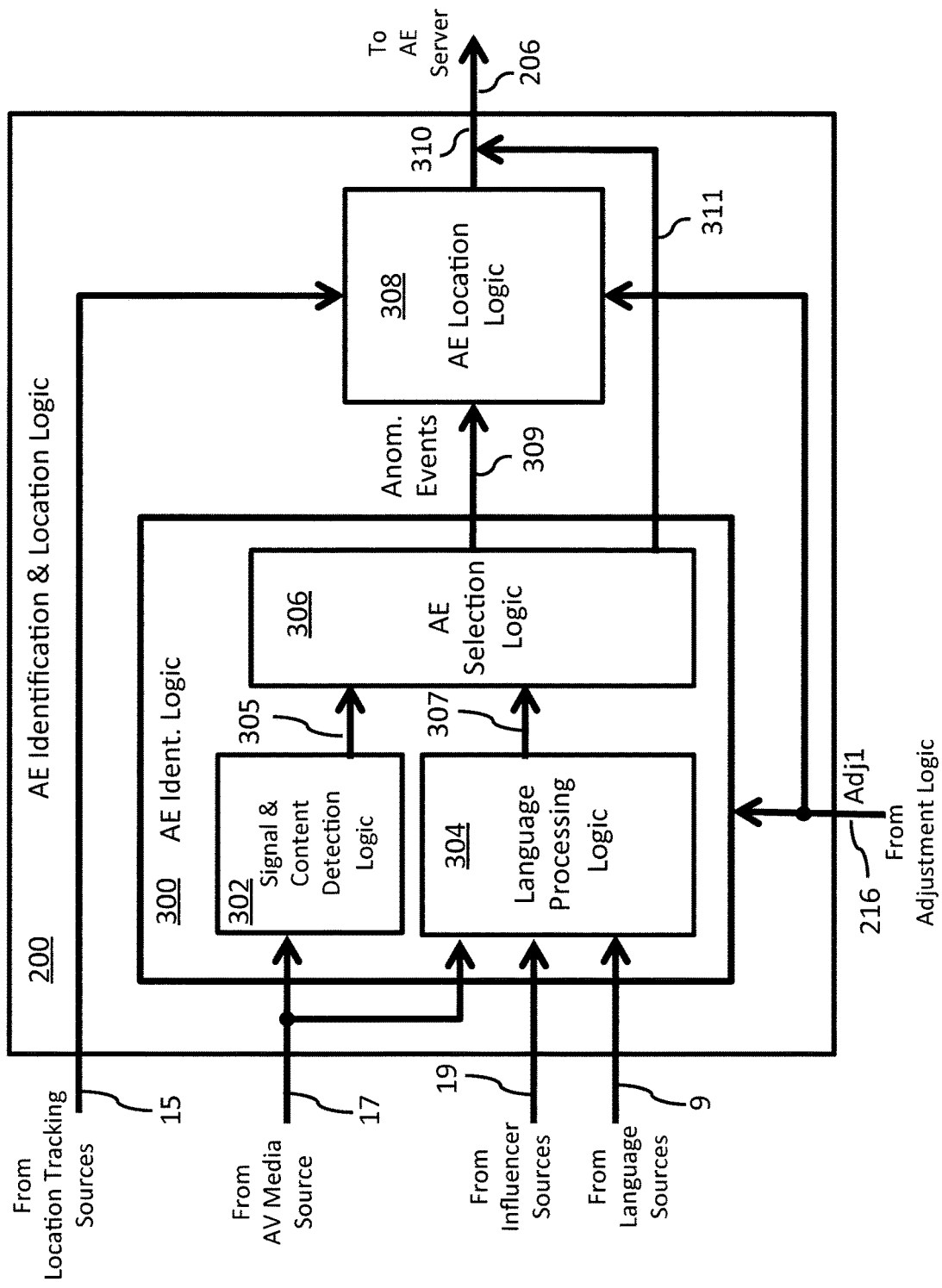
FIG. 3 is a detailed block diagram of one of the components of FIG. 2, in accordance with embodiments of the present disclosure.

Referring to FIG. 3, the AE Identification & Location Logic 200 (FIGS. 2,3) may be viewed as having two main components: Anomalous Event (AE) Identification Logic 300; and Anomalous Event (AE) Location Logic 308. The AE Identification Logic 300 may be viewed as having three main components: Signal & Content Detection Logic 302, Language Processing Logic 304, and Anomalous Event (AE) Selection Logic 306. The Signal & Content Detection Logic 302 analyzes the AV media data on the line 17 for signals and content that may be indicative of an AE, such as: marked differences in crowd noise, commentator voice intonation, anomalous event (AE) or AE precursor attributes, or other AV media signals and content which may be indicative of an AE (or an AE precursor), and provides a status (e.g., presence or absence) of respective AE factors corresponding to such signals and content.

The Language Processing Logic 304 analyzes the AV media data on the line 17 and the influencer data on the line 19, and compares it against Generic AE Language data on the line 9, to provide the status (e.g., presence or absence) of respective AE factors associated with the language (or words or key words) used by the commentators in the AV media data content and used by the influencers (e.g., professional sports writers, sports personalities, sports bloggers, and the like) in the influencer data content that may be indicative of an AE. Other language sources may be used if desired.

Referring to FIGS. 3 and 4, as discussed herein, the AE Identification & Location Logic 200 identifies Anomalous Events (AEs) and stores data in the AE Listing table (or AE database) 400 (FIG. 4), which is saved on the AE Server 24. Referring to FIG. 4, in particular, a first column 402 on the left of the AE Listing table 400 is an Anomalous Event (AE) number, e.g., AE1-AEn, to uniquely identify each Anomalous Event (AE) in a given sporting (or other) event (also referred to herein as a "game"). Column 402 is followed from left to right by columns 406-422 associated with various attributes, characteristics or features of each AE, such as column 406 for AE Action/Type (e.g., the type of action associated with the anomalous event for a given sporting event, such as Defensive Stop, Fumble, Tough Catch, Field Goal, Fight, Fielding Error, Throwing Error, Home Run, Stolen Base, Goal, Yellow Card, Red Card, and the like), column 408 for the variable game situation (or circumstances), which may change during the game (e.g., overtime, close-score, last 30 seconds of game/quarter, and the like). Fixed game situations data/information, that do not change during the game (e.g., playoff game, post-season, deciding-game, and the like) may be captured separately from the AV media game metadata.

To the right of the column 408 are: column 410 for Team/Player(s) involved with the AE, column 412 for Date/Time when the AE occurred, column 414 for Game Clock time and Quarter (or Half, Period, Inning, Set, or the like, depending on the game/event) when the AE occurred, column 416 for AE Length (or time duration of AE), column 418 for the AE Factor(s), e.g., the number of AE Factors present in the assessment of whether an event is sufficient to be identified as an AE, as discussed further herein, column 420 for Location, e.g., where AE occurred on the court or field of play, column 422 for Video (or Audio) clip link, which provides an address or pointer to the AV media segment content for the associated AE; and column 424 for the total number of Social Media Responses (SMRs) that aligned with this AE.

Referring to FIG. 4A, the AE Identification & Location Logic 200 reads the AV media and extracts Game Metadata regarding game attributes, e.g., sport/event, teams playing, location of game, game start time, game situation (e.g., final game, play-off game, deciding game, and the like) and any other information about the game needed to help determine AEs or SMRs, and stores it in a Game Metadata table 450, which may be saved on the AE Server 24. In particular, a first column 452 on the left of the Game Metadata table 450 is the Sport being played in the AV media data, e.g., Football, baseball, hockey, or the like. Column 452 is followed from left to right by columns 454-470 associated with various attributes, characteristics or features of the game being played on the AV media, such as column 454 for the Home Team name, e.g., Team A, column 456 for the Away Team name, e.g., Team C, column 458 for the game start date/time, e.g., 2/12/16 at 4:00 pm, column 460 for the game end date/time, e.g., 2/12/16 at 8:00 pm, column 462 for the game location, e.g., Stadium A, City A, State A, column 464 for the fixed game situation, e.g., playoff game, column 466 for the current game score, e.g., 14-7 Team A, column 468 for the current offensive team, e.g., Team A, and column 470 for the current game clock, e.g., 8:22 left in the third quarter. Other aspects of the game may be provided in the Game Metadata table 450 if desired or as needed to perform the functions of the present disclosure.

Referring to FIG. 5, a flow diagram 500 illustrates one embodiment of a process or logic for implementing the identification and location of the AE's in the AV media source data of the sporting event or game, which may be implemented by the AE Identification & Location Logic 200 (FIGS. 2 and 3). The process 500 begins at a block 502, which receives the AV media source data having the sporting event or game (or a predetermined segment of the game) to be reviewed and analyzed for AE's. Next, a block 503 extracts the Game Metadata from the AV media data and saves it in the Game Metadata table 450 (FIG. 4A) on the AE Server 24.

Next, a block 504 analyzes the AV media data for Anomalous Events (AEs) by performing the AE Identification Logic 300 (FIG. 3), and, in particular, performing the Signal & Content Detection Logic 302 (e.g., logic that implements a process such as process 600 shown in FIG. 6), the Language Processing Logic 304 (e.g., process 700 shown in FIG. 7), and the AE Selection Logic 306 (e.g., process 800 shown in FIG. 8), discussed more hereinafter. Next, a block 506 determines whether an AE has been detected (or identified) in the AV media data during the processes of block 504. If NO, the process returns to the block 502 and repeats the blocks 502-506 (for the next segment of AV media game data) until the event or game is over. The blocks 502-506 may receive and analyze successive AV media segments (or chunks) which may be a moving (or rolling or sliding) window of AV media data having a fixed or variable time width that is sampled across the AV media data for the current game from the beginning of the game up to the current time (or the end of the current game, whichever is later). In some embodiments, the blocks 502-506 may start the window from the end of the last AE detected in the current game. The logic may use any other technique, if desired, for sampling, receiving and analyzing the AV media data for the desired parameters to detect an AE, provided it meets the functional and performance requirements discussed herein.

If the result of the block 506 is YES, an AE has been identified in the event/game from the AV media data, and a block 508 extracts the relevant corresponding AV media segment (AE segment) from the AV media data corresponding to the AE and stores it on the AE Server 24 (FIG. 1), and also stores the data associated with the AE, including AE details shown in the AE Listing table 400 (FIG. 4) and address/pointer to the AE video segment) in the AE table 400 (FIG. 4) on the AE Server 24 (FIG. 1). Next, a block 510 identifies the location information for the AE, i.e., where on the field of play the AE actually occurred, by performing the AE Location Logic (e.g., process 900 shown in FIG. 9), discussed more hereinafter. Next, a block 512 adds the AE location information for the AE to the AE table 400 (FIG. 4) on the AE server 24 (FIG. 1) and the process exits.

Referring to FIG. 6, a flow diagram 600 illustrates one embodiment of a process or logic for implementing the AV media Signal & Content Detection Logic 302 (FIG. 3). The process 600 begins at a block 602, which performs analysis on the AV media data for anomalous crowd noise levels. Next, a block 604 determines if the crowd noise is at a level that could be indicative of an AE occurring. If YES, a Crowd Noise Factor is set to Yes at a block 606. An example technique which uses crowd noise for detecting exciting events that may be used with the present disclosure is described in, M. Baillie, et al., "An audio-based sports video segmentation and event detection algorithm", 2004 IEEE Computer Vision and Pattern Recognition Workshop, which is incorporated herein by reference to extent needed to understand the present invention.

In other embodiments, the logic 12 may receive signals directly from an audio sound mixer (or sound board) located at the event/game or at the studio producing or broadcasting the event. In that case, if an audio engineer or other sound mixer worker boosts (or increases) the audio signal for the crowd noise (e.g., a crowd noise audio channel on the mixer) in response to, or anticipation of, an important event during the game, the logic 12 (e.g., blocks 602-606) may detect the increase in the audio signal and use the increase as an indicator that the crowd noise is at an anomalous level and set the crowd noise factor to Yes. Any other technique for using or detecting crowd noise levels for identifying exciting events may be used if desired.

After performing block 606, or if the result of Block 604 is NO, block 608 performs analysis on the AV media data for commentator voice intonation. Next, a block 610 determines if the commentator voice intonation is indicative of an AE occurring, such as loud volume, excited tone, and the like. If YES, a Commentator Voice Factor is set to Yes at a block 612. Two example techniques for detecting emotion in a speaker's voice that may be used with the present disclosure are described in: Published US Patent Application US 2002/0194002 A1, to Petrushin, entitled "Detecting Emotions Using Voice Signal Analysis" and U.S. Pat. No. 6,151,571 A, to Petrushin, entitled "System, Method And Article Of Manufacture For Detecting Emotion In Voice Signals Through Analysis Of A Plurality Of Voice Signal Parameters," which are incorporated herein by reference to extent needed to understand the present invention. Any other technique for detecting emotion in a speaker's voice may be used if desired.

After performing block 612, or if the result of Block 610 is NO, block 614 performs analysis on the AV media data for AE Attributes, such as a football play formation not often used by one of the teams in a given game context, or a hot batter coming to the plate with the bases loaded, a large score disparity after a team scores, recent fervor of a given athlete in the news that makes a good or bad play, or any other situations that may be likely to produce an AE that is of interest to a large number of individuals (or may be a precursor to an AE).

For example, the AE attributes may be used within the context of a football game, using the formation of players on a field, in combination with the context of the game. More specifically, the recognition of a "non-kicking" formation for an offense facing "fourth down and seven" near the end of a game may be a notable event. Similar scenarios can be identified in different sports. The use of player location data (e.g., available from electronic player tracking devices or optical object tracking or the like) in combination with visual pattern recognition and detection techniques can be used to implement the prior example.

The pattern recognition component (recognizing play formations) may be implemented using neural networks for pattern recognition, such as that described in C. Bishop, "Pattern Recognition And Machine Learning". Other techniques may be used for visual pattern recognition, such as that described in I. Atmosukarto, et al., "Automatic Recognition Of Offensive Field Formation In American Football Plays", 2013 IEEE Conference on Computer Vision and Pattern Recognition Workshops. Any other technique may be used to perform pattern recognition to identify AE attributes.

Once a given formation is recognized (and hence labeled) as an AE, it may be saved for future use (e.g., in the AE Server), to identify the next time an AE attribute occurs.

Machine learning techniques, such as Support Vector Machines (SVMs) may be used to learn over time the patterns, formations, plays, or the like, that are AEs. For example, One Class Support Vector Machines (OCSVM) may be used to identify AEs. In that case, the OCSVM "trains" (or "learns") using data belonging to only one "class." In the above example, the "class" being data representing the majority of football play formations observed in a given context (or stage) of a game. If the resulting classifier does not recognize the combination of play formation and context as being part of the "normal" class, then it may be judged as an "outlier," and thus may be identified as an AE Attribute.

Alternatively, certain AE Attributes may be "precursors" to an AE occurring (i.e., an AE Precursor), which can be used to identify the high likelihood (e.g., greater than 75% chance) that an AE is about to occur during or shortly after the AE attribute occurs. For example, in a baseball game, recognizing when a highly skilled team member is up to bat when the bases are loaded, may be an AE Precursor. Multiple techniques can be used to provide such analysis. One technique is the use of "association rule mining," which identifies the strength of relationships among variables in a given dataset.

More specifically, let "I" define a set of binary attributes including but not limited to "player X to bat," "bases loaded," and "high crowd reaction" and let D define a set of transactions, each comprising a subset of "I." Rules may be defined in the form of: X implies Y, where X and Y are subsets or equal to I and X and Y are mutually exclusive. Given the above explanation, the rule of interest may be "{player x to bat, bases loaded} implies {high crowd reaction}," where "high crowd reaction" represents an AE. A basic objective may be to check if the previous rule is of high "confidence" and low "lift," or more broadly identify all rules of high confidence and low lift that involve "high crowd reaction" as being the "consequent" (or consequence) of the rule (i.e., appearing on the right-hand side of the implication of the rule. Requiring low lift supports the removal of candidate rules where the sets involved are independent of each other, and hence no real "rule" exists. Hence, "association rule mining" may help identify AE precursors that most likely lead to an AE.

Next, a block 616 determines if the anomalous event AE Attribute is indicative of an AE or an AE about to occur (or AE Precursor). If NO, the process exits. If YES, an Anomalous Event Attribute Factor is set to Yes at a block 618 and the process exits.

The crowd noise levels, vocal intonation, and attributes/precursors may be pre-defined (or pre-set or pre-stored) to compare the AV media against and to identify certain predetermined conditions or scenarios, such as when a known commentator always says the same thing (a "signature" phrase or remark) when an AE occurs, e.g., John Sterling for the New York Yankees, says: "It is high, it is far, it is gone", for every home run hit by the Yankees. Alternatively, the crowd noise levels, vocal intonation, and attributes/precursors may be learned over time by the logic of the present disclosure, e.g., using machine learning techniques, such as support vector machines (SVMs), neural networks, computer vision algorithms, as described herein, or any other machine learning techniques that perform the functions of the present disclosure.

Referring to FIG. 7, a flow diagram 700 illustrates one embodiment of a process or logic for implementing the Language Processing Logic 304 (FIG. 3). The process 700 begins at a block 702, which performs language analysis on the AV media data for commentator language/words detection. In one embodiment, natural language processing (NLP) techniques may be performed on the AV media data, e.g., pick out words, phrases, or synonyms, that match the AE Language reference data, and are used in the proper context. More specifically, the logic may perform audio speech recognition to identify certain Key Words said by the sports commentators that could be indicative of an AE occurring, such as "what a catch", "touchdown", "foul", "flag", "he dropped the ball", "homerun" or the like, and match-up the words said by the commentators with words in the AE Language Reference data. Such indicative language may be pre-defined, or learned over time given the availability of training data containing a sample of words and phrases used in describing typical AEs. For instance, text classification approaches employing combinations of techniques such as term frequency inverse document frequency (tf-idf), latent semantic indexing (lsi), and support vector machines (SVMs) can be used to model and automatically recognize word usage indicative of an AE. In some embodiments, recursive neural networks (RNTN) may be used to perform natural language processing to identify key words or language, which may be similar to that discussed with the Sentiment Logic 1008 and the process 1600 (FIG. 16) regarding RNTN, discussed hereinafter. Any other techniques may be used, if desired, to identify the topic of the social media content and to determine whether the content is related to the game being analyzed.

After the language analysis has been performed at the block 702, a block 704 determines whether the commentator AE language/words indicative of an AE have been detected. If YES, a Commentator Language Factor is set to Yes at a block 706. After performing block 706, or if the result of Block 704 is NO, block 708 performs language analysis on the Influencer Sources data for key words, phrases, or the like, from influential sources, such as sports writers, sports personalities, bloggers, or other sports authorities, that may be blogging, tweeting, or otherwise commenting on events that occurred at the game (either in realtime during the game or shortly after the game). Next, a block 710 determines if the language of the Influencer Sources data is indicative of an AE occurring, similar to that described above for block 708 for commentator language analysis. If NO, the process exits. If YES, an Influencer Language Factor is set to Yes at a block 712, and the process exits.

Referring to FIG. 8, a flow diagram 800 illustrates one embodiment of a process or logic for implementing the AE Selection Logic 306 (FIG. 3). The process 800 begins at a block 802, which determines if any AE Factors from the logics 302, 304 described in FIGS. 6 and 7, respectively, are set to YES. If YES, a block 804 assesses which AE Factors and how many AE Factors are set to YES. After performing block 804, or if the result of Block 802 is NO, block 806 determines if an AE occurred, e.g., if the number of AE Factors and their associated weighting (or importance), or the type of AE Factors, meet a predetermined criteria.

For example, an AE identification model may be used to determine if an AE has occurred, the model having model parameters, such as that shown below in Equation 1 (Eq. 1) which is a linear weighted AE Factor Sum equation, where A, B, C, D, and E are the weightings (or weighting coefficients) for the respective factors: Crowd Noise Factor (CNF), Commentator Voice Factor (CVF), AE Attribute Factor (AAF), Commentator Language Factor (CLF), and Influencer Language Factor (ILF). The weighting coefficients A-E may be adjusted (or tuned) as the logic learns (e.g., through machine learning or other techniques) which AE Factors are useful in determining when an AE has occurred, as discussed more hereinafter with the Adjustment and Alert Logic 204 (FIG. 2).

$$A*CNF + B*CVF + C*AAF + D*CLF + E*ILF = \text{AE Factor Sum} \qquad \text{Eq. 1}$$

Also, in some embodiments, the AE's may be determined (or detected or identified) from the AV media data using various other AE identification models, such as machine learning models. In that case, when identifying and extracting AV media segments for AE's, one or more machine learning models may be used, which may have various model parameters. For example, a Support Vector Machine (SVM) may be used as a machine learning tool having model parameters, e.g., "c" and "gamma" of a SVM kernel, which can be adjusted (or tuned) based on the performance of the SVM classifier, which is related to the "quality" of the output AE media segment (e.g., how closely the detected AE relates to or resonates with viewers), as determined by the amount or level of social media responses (SMRs) that are aligned with (or related to) the AE, as discussed hereinafter with FIGS. 10-16. These parameters, and the corresponding SVM model that may be used for extracting an AE segment, may be saved on the AE server. Any other techniques or models may be used if desired to analyze the AV media data and identify when an AE has occurred.

If block 806 determines that an AE occurred, then a block 808 sets an Identified Anomalous Event to YES, which may be used (as discussed with FIG. 5) by the AE Identification & Location Logic (FIG. 5, at block 506), to determine if an Anomalous Event (AE) has occurred. Next, a block 810 (FIG. 8) determines the AE Event Type/Action, which may be chosen from a list of potential AE Types/Actions based on the sport being played, such as score, block, sack, turnover, catch, fumble, error, fight, touchdown, field goal, goal, hit, home run, grand slam, dunk, trick play, collision, drop, or any other AE action/type that can occur at a sporting (or other) event that an individual might be interested in or be interested in commenting on. In some embodiments, the logic may use image recognition of the AV media signal/data at the AE location to determine the AE type/action, or the logic may use commentator word/voice recognition of the AV media signal/data at the time the AE occurred to determine the AE type/action, or a combination of both. Other techniques may be used if desired to determine the AE type/action. Any other AE Types/Actions may be used if desired. After performing the block 810, or if the result of Block 806 is NO, the process exits.

Figure 9:
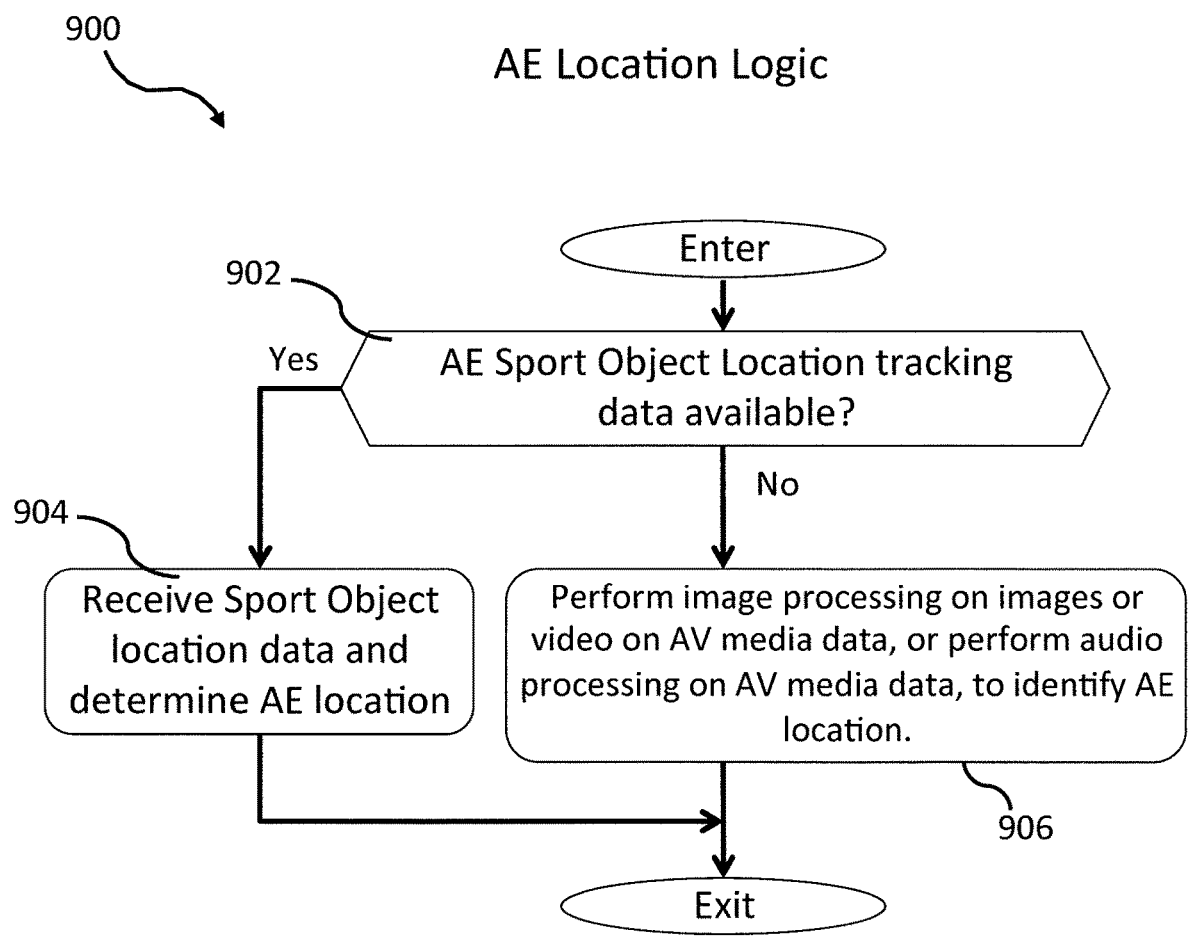
FIG. 9 is a flow diagram of another one of the components of FIG. 3, in accordance with embodiments of the present disclosure.

Referring to FIG. 9, a flow diagram 900 illustrates one embodiment of a process or logic for implementing the AE Location Logic 308 (FIG. 3) to identify where the AE occurred. The process 900 begins at a block 902, which determines if there is AE location tracking data available, e.g., data indicating the location of the "AE sports object," such as a player, ball, referee, car, horse, or any other person or object that may be involved in an AE or associated with identifying the location of an AE. If YES, a block 904 obtains the location tracking data and determines the location of the AE sports object associated with the AE, and the process exits. For example, the logic may use the time when the AE occurred (from the AE detection logic), and identify from the location tracking data where the sports object was located at the time the AE was identified. If there are multiple possible answers, the logic determines the most likely result based on other AE information, such as the AE type/action or other AE information. For example, in a football game, if the ball is overthrown and incomplete, but the quarter back is sacked (which is the AE in this case), the ball may be on the 5 yard line when the AE occurred, but the player of interest (the "AE sports object" in this case) is the quarterback, who was sacked on the 40 yard line. The logic identifies the AE type/action being a "sack" and thus uses the location of the quarterback (40 yard line) as the AE location instead of the ball location (5 yard line).

If the result of block 902 is NO, there is no AE location tracking data available, and block 906 performs image processing on images or video in the AV media data, or performs audio processing of the AV media data, to identify the AE sports object location corresponding to the AE and the process exits. For example, in that case, the logic may use the time when the AE occurred (from the AE detection logic), and identify from the image processing or audio processing where the sports object was located at the time the AE was identified. If there are multiple possible answers, the logic determines the most likely result, similar to that described above, by using the AE type/action together with the image or audio processing results, to identify the most likely location of the AE.

An example of a technique for tracking athlete movement using sensor data that may be used with the present disclosure is described in H. Gandhi et al., "Real-time tracking of game assets in American football for automated camera selection and motion capture", 2010, $8^{th}$ Conference of the International Sports Engineering Association. Another example for tracking objects such as people in video data may be used such as that described in S. Weng, "Video object tracking using adaptive Kalman filter", 2006 Journal of Visual Communication and Image Representation, vol. 17, no. 6, and T. Zhang, "Robust multi-object tracking via cross-domain contextual information for sports video analysis", 2012 IEEE International Conference on Acoustics, Speech and Signal Processing.

If video-based tracking is used, then the location of the AE may be constrained to a limited range or a specific player by selecting specific tracked objects or object trajectories to assign to the AE. For example, facial or jersey number/name recognition techniques (based on, e.g., neural networks or the like) can be used to label the objects tracked in the video. Any other type of recognition technique may be used if desired. In addition, data from commentator audio can be used to assist in locating the AE. For example, names of players from voice commentary can be used to select a player already labeled from the video and thereby select specific locations to map to the AE. Since the output of the aforementioned location analysis routines may be trajectories, specific locations can be chosen using commentator audio. For example, if the commentator mentions "player x scores a touchdown," then the location of player x closest to the touchdown region can be used as the location. As another example, if the commentator mentions with excitement that "an incredible catch" was made, then the location mapped to when the location of the ball meets the location of the receiver can be associated with the AE. The AE location results data of blocks 904 or 906 (i.e., the location of the ball or player associated with the AE) may be used by the AE Identification & Location logic process 500 (FIG. 5, at the block 510) for the location of the AE.

Figure 10:
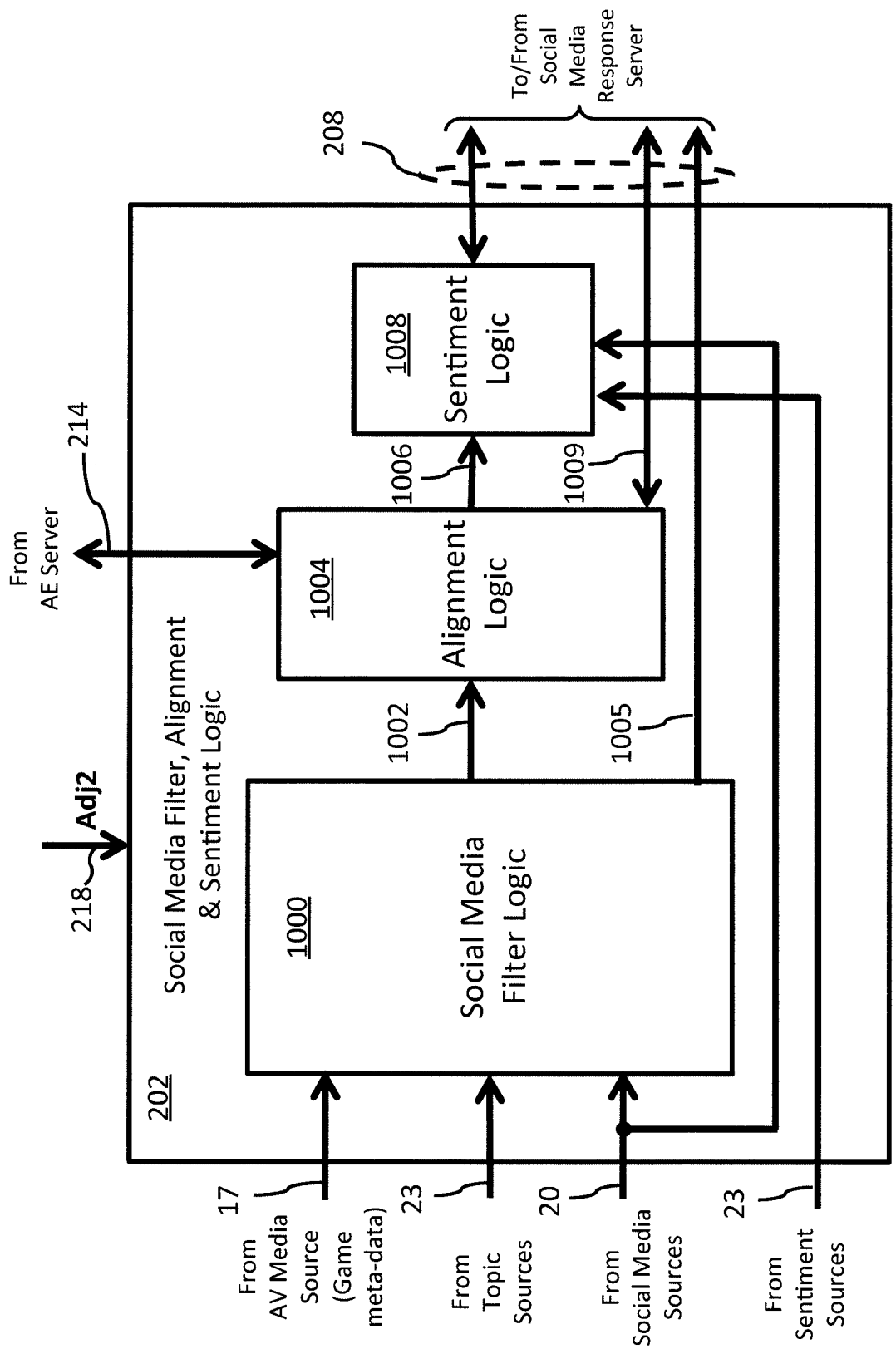
FIG. 10 is a detailed block diagram of one of the components of FIG. 2, in accordance with embodiments of the present disclosure.

Referring to FIGS. 10 and 11, as discussed above, the Social Media Filter, Alignment, and Sentiment Logic 202 (FIG. 2) analyzes social media data for responses, or potential responses, to the AEs in the game or sporting (or other) event (also referred to herein as the "social media responses" or SMRs) and saves associated data in a Social Media Response (SMR) Listing table (or SMR database) 1100 (FIG. 11), which may be located on the SMR Server 26 (FIGS. 1,2).

Referring to FIG. 11, in particular, a first column 1102 on the left of the SMR Listing table 1100 is for a Social Media Response (SMR) number, e.g., SMR1-SMRn, to uniquely identify each Social Media Response (SMR). Column 1102 is followed from left to right by columns 1104-1116 associated with various attributes, characteristics or features of each SMR, including: column 1104 which is the social media content (or a link or pointer to the content), such as a post or comment on a user's Facebook® webpage, or a tweet or comment on a user's Twitter® feed, or the like, that occurs during time window of the game, and that qualifies as a possible (or potential) SMR in response to an AE (as discussed hereinafter and with FIG. 12); column 1106 for the date and time of the SMR post; column 1108 for the Social Media source, such as Facebook®, Twitter®, a Blog post, Google+® (or Google Plus), Instagram®, Flickr®, Digg®, and the like; column 1110 for the Topic (Topic1-TopicN) of the associated SMR post, such as the post mentioning a particular sports team, player, action, and the like (or may contain multiple topics for in a given SMR post); column 1112 for the SMR User (or Individual Source) Attributes (Attributes1-AttributesN), such as the SMR user's basic demographic information (e.g., age, gender, geographic location (home address or realtime GPS location), hobbies, and the like) and any sports-related information (e.g., favorite sports, teams, players, and the like); column 1114 for an AE identifier (AE1-AEn) corresponding to an AE listed in the AE Listing table 400 of FIG. 4 that a given SMR aligns with or corresponds to (the AE column 1114 may be populated during an "alignment" process, as discussed hereinafter with FIGS. 13, 14), or N/A is there are no matches, or multiple AE's if the SMR post corresponds to multiple AEs (discussed hereinafter); and column 1116 for the SMR user sentiment of the post, e.g., positive (like), negative (dislike), or neutral. Any other description or breakdown or ranking of sentiment may be used if desired, e.g., numbers 1 to 10, 1 to 5, etc.

The SMR User Attributes information/data in column 1112 of FIG. 11 may be obtained from the SMR user's social media page (e.g., Facebook page, LinkedIn® page, or any other online source having credible and relevant information about the user). If certain SMR user attributes are not explicitly identified in social media, they may be estimated by identifying the types of social media accounts or groups the user typically interacts with. If the SMR user is also a user of the AE App, then the SME user attribute information may also be available from the AE App User Attributes table 1900 (FIG. 19), discussed hereinafter, if the AE App user has provided his/her user attributes.

If there are multiple topics in a given SMR post that are likely associated with different AEs, e.g., if an SMR user is commenting on two different AEs in a single post, the logics 1000, 1200 may separate the two comments/responses from the single post and create additional SMR entries for each comment/response. In some embodiments, the alignment logic (FIGS. 13, 14), discussed hereinafter, may associate multiple AEs to a single SMR entry in the SMR listing table.

Referring to FIG. 10, the Social Media Filter, Alignment & Sentiment Logic 202 (FIGS. 2,10) may be viewed as having three main components: Social Media Filter Logic 1000, Alignment Logic 1004, and Sentiment Logic 1008. In particular, the Social Media Filter Logic 1000, receives the game metadata (i.e., basic game information and status about the game being analyzed) from the AV media data on the line 17, generic Topic data on the line 23 (from the Topic and Sentiment Sources 22 in FIGS. 1,2), and Social Media data on the line 20, analyzes the Social Media data, and identifies social media content (e.g., posts, tweets, etc.) that are relevant to the general game (or sporting event) being analyzed by performing social media content "topic" identification using various techniques, which may include language processing techniques, as discussed hereinafter, and stores the social media content and associated information (e.g., time/date, source, topic, user attributes) in the SMR Listing table 1100 (FIG. 11), discussed above, on the SMR Server 26 as indicated by a line 1005.

The Social Media Filter Logic 1000 identifies social media content relevant to the game/event in general, not necessarily AE's within the game. Thus, the logic 1000 can be viewed as a "pre-filter" of the social media content to identify items that are relevant to the general game/event being analyzed that may have an AE occur therein. Also, in some embodiments, the Social Media Filter, Alignment & Sentiment Logic 202 (or one or more of the logics 1000, 1004, 1008 therein) may run concurrently (or in parallel) with the AE Identification & Location Logic 200. Further, in some embodiments, instead of performing the Logic 1000 as a pre-filter to find potential SMRs, the system 10 may use the Logic 1000 to identify actual SMRs after an AE has been identified. In that case, the Logic 1000 may use a narrower time filter to identify SMRs related to (or commenting on) specific AEs (instead of the entire game/event), and the Alignment Logic 1004 would not be performed. In that case, the Sentiment Logic 1008 may be performed as part of the identification process or after the SMRs have been identified. In addition, in some embodiments, the Sentiment Logic 1008 may be performed before the Alignment Logic 1004. In that case, each of the SMR entries in the SMR Listing Table 1100 would have a sentiment indicated.

When the Social Media Filter Logic 1000 has populated the SMR Listing table 1100 (or a predetermined portion thereof), it provides a signal on a line 1002 to perform the Alignment Logic 1004. In some embodiments, the Alignment Logic may run continuously or be initiated when an AE is identified in the AE Listing table 400. The Alignment Logic 1004 obtains data on a line 1009 from the SMR Listing table 1100 on the SMR Server 26 and data on the line 214 the AE Listing table 400 (FIG. 4) and aligns the SMRs (in SMR Listing table 1100) with the AE's in the AE Listing table 400 by checking AE timeframe, SMR features/attributes, and if there is a match or alignment, it stores the corresponding AE # in the AE column 1114 of the SMR Listing table (or N/A if there is no alignment) as indicated by the line 1009, and provides a signal on a line 1006 to launch the Sentiment Logic 1008. The Sentiment Logic 2008 obtains the SMR content (e.g., the post or tweet or comment or the like) on the line 208 from the SMR Listing table 1100 (FIG. 11) on the SMR server 26 and obtains generic social media content data (pre-labeled and classified by sentiment) on the line 23, and may perform language processing techniques, such as that discussed hereinafter with FIGS. 15,16, to determine the sentiment of the SMR content, and updates the SMR Server with the sentiment classification of the SMR content as indicated by the line 208.

Figure 12:
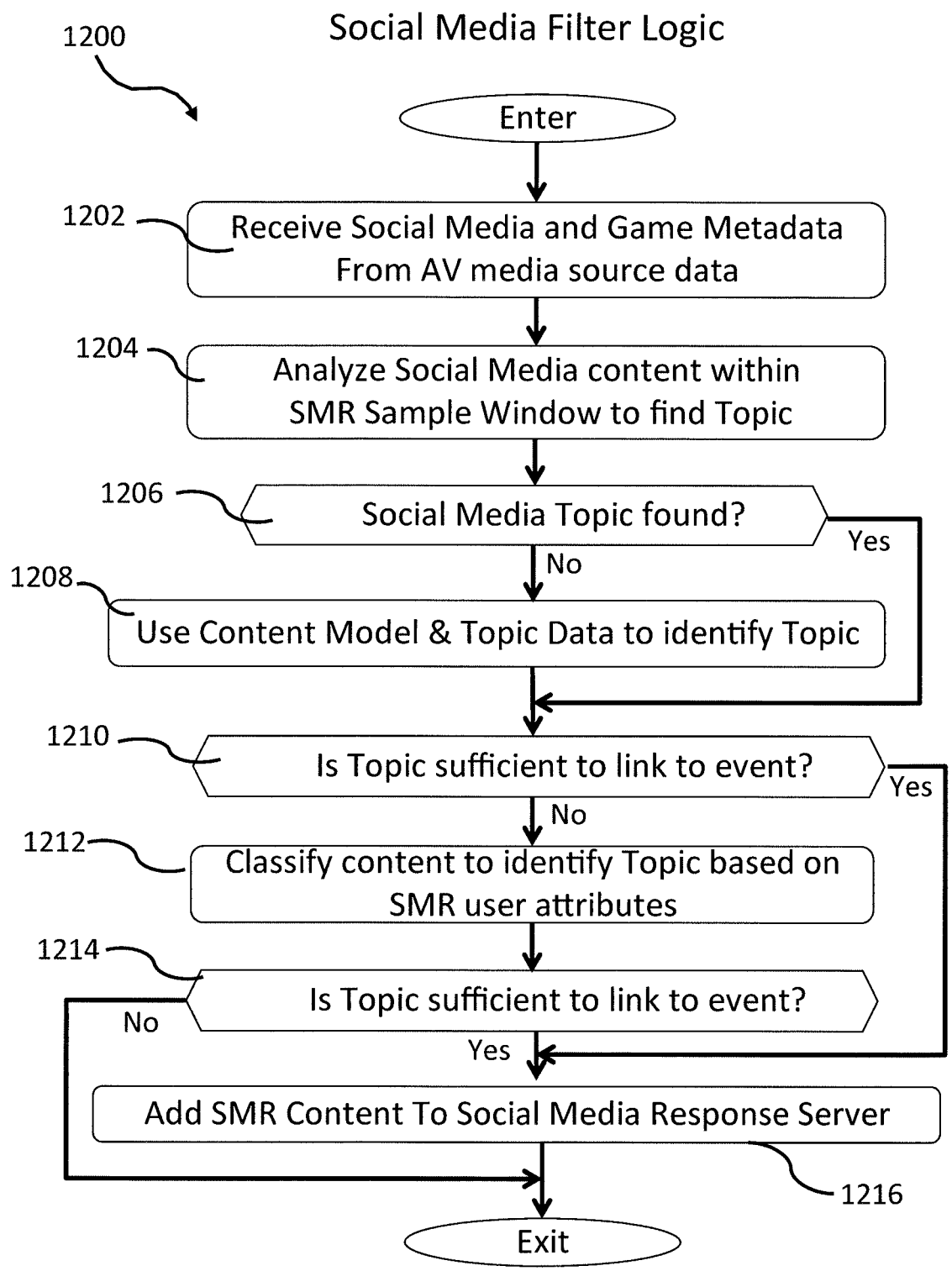
FIG. 12 is a flow diagram of one of the components in FIG. 10, in accordance with embodiments of the present disclosure.

Referring to FIG. 12, a flow diagram 1200 illustrates one embodiment of a process or logic for identifying potential social media responses to the AE's in the AV media source data of the sporting event or game, which may be implemented by the Social Media Filter Logic 1000 (FIG. 10). The process 1200 (FIG. 12) begins at a block 1202, which receives the Social Media data and the game details metadata from the AV Media source data (e.g., sport, teams playing, location, game start time, and the like). Next, a block 1204 analyzes or samples or detects the Social Media content data during a window of time (SMR detection window or SMR sample window), e.g., within the time constraints of the AV media event (or game), to find the topic of the social media content. For example, the block may parse the SMR content and perform word analysis to identify the general topic (comment about a given sport, or team or player or the like), or may perform word matching against the game metadata to identify any matches (e.g., same sport, same team, and the like). In some embodiments, the block 1204 may analyze Social Media content even after the event has completed, as social media responses to an AE may occur after the event (or game) is over. In that case, the SMR detection or sample window may be, e.g., minutes, hours, or days after the event (or game), if desired, as discussed more hereinafter, e.g., with the alignment process (FIG. 14) and with user settings (FIG. 23).

Next, a block 1206 determines whether the Social Media topic was found for a particular social media response content (e.g., a tweet or comment online). If a topic was not able to be found, a block 1208 uses generic social media topic identification data (e.g., content model and topic data) to attempt to identify the topic of the social media post. For example, in one embodiment, a generic approach would be to collect social media content samples (e.g., tweets, replies) from a social media account (or source) known to be associated with sports, or a specific sport. An example includes a social media account for the sports section of a news organization. Named entities (e.g., names, locations) can be removed so that only more generic sports terms remain. Using the resulting processed data set, a text classification approach employing combinations of techniques such as term frequency inverse document frequency (tf-idf), latent semantic indexing (lsi), and support vector machines (SVMs) may be used to model and automatically recognize word usage indicative of an given sport, similar to that discussed herein with FIG. 7 (process for implementing the Language Processing Logic 304 of FIG. 3).

After performing block 1208 or if the result of block 1206 was YES, a block 1210 determines if the topic of the social media post is sufficient to link the post to the sporting event or game. For example, if the content topic matches one or more of the game metadata topics (e.g., same sport, same team, same player, same location, or the like), the logic may conclude that is sufficient. The amount of the matching or correlation between the identified content topic and the event metadata that is sufficient may be pre-defined (or pre-set or pre-stored) as a default or may be learned over time by the logic, using machine learning such as that described herein, or other learning techniques.

If the result of block 1210 is NO, a block 1212 classifies the content of the social media post based on the SMR user's social media attributes, such as an indication on the user's Facebook® page of his/her favorite sports team or favorite player(s), e.g., see the discussion herein with FIG. 11, regarding identifying SMR user attributes in column 1112 of the SMR Listing table 1100 (FIG. 11), and with FIG. 19, regarding the AE App User Attributes Listing table 1900 (FIG. 19). Next, a block 1214 determines if the topic of the social media post is sufficient to link the post to the sporting event or game. For example, if the content topic matches one or more of the game metadata topics (e.g., same sport, same team, same player, same location, or the like), the logic may conclude that is sufficient. The amount of the matching or correlation between the identified content topic and the event metadata that is sufficient may be pre-defined (or pre-set or pre-stored) as a default or may be learned over time by the logic, using machine learning such as that described herein, or other learning techniques.

If the result of block 1214 is NO, then the topic of the social media post being analyzed could not be identified sufficient to link it to the sporting event being analyzed for AEs, and the process 1200 exits and that social media post is not added to the SMR Response table 1100 (FIG. 11). If the result of block 1214 is YES, or if the result of block 1210 is YES, then an SMR relating to the sporting event (or game) being analyzed for AEs has been identified, and a block 1216 adds the social media content to the SMR Response table 1100 (FIG. 11) on the SMR Server 26 (FIGS. 1, 2).

The Social Media Filter Logic 1000 may use natural language processing (e.g., speech tagging or other processing), vector space modeling (VSM), and document similarity analysis, e.g., using term frequency-inverse document frequency transformation and cosine similarity measurement, which may be similar to that discussed with the Sentiment Logic 1008 and the process 1500 (FIG. 15), discussed hereinafter. Any other techniques may be used if desired to identify the topic of the social media content and to determine whether the content is related to the game being analyzed.

Figure 13:
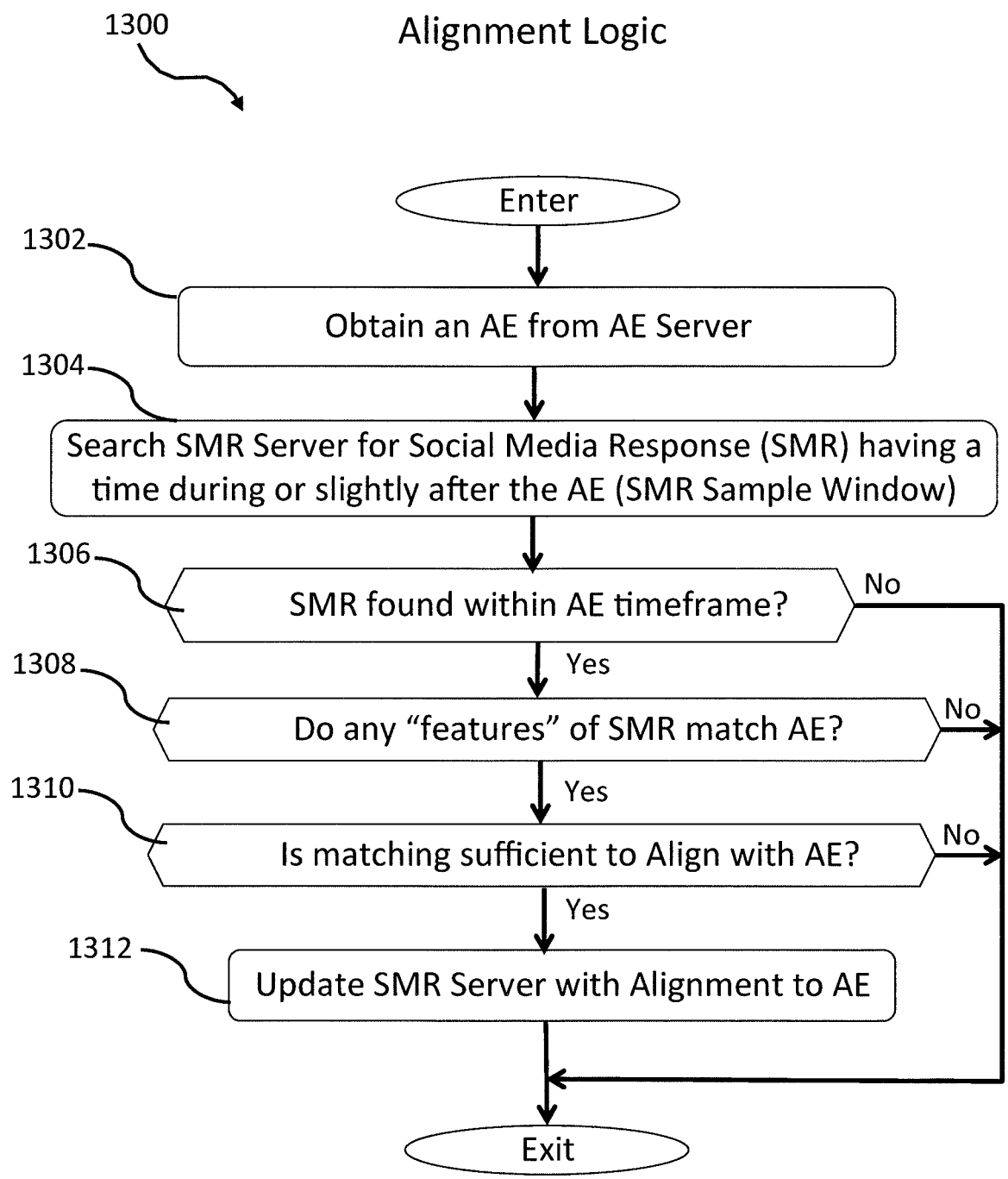
FIG. 13 is a flow diagram of one of the components in FIG. 10, in accordance with embodiments of the present disclosure.
Figure 14:
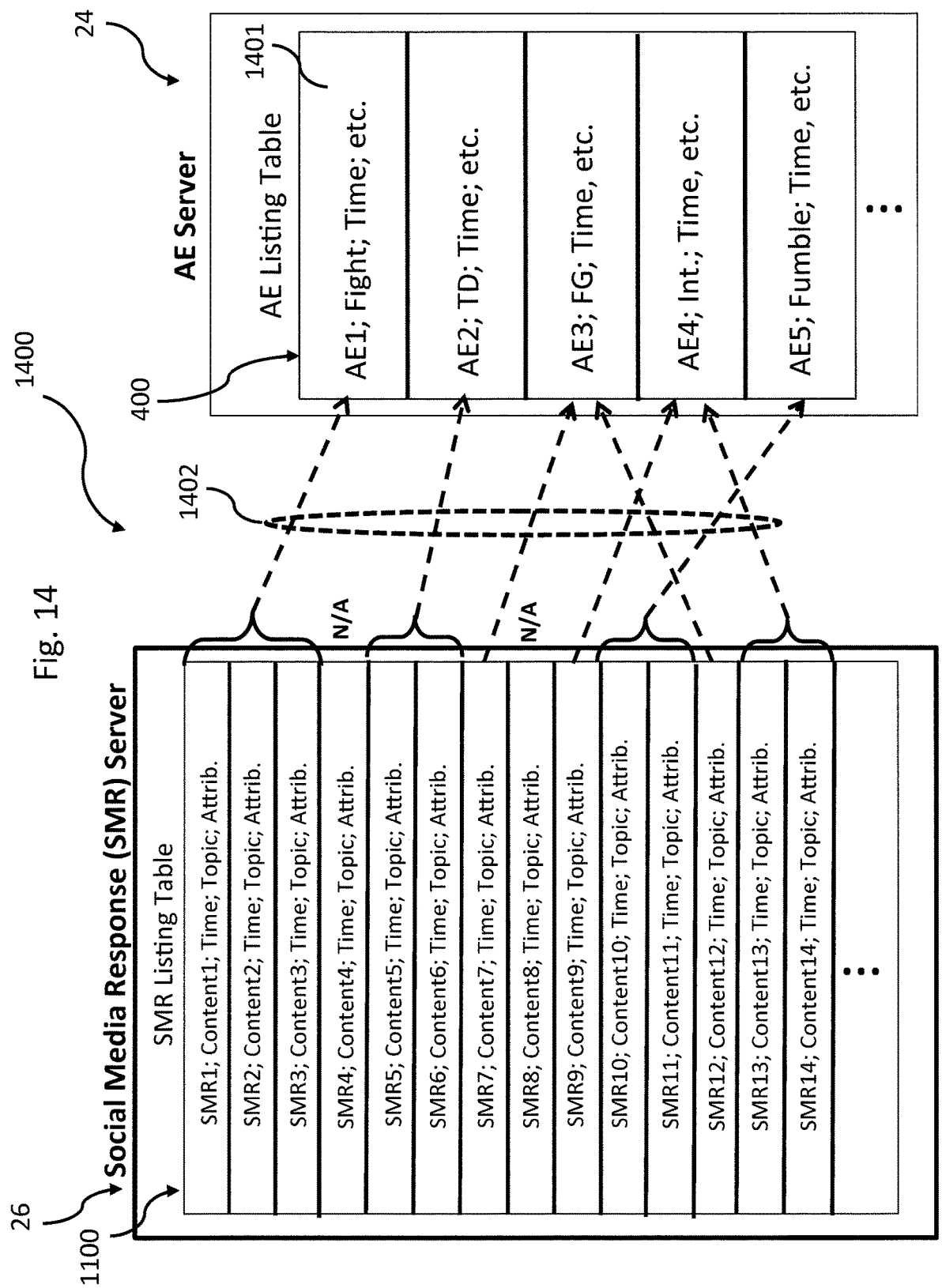
FIG. 14 is an illustration showing the alignment of entries in the social media responses table with the entries in the anomalous events table, in accordance with embodiments of the present disclosure.

Referring to FIGS. 13 and 14, a flow diagram 1300 and a block diagram 1400 illustrate one embodiment of a process or logic for aligning the identified AEs in the AE Listing table 400 (FIG. 4) stored on the AE Server 24 with the SMRs in the SMR Listing table 1100 (FIG. 11) stored on the SMR Server 26, to obtain a final list of SMRs related to (or aligned with) the identified AEs, which may be implemented by the Alignment Logic 1004 (FIG. 10). The process 1300 (FIG. 13) begins at a block 1302, which obtains an Anomalous Event (AE), e.g., AE1 (FIG. 14) from the AE Listing table 400 on the AE Server 24. Next, a block 1304 searches the Social Media Response (SMR) Listing table 1100 for an SMR having a time during or slightly after the timeframe when the AE occurred (SMR detection window or SMR sample window). The SMR detection or sample window can be larger if desired, e.g., minutes, hours, or days after the AE, if desired, as discussed more hereinafter, e.g., with the alignment process (FIG. 14) and with user settings (FIG. 23). Next, a block 1306 determines whether an SMR was found that falls within the AE timeframe recited above. The SMR detection or sample window for the creation of the SMR table (block 1204 in FIG. 12) and for the alignment process (block 1304 in FIG. 13), may be the same window, as shown in FIGS. 12 and 13, or they may be different sample windows if desired. If different sample windows are used, the respective processes (FIGS. 12 and 13), and corresponding logics (1000 and 1004), would use their respective time windows, e.g., SMR Creation Sample Window and SMR Alignment Sample Window, respectively. In that case, the AE App user settings (FIG. 23) relating to setting the sample window time period, discussed hereinafter, and any other affected logics or processes described herein, would be adjusted accordingly to accommodate the two sample windows.

If the result of block 1306 is NO, the process Exits. If YES, a block 1308 determines whether any features of the SMR match similar features of the AE, e.g., same sport, same team, same players, AE action matches SMR topic, or the like. If NO, the process exits. If there is some amount of matching, a block 1310 determines if the matching is sufficient to align the SMR to the AE being reviewed. For example, if at least one feature (e.g., topic, attribute, or the like) of the SMR content matches similar features of the AE, e.g., same sport, same team, same players, AE action matches SMR topic, or the like, the logic may conclude that there is sufficient alignment between the SMR and the AE to determine that the SMR is commenting on the AE. The amount of the matching or correlation between the SMR features and the AE features that is sufficient to conclude alignment may be pre-defined (or pre-set or pre-stored) as a default or may be learned over time by the logic, using machine learning such as that described herein, or other learning techniques.

If the result of block 1310 is NO, there is not sufficient matching to align the SMR with the AE and the process exits. If YES, there is sufficient matching (or alignment) between the SMR and the AE, and the SMR table 1100 (FIG. 11) is updated with the AE number that the SMR aligns with, and the process exits. The process 1300 is repeated until all the AEs in the AE Listing table 400 have been reviewed against all the SMRs in the SMR Listing table 1100. For SMRs that do not find a match with any of the AEs, an N/A or zero is placed in the AE column 1114 of the SMR Listing table 1100 to indicate that those SMRs have no aligning or corresponding AE, and are disregarded for sentiment and visualization purposes (discussed hereinafter).

More specifically, FIG. 14 shows a sample result of the alignment process, where dashed line arrows 1402 show alignment between individual SMRs and AEs. In particular, SMR1, SMR2, and SMR3 align with AE1, SMR4 did not align with any AE, thus it is N/A, SMR5 and SMR6 align with AE2; SMR7 and SMR12 align with AE3; SMR9, SMR13 and SMR14 align with AE4; and SMR10 and SMR11 align with AE5. The alignment results are also shown in FIG. 11 in the AE Alignment Column 1114 in the SMR Listing table 1100 (FIG. 11), where each SMR (SMR1-SMRn) has an associated AE number (e.g., AE1-AEn), indicating which AE is aligned with a given SMR, or an N/A, indicating there was no alignment with the AE Listing table 400 for that SMR. The amount of time the logic 1000 (FIG. 10) and process 1200 (FIG. 12) looks for (or samples) to find SMRs after an AE has occurred (also referred to herein as SMR time window, SMR sample window, or SMR detection window) may be set by the user settings (discussed hereinafter) or may be pre-defined (or pre-set or pre-stored) as a default time window, or may be learned over time by the logic, using machine learning such as that described herein, or other learning techniques. If the SMR sample window is set for a long enough time, it is possible to have another AE occur while the logic 1000 is still looking for SMRs of the prior AE. In that case, the logic 1000 may be looking for SMRs for multiple AEs at the same time. In particular, for the example shown in FIG. 14, during the time between detection of SMR7 and SMR12, AE4 and AE5 occurred, which is shown because SMR8-SMR11 were identified (or detected) before SMR12, and SMR9 aligns with AE4 and SMR10-SMR11 align with AE5. Similarly, during the time between detection of SMR9 and SMR13-SMR14, AE5 occurred, because SMR10-SMR11 were identified (or detected) before SMR13-SMR14, and SMR10-SMR11 aligns with AE5.

Figure 15:
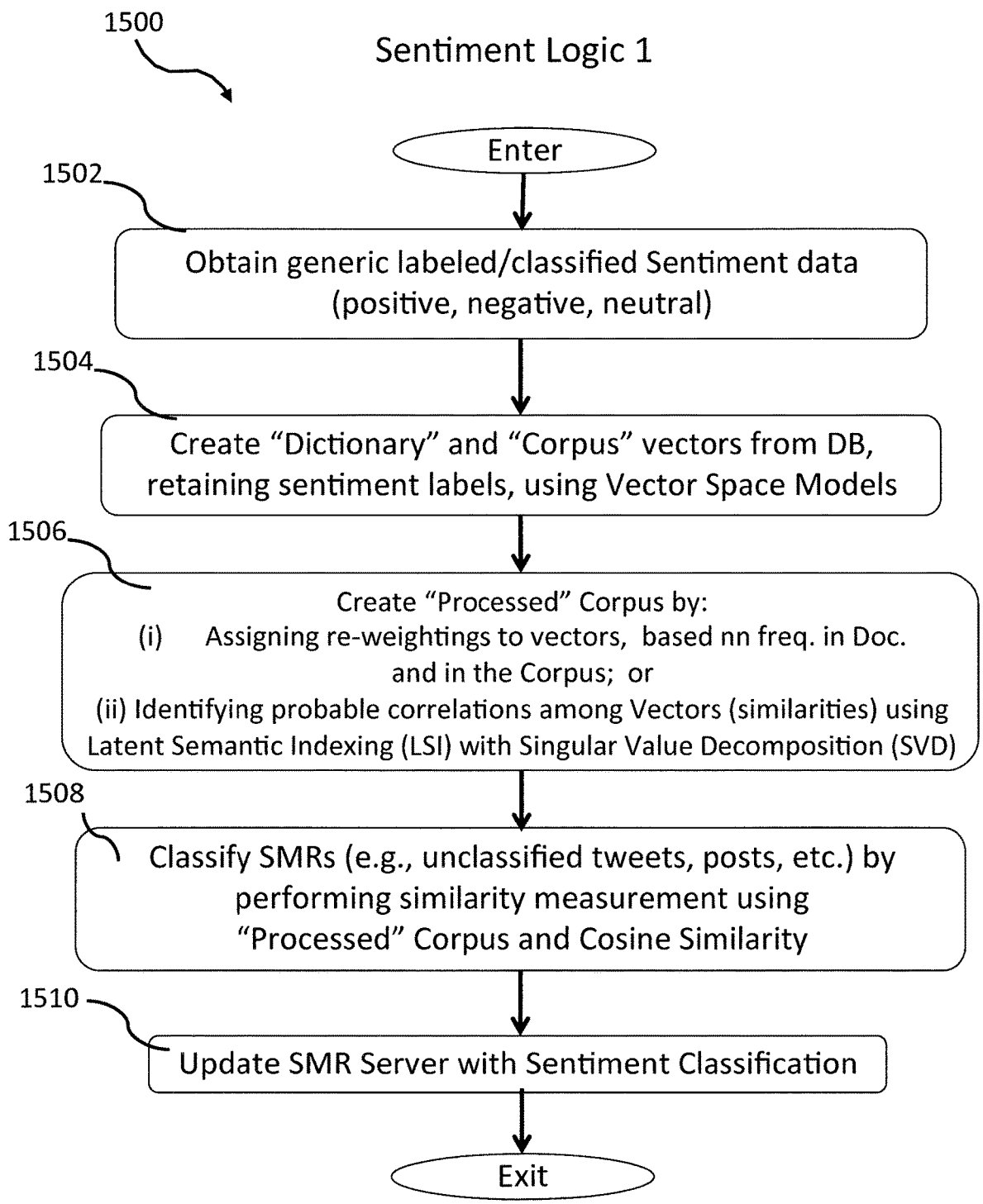
FIG. 15 is a flow diagram of one embodiment of one of the components in FIG. 10, in accordance with embodiments of the present disclosure.

Referring to FIG. 15, a flow diagram 1500 illustrates one embodiment of a process or logic for determining (or classifying) the sentiment of the aligned social media responses (SMRs) to the AE's, which may be implemented by the Alignment Logic 1004 (FIG. 10). The process 1500 begins at a block 1502, which obtains generic Social Media content data (e.g., from a database or other source), which is pre-labeled or classified by sentiment (e.g., positive, negative, neutral). Next, a block 1504 creates "dictionary" and "corpus" vectors from the database, retaining the sentiment labels, using Vector Space Models (VSMs). Next, a block 1506 creates a "processed" corpus by: (1) assigning re-weightings to vectors, based on the use frequency in the document and in the corpus; or (2) identifying probable correlations among Vectors (similarities) using Latent Semantic Indexing (LSI) with Singular Value Decomposition (SVD). Next, a block 1508 classifies the sentiment of the Social Media Responses (SMRs) (e.g., tweets, posts, and the like) by performing similarity measurement using the "Processed" corpus from block 1506 using Cosine Similarity. Next, a block 1510 updates the SMR Listing table 1100 (FIG. 11) on the SMR server 26 with the sentiment classification information for each of the aligned SMRs in the SMR table 1100 on the SMR Server 26.

Figure 16:
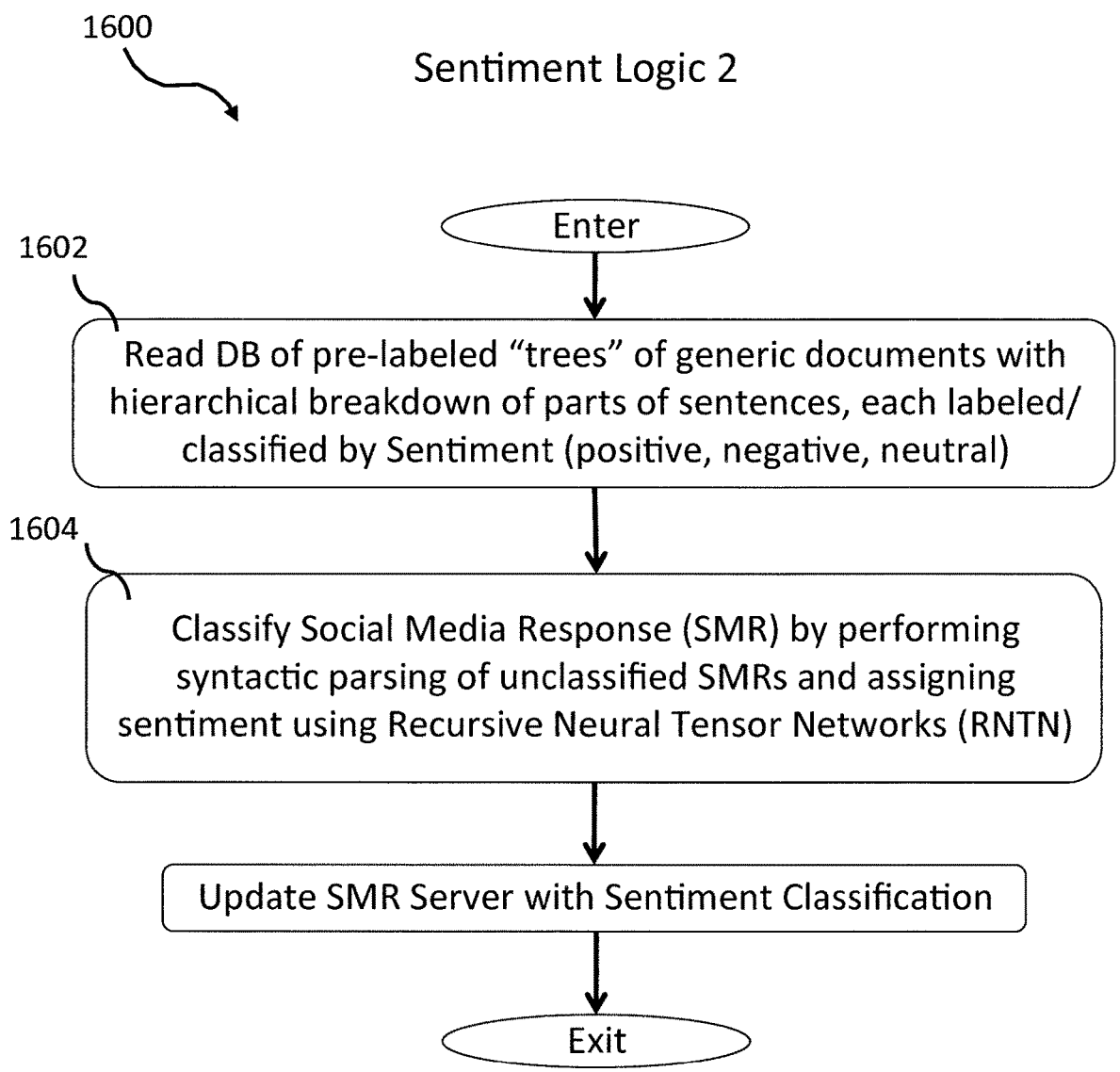
FIG. 16 is a flow diagram of another embodiment of one of the components in FIG. 10, in accordance with embodiments of the present disclosure.

Referring to FIG. 16, a flow diagram 1600 illustrates an alternative process or logic for determining (or classifying) the sentiment of the aligned SMRs in the SMR Listing table 1100 (FIG. 11) that are aligned to the AE's, which may be implemented by the Alignment Logic 1004 (FIG. 10). The process 1600 begins at a block 1602, which obtains data (e.g., from a database or other source) of pre-labeled "trees" of generic documents (e.g., tweets, posts, and the like), with a hierarchical breakdown of sentences, each labeled or classified by sentiment (e.g., positive, negative, neutral). Next, a block 1604 classifies the SMRs by performing syntactic parsing of Social Media Responses (SMRs), e.g., tweets, posts, and the like, and assigning Sentiment using Recursive Neural Tensor Networks (RNTN), such as that described in R. Socher, "Recursive deep models for semantic compositionality over a sentiment treebank", 2013 Conference on Empirical Methods in Natural Language Processing.

Next, a block 1506 updates the SMR Listing table 1100 (FIG. 11) on the SMR server 26 with the sentiment classification information for each of the aligned SMRs in the SMR listing table 1100.

The results of the sentiment logic process of FIG. 15 or 16 are shown in the Sentiment Column 1116 in the SMR Listing table 1100 (FIG. 11), where each aligned SMR has an associated sentiment classification (like, dislike, neutral), and the non-aligned SMRs are skipped and thus are indicated as N/A (or zero) in the Sentiment Column 1116. Any other technique or process may be used to determine the sentiment of the SMR provided it meets the functional and performance requirements described herein.

Figure 17:
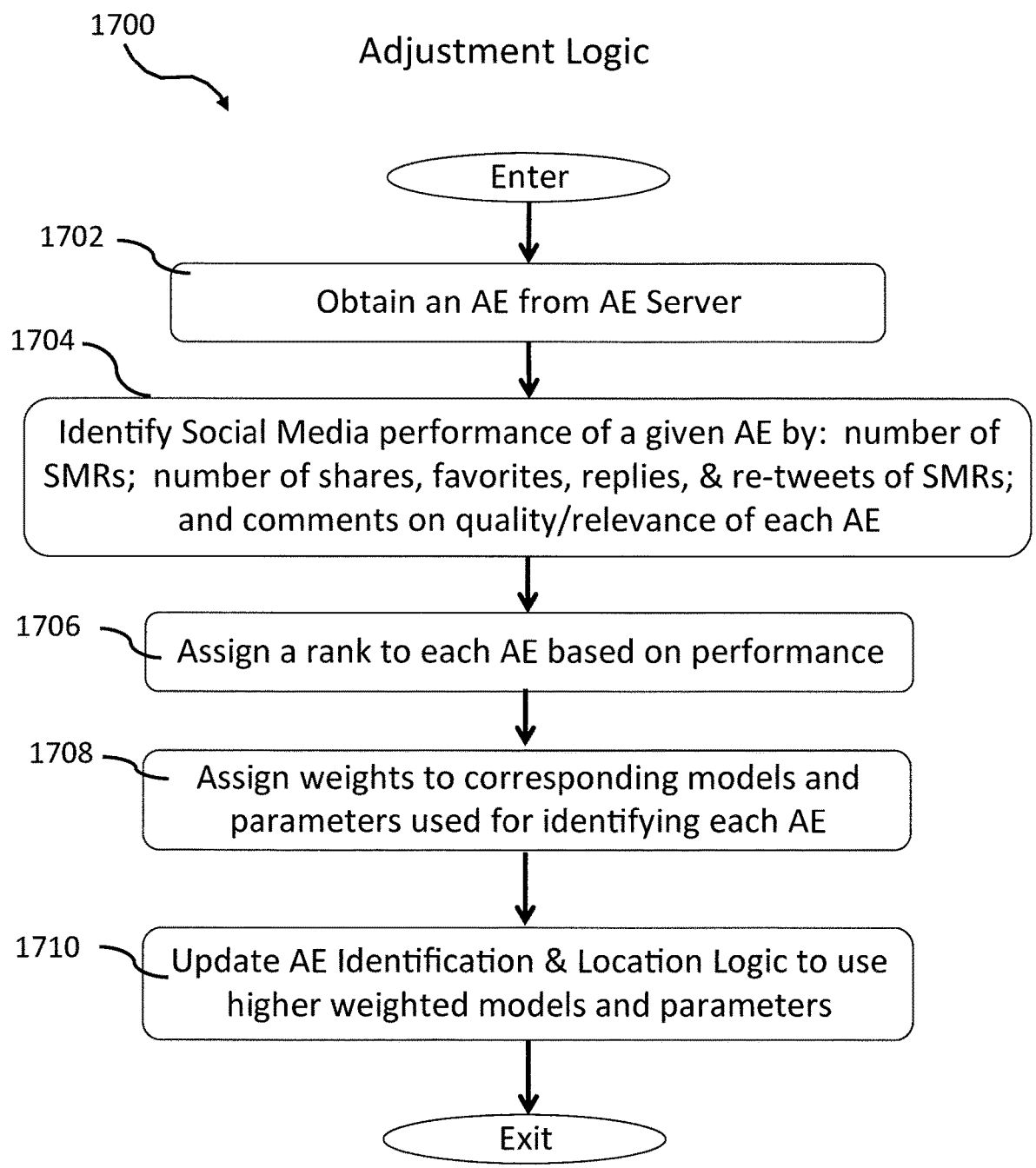
FIG. 17 is a flow diagram of one of the components in FIG. 2, in accordance with embodiments of the present disclosure.

Referring to FIG. 17, a flow diagram 1700 illustrates one embodiment of a process or logic for adjusting the models for determining the AEs, which may be implemented by the Adjustment and Alert Logic 204 (FIG. 2). The process 1700 begins at a block 1702, which obtains an Anomalous Event (AE), e.g., AE1, from the AE Listing table 400 on the AE Server 24. Next, a block 1704 determines the social media performance (or SMR activity) of a given AE by analyzing the SMRs associated with the AE, including, the number of SMRs for that AE, the number of shares, favorites, replies, and re-tweets (and the like) of each SMR associated with the AE, which can be obtained by accessing Application Program Interfaces (APIs) associated with the particular social network or social media site (e.g., Facebook, Twitter, and the like). Social media performance (or SMR activity) of a given AE may also be determined by analyzing the SMR comments on "quality" and relevance of each AE to the SMR users/individuals, which can be obtained by processing comments and replies associated with the specific AE, and the like. The comments and replies data can also be obtained by accessing the APIs associated with the particular social network or social media site (e.g., Facebook, Twitter, and the like). Also, certain SMRs may have different weightings or importance than other SMRs based on who made the comment or when the comment was made (e.g., a comment posted immediately after the AE may have more weight than one posted or an hour or day after the AE occurred or after the game or event ended).

Next, a block 1706 assigns a rank to each AE based on the AE performance results from block 1704. Next, a block 1708 assigns weights to corresponding models and parameters used for identifying each AE. Next, a block 1710 updates the models and parameters of the AE identification & Location Logic 200 (FIG. 2) to use the higher weighted models and parameters for future AE determinations.

In some embodiments, the weightings that are adjusted (or retuned) by the adjustment logic may be a simple linear weighting, as shown in Eq. 1, as discussed above. Also, in some embodiments, AE's are determined by machine learning models. In that case, when extracting AV media segments for AE's, one or more machine learning models may be used, which may have different parameters. For example, a Support Vector Machine (SVM) may be used as a machine learning tool having parameters "c" and "gamma" of the SVM kernel, which can be "tuned" (or adjusted) based on the performance of the SVM classifier, which is directly related to the "quality" of the output AE media segment. These parameters, and the corresponding SVM model that is used for extracting an AE segment, may be stored on the AE server. The retuning or adjusting of the parameters of the AE Identification and Location Logic 200 may be done globally (or generally) for all AE App users (e.g., such that it applies as default parameters for all AEs), or may be done as targeted or personalized for a given user or user group having some common characteristics or attributes. Any other technique for adjusting the logic 200 or for adjusting the parameters, algorithms, factors, weightings, or the like identifying or locating the AE in the AV Media, may be used if desired.

In some embodiments, the adjustment logic 204 may also provide an adjustment on a line 218 (Adj2) (FIGS. 2 and 10) to the Social Media Filter, Alignment & Sentiment Logic 202, to improve or optimize the performance of the logic 202, based on, e.g., user feedback, user attributes settings, or any other features or characteristics described herein. In particular, the logic 204 may adjust how the logic 202 performs social media content & topic analysis, time constraints, alignment analysis, and sentiment analysis and categorization. The retuning or adjusting of the parameters of the Social Media Filter, Alignment & Sentiment Logic 202 may be done globally (or generally) for all AE App users (e.g., so it applies as default parameters for all AEs or for all SMR users), or may be done more targeted or personalized for a given user or user group having some common characteristics or attributes. Any techniques for adjusting the parameters, algorithms, factors, weightings, or the like for adjusting the logic 202 or for adjusting the identifying SMRs, determining SMR sentiment, or performing SMR/AE alignment, may be used if desired.

Figure 18:
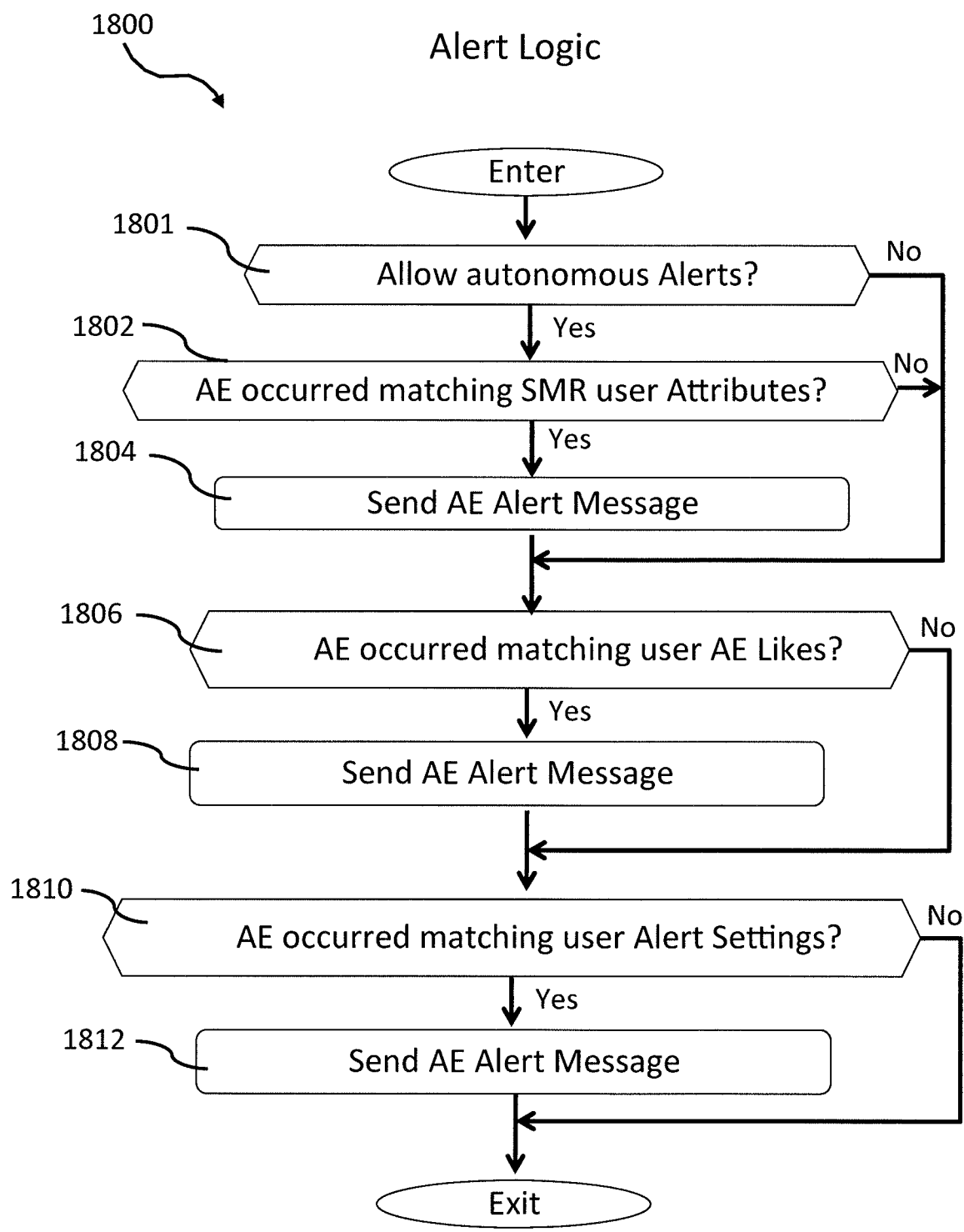
FIG. 18 is a flow diagram of one of the components in FIG. 2, in accordance with embodiments of the present disclosure.

Referring to FIGS. 18 and 19, a flow diagram 1800 (FIG. 18) illustrates one embodiment of a process or logic for alerting the user 40 (FIGS. 1,2) that an AE is occurring (or may be ready to occur), which may be implemented by the Adjustment and Alert Logic 204 (FIG. 2), and which may use data from a User Attributes (UA) Listing table (or UA database) 1900 (FIG. 19), discussed below, which may be stored on the User Attributes Server 28 (FIGS. 1,2).

Referring to FIG. 19, the User Attributes Listing table 1900 may be created (or populated) by the AE App 36, as discussed hereinafter, and may be used by various logics or processes of the present disclosure, as described herein. In particular, a first column 1902 on the left of the User Attributes Listing table 1900 is a User ID, e.g., User1-UserN, to uniquely identify each user 40 (FIGS. 1, 2) of the AE App. Column 1902 is followed from left to right by columns 1904-1920 associated with various attributes or characteristics of each User 40, such as columns 1904, 1906, and 1908 for the user's favorite Sports, Teams, and Players, respectively, or sports, teams or players the user is interested in following using the AE App, column 1910 for the user's physical location, such as City or State, or geographic region, such as the Northeast, Midwest, East Coast, or the like, column 1912 for the age or age range of the user, column 1913 for the gender of the user, column 1914 for the hobbies of the user, such as participating in or watching sports, fishing, hiking, or any other hobbies of interest to the user. Next, columns 1916,1918 are for the AE's that the user likes and dislikes, respectively, as discussed more hereinafter, and column 1920 for user Alert Settings, indicating which AE's the user would like to be alerted about when they occur. Other information regarding the AE App user 40 may be provided as well, such as contact information (not shown) for AE Alerts (e.g., email address, cell phone, and the like), or other attributes discussed herein (e.g., AE Type/Action, Game Situation/Circumstances, or the like) or that may be needed or useful for performing the functions of the present disclosure. Also, if certain user attributes are not provided by the user, they may be estimated by identifying the reviewing the users various social media accounts (if available), and types of social media groups the user typically interacts with.

More specifically, the User Attributes Listing table 1900 of FIG. 19 is populated with a sample of possible user attributes information or data. For example, User1 (e.g., John Smith) likes to follow football and hockey, and in particular, Team A and Team B, and also the players, Player A (who plays for Team A) and Player B (who plays for Team B), respectively. The user's physical location is in State A, is in the age range of 22-30, is a male, and has sports as a hobby. In addition, AE App User1 is interested in seeing more AE's like AE1 and AE4 (see FIG. 4, AE Listing table 400), and would not like to see more AE's like AE2, AE5. Also, AE App User1 has AE alert settings to provide an alert to the User Device when an AE happens with Team A. In addition to or instead of the UserID, a user's name (e.g., John Smith, or an alias or nick name or the like) may be used in the table 1900 to identify the user. There may also be an ID code appended to the name to ensure it is unique. Similarly, AE App User2 likes to follow football and baseball, and in particular, Team C and Team D, and also the players, Player C (who plays for Team C) and Player D (who plays for Team D), respectively. The AE App user's physical location is in State C, is in the age range of 41-50, is a male, and has fishing as a hobby. In addition, AE App User2 is interested in seeing more AE's like AE1, AE3 and AE5 (see FIG. 4, AE Listing table 400), has not indicated that there are any AE's that User2 does not want to see, and has no AE alerts set up. Similarly, AE App User3 likes to follow football, and in particular, Team E, and also the player, Player E. The AE App user's physical location is in State E, is in the age range of 51-60, is a female, and has hiking as a hobby. In addition, AE App User3 is interested in seeing more AE's like AE2 (see FIG. 4, AE Listing table 400), and would not like to see more AE's like AE1, AE4, and AE5. Also, AE App User3 has AE alert settings to provide an alert to the User Device when an AE happens with Team E.

Referring again to FIG. 18, the Alert Logic process 1800 may be executed when an AE has been detected (e.g., when the AE Listing table 400 (FIG. 4) has been updated with a new AE) and begins at a block 1801, which determines the user has enabled autonomous alerts. If YES, a block 1802 determines if an AE occurred matching any of, or matching a predetermined number of, or satisfying an algorithm or formula for, the user attributes in the User Attributes Listing table 1900 (FIG. 19), such as any of the Teams or Players listed in the table 1900 for the user are involved in an AE, or the AE matches the Sport, and the Team or Player, and the AE Type or Game Situation, or a predetermined number of other users in the same age group or located in same geographic region liked this AE. Any other combination of attributes or any other technique may be used if desired to create or trigger an autonomous AE alert. The process 1800 may also employ machine learning techniques to identify AE's that the user would like to receive an autonomous AE alert for.

In some embodiments, the block 1802 may review certain "features" or attributes (e.g., age group, gender, time/day, physical location (home/office or realtime GPS location), hobbies, and the like) of the SMR audience that provided a significant number of responses (measured over many AE's or many games) and correlate it to the features/attributes of the AE's (e.g., from the AE Listing table 400) they were commenting about, e.g., sport, team, players, AE Type/ Action, game situation/circumstance, or the like. For example, over time, it may be determined by the logic herein that certain types of audiences or individuals (e.g., age and gender demographics) exhibit sentiment about AEs involving certain entities (e.g., team, player) and at certain times (e.g., evenings, weekends), and at certain locations (e.g., at home, at a game). Once this has been determined, it can be used to send AE alerts for a limited set of AEs to specific audiences or individuals and under certain contexts, when those conditions are met.

In some embodiments, logistic regression techniques may be used determine the probability that an individual will like (or respond to or express sentiment about) a given AE (having certain features or attributes as discussed above), and can, therefore, be used to determine which AE Alerts to send to which (if any) users when an AE happens, when the conditions are met to do so.

More specifically, the logic can review the SMR Listing table and determine the features or attributes of the AEs that elicit a significant social media response (SMR), and then determine if there is a select group of the SMR users (or social media audience or individual source) attributes that apply. For example, the features/attributes of a game (or event) may be: the Sport (e.g., football, soccer, tennis, basketball, hockey, baseball, track & field, auto racing, horse racing, bowling, sailing, or any other sport), AE Action/Type (e.g., score, block, sack, turnover, etc.), Game Situation/ Circumstance (e.g., close score, overtime, deciding game, etc.). Also, the features/attributes of the SMR user (or social media audience) may be: age group (e.g., 18-24, 21-24, etc.), physical location (e.g., Boston, Chicago, Miami, Bristol, N.Y., etc.), and hobbies (e.g., sport-type, video games, travel, etc.), which in this case may be used for labeling the types of audience members, but not for driving logistic regression modeling. Certain features may be selected as "control" features. For example, for SMR user (audience) features/attributes, the logistic regression logic may solve for updating preferences for AE features/attributes only for 18-24 year olds (the control), in which case "hobbies" may represent the unique types of audience members.

More specifically, for example, below shows one example of a logistic regression modeling and estimating approach. The logistic regression modeling problem may be phrased as calculating the probability that a user (or type of user) expresses strong (positive or negative) sentiment on a given AE. For simplicity, we only consider individual users in the following discussion. A general linear regression model may be expressed using the following Equation 2 (Eq. 2):

$$P(c_i|x_i) = [\text{logit}^{-1}(\alpha+\beta^\tau x_i)]^{c_i} * [1-\text{logit}^{-1}(\alpha+\beta^\tau x_i)]^{1-c_i} \qquad \text{Eq. 2}$$

where $c_i = \{0, 1\}$; and where $c_i = 0$ (meaning no sentiment was expressed for the AE), and $c_i = 1$ (being the opposite), and $x_i$ is the vector of features or attributes of a social media audience member (or SMR user), i.e., the AE's that this SMR user has commented on in the past. Because $c_i$ can only be 1 or 0, the above equation mathematically reduces to the following linear function, shown as Equation 3 (Eq. 3), which may be used for the logistic regression model for the logic described herein:

$$\text{logit}(P(c_i=1|x_i)) = \alpha+\beta^\tau x_i \qquad \text{Eq. 3}$$

The values for $\alpha$ and $\beta$ in Eq. 3 above may be estimated by solving Eq. 3 with a maximum likelihood estimation (MLE) and convex optimization algorithm. The MLE function can be defined as follows, shown as Equation 4 (Eq. 4):

$$L(\Theta|X_1, X_2, \ldots, X_n) = P(X|\Theta) = P(X_1|\Theta) \ldots P(X_n|\Theta) \qquad \text{Eq. 4}$$

where $X_i$ are independent, $i=1, \ldots, n$ and represents n users, and $\theta$ denotes the pair $\{\alpha, \beta\}$. From Eq. 4, we can mathematically obtain the following MLE function shown as Equation 5 (Eq. 5) below, which can be solved or optimized, under reasonable conditions (variables are not linearly dependent), using techniques such as Newton's method or stochastic gradient descent, such as is described in Ryaben'kii, Victor S.; Tsynkov, Semyon V., *A Theoretical Introduction to Numerical Analysis*, 2006.

$$\Theta_{MLE} = \arg\max_\Theta \Pi_1^n p_i^{c_i} \bullet (1-p_i)^{1-c_i} \qquad \text{Eq. 5}$$

If block 1802 determines that the AE features/attributes match the appropriate amount of SMR User features/attributes, as described herein, a block 1804 sends an AE alert message indicating that an AE has occurred. The AE alert message may be sent directly to the User Device 34 (e.g., text message or SMS or the like) or to a personal online account of the user, e.g., email or the like. In other embodiments, the AE alert message may be sent or posted via social media, such as Facebook, Twitter, Instagram or other on line social media outlet, and may be sent to certain social media groups or news feeds (e.g., sports or team or player related social media groups, or the like).

The graphical format and content of the AE alert may be a pre-defined, such as a pop-up box having text or graphics, such as: "An AE has occurred. Click this alert box to get more information," or it may specify the game, such as: "An AE has occurred in the football game: Team A vs. Team C. Click this alert box to get more information." In some embodiments, if the user clicks on the alert box, the AE App is launched and the user can explore the AE in more detail, e.g., with the AE GUIs discussed herein. Any other format and content for the AE alerts may be used if desired. The content and format of the AE alert may also be set by the user if desired.

After performing the block 1804, or if the result of blocks 1801 or 1802 are NO, a block 1806 determines whether the AE matches (or substantially matches) an AE that the user has indicated he/she would like to see more of in the AE Likes column 1916 of the User Attributes Listing table 1900 (FIG. 19). If YES, a block 1808 sends an AE alert message, as discussed above with block 1804. After performing the block 1808, or if the result of block 1806 is NO, a block

1810 determines whether the AE matches the AE Alert Settings that the user has set up and is shown in the Alerts column 1920 of the User Attributes Listing table 1900 (FIG. 19). If YES, a block 1812 sends an AE alert message, as discussed above with block 1804.

Figure 20:
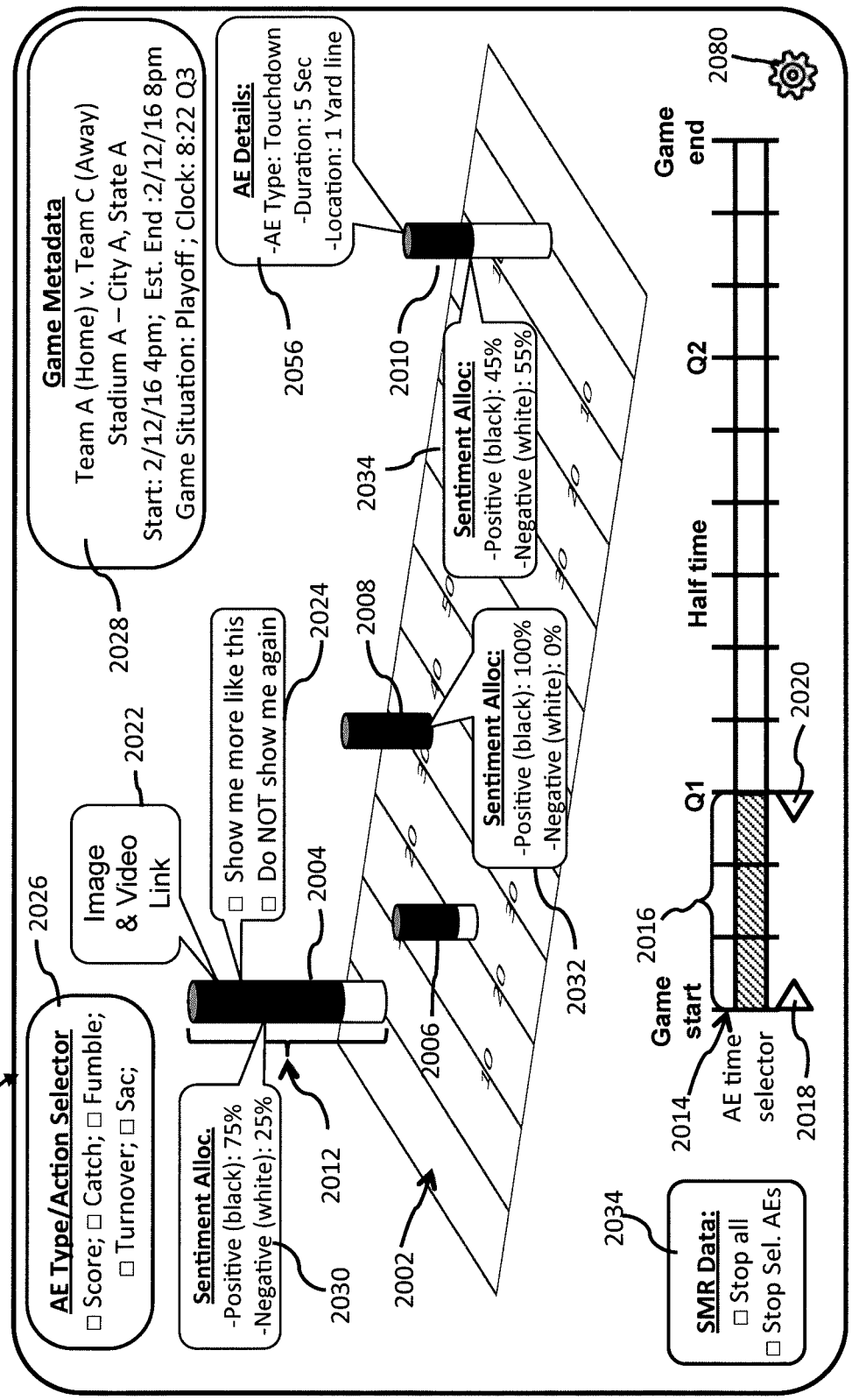
FIG. 20 is a screen illustration of a graphic user interface for a football application of the anomalous event software application (AE App), in accordance with embodiments of the present disclosure.

Referring to FIG. 20, an AE graphic user interface (GUI) 2000, or AE visualization, for the AE App 36 (FIGS. 1,2) software includes a perspective view of a game-field graphic 2002, showing the field of play (or court, track, or other competition venue) for the sporting event being used, having Anomalous Event (AE) pylons 2004-2010 (e.g., corresponding to AE1-AE4 in FIG. 4), positioned at various locations on game-field graphic 2002, showing various locations representing where the AE occurred on the field. For example, the AE pylon 2004 (corresponding to AE1 in FIG. 4) may indicate a defensive stop of the offense occurred on the 1 yard line of the defensive team (1 yd line—D). The height 2012 of the pylon 2004 may indicate the volume of SMRs (Social Media Responses) that were linked to (or aligned with) this AE, as shown in column 424 of the AE Listing table 400 of FIG. 4. Also, the shading of the pylon 2004 may represent the social media sentiment of the SMRs corresponding to this AE, where a dark shade may be for positive sentiment and a white shade may be for negative sentiment, and the SMR sentiment data is available from the SME Listing table 1100 of FIG. 11. A similar AE GUI visualization format may apply to the other AE pylons 2006-2010. The colors and shapes of the pylons 2004-2010 may be determined by the settings, as discussed hereinafter. The term "pylon," "pylon graphic," or "AE graphic," as used herein, means any graphic, graphical representation, or image, having any shape, size, orientation, dimensions, or color, that is indicative of an AE.

At the bottom of the GUI is an AE Time Selector 2014 which allows the user to select a time window 2016 during the game to view the AE's, having a begin slider arrow 2018 and an end slider arrow 2020 to set the time window 2016. In this case, it is shown as being set to view AE's that occur during the first quarter Q1 of the game. Note the time window 2016 setting shown in this example is different from what would be set to show AE1-AE4 in FIG. 4, as the timing is different.

To the left of the AE Time Selector 2014 is an SMR data collection sample window control graphic 2034 (i.e., the SMR sample window or SMR detection window). As discussed herein, the logics 1200, 1300 (FIGS. 12,13) may continue to identify SMRs after an AE has occurred, for a predetermined (or preset) amount of time, e.g., minutes, hours, days, as set by the user in the AE App settings, or as a system default, or learned over time. Accordingly, the data associated with SMR (sentiment allocation, total SMR volume, social media source allocation, and the like) may continue to change over time until the SMR sample window closes (or times-out). As a result, the AE pylons 2004-2010 (FIG. 20), 2066-2070 (FIG. 21), may change in real time while the SMR sample window is open. The SMR Data Collection screen section 2034 has a checkbox for the user to stop the SMR sampling for all AE for this game, or for just selected AEs, at any time desired by the user, by checking the corresponding box in the section 2034. Similarly, the sample window may be turned on or opened again by unchecking the appropriate box in the section 2034. In the case where the SMR sample window is closed and then opened, the logic 1100 collects all SMRs during the closed period to make the SMR results up to date. This enables the user to continue to track sentiment for one or more AEs during or even after a game has ended, if desired.

The AE location information for where the AE occurred on the actual playing field, may be obtained from the AE Listing table 400 (FIG. 4), Column 420, as discussed herein with AE Location Logic 308 of FIG. 3. The position of the AE pylons 2004-2010 on the field graphic 2002 may be determined by any technique that correlates the AE location on the actual field to the position on the graphic 2002. For example, there may be a grid (not shown) having coordinates overlaid on the graphic 2002, which is correlated and appropriately scaled to the AE location on the actual playing field. The grid may have a resolution that provides the viewer with sufficient accuracy to identify the actual location of the AE. The AE location on the actual playing field may be determined by coordinates on the field, e.g., using a latitude/longitude location or using a predetermined locating grid on the actual field or by camera positions or by other techniques, depending on the ball or player tracking technology used by the location tracking sources 14 (FIGS. 1,2). In some embodiments, the location of the AE pylons 2004-2010 on the graphic 2002 may be more coarse (i.e., less precise), such as "15 yard line of Offense, second hash line." Any other technique may be used to identify the exact or general location of the AEs on the field graphic 2002, including manual placement by an operator visually estimating the AE location and interacting with a computer system (not shown) to input the estimated AE location (e.g., a mouse click entered via a graphical user interface), which may be accessed by the system 10 of the present disclosure as one of the location tracking sources 14.

Also, if the user taps (or otherwise interacts with) an AE pylon graphic, e.g., pylon 2004, a pop-up window 2022 may appear providing an option to view the AE video segment, full screen or in a window on the screen, and the pop-up may show an image from the video and have a clickable link to view the video segment. In some embodiments, another pop-up window 2024 may also appear and provide selectable options to indicate AE user feedback, such as if the AE App user likes this type of AE and would want to see more like it, or does not like it or would not like to see an AE like this again. Also, in some embodiments, a pop-up window 2030 may also appear (with the other windows 2022,2024) showing the sentiment allocation (positive, negative, neutral) for that particular AE, as shown for the AE pylon 2004, having 75% positive (black) and 25% negative (white). Sentiment allocation windows 2032,3034, are shown for the pylons 2008,2010, respectively, which would appear when selected, as described above, or otherwise as described herein or as set by user settings.

The GUI 2000 may also provide an AE Type selector 2026, e.g., scores, catches, fumbles, turnovers, or any other AE type, which allows the user to select or filter the AE types/actions that the user would like to see, and the AE App will only display AE's of the types selected. In addition, the GUI 2000 may also provide a section 2028 of the display showing game metadata, such as the teams playing, start/stop date/time, location of game, current game clock, current score, and the like. Also, if the user touches (for a touch-screen application) the pylon twice in rapid succession (or double clicks on it), a pop-up window 2056 may appear showing the AE Details for that particular AE, such as AE Type, Duration, Location, date/time, team/player. Other AE Details may be displayed in the AE Details window 2056, such as the data shown in the AE Listing table 400 (FIG. 4), or other AE information if desired.

Figure 21:
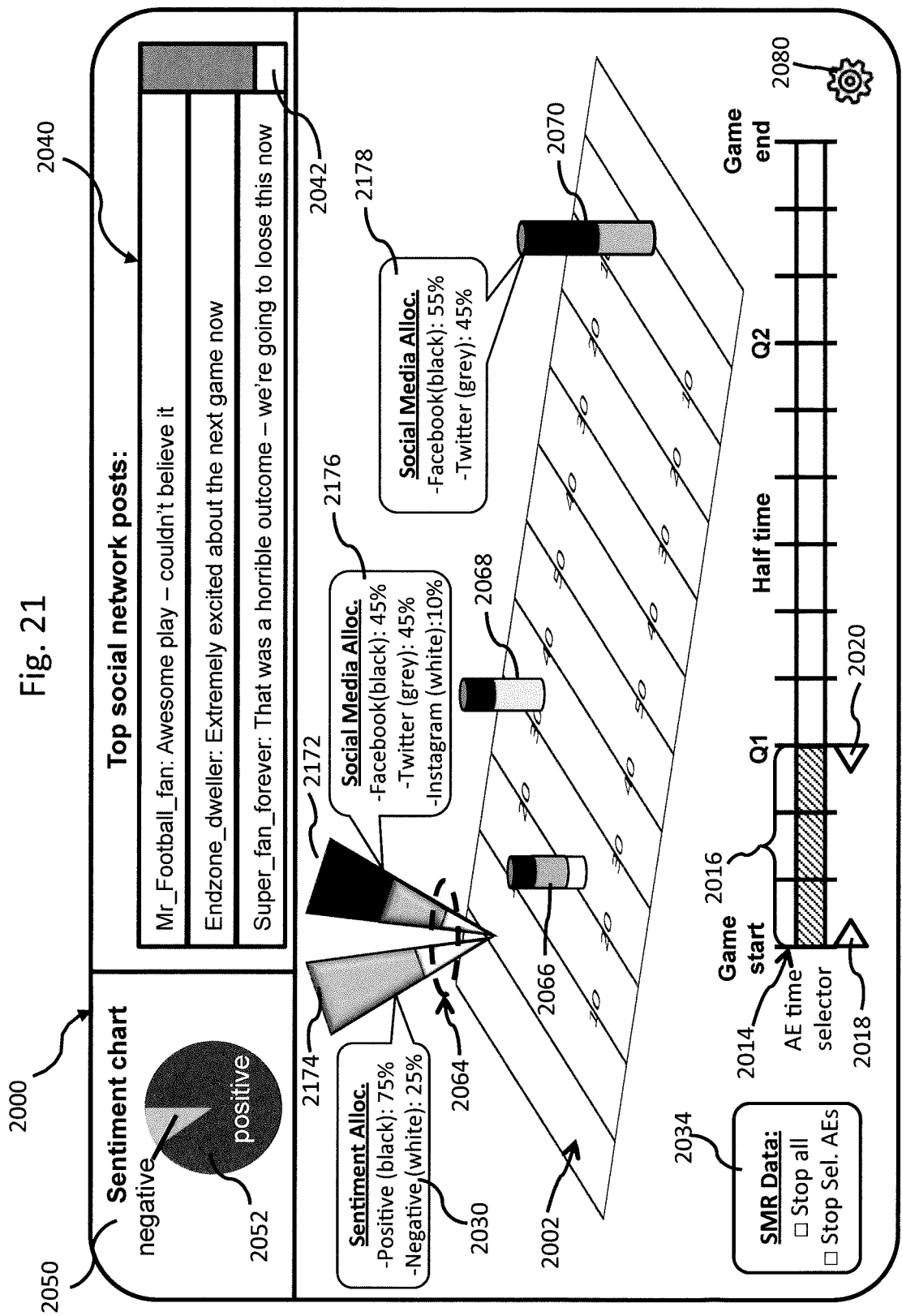
FIG. 21 is a screen illustration of a graphic user interface of FIG. 20, showing certain features of the anomalous event software application (AE App), in accordance with embodiments of the present disclosure.

Referring to FIG. 21, in some embodiments, the GUI 2000 may also provide a section 2040 of the display with the top social network posts, e.g., from Facebook, Twitter, Instagram, Google+, or the like. The section 2040 may have a scroll bar 2042 to scroll through the posts, if desired. Also, the GUI may also provide a section 2050 of the display with a separate chart graphic 2052 (e.g., pie graph, bar graph, or other graph), which may be indicative of the sentiment allocation for a given AE, or for all the AEs being viewed in the time window, depending on the settings. In other embodiments, the graphic 2052 may be indicative of the social media source (or platform or network) allocation for a given AE, or for all the AEs being viewed in the time window, depending on the settings, in addition to or instead of the sentiment allocation breakdown.

Also, in some embodiments, AE pylons 2064-6070 (corresponding to the AE pylons 2004-2010 of FIG. 20) may have shadings indicative of the portion (or allocation) of total social media sentiment attributed to a particular social network, for the corresponding AE pylons. For example, Facebook may be black, Twitter may be grey, and Instagram may be white, for the pylons 2064-6070. Also, the user may choose to show both visualizations (sentiment allocation and social media source allocation), if desired, such as that shown with the AE pylon 2064. In that case, there may be two pylons 2172,2174 (shown as cone-shaped or triangular in this example), for social media allocation and for sentiment allocation, respectively, and the AE pylons 2172,2174 may be oriented at an angle from the vertical so that both pylons 2172,2174 can be seen by the viewer without overlapping. In that case, the pop-up window 2030 may appear for pylon 2174 showing the sentiment allocation (positive, negative, neutral), discussed above, and a Social Media allocation window 2176 may appear for the pylon 2172 showing social media allocation of the responses, which in this example indicates 45% allocation to Facebook (black) users, 45% allocation to Twitter (grey) users, and 10% allocation to Instagram (white) users, responded to this AE. Any other shape pylons 2172,2174 may be used if desired, as set by the user settings, discussed hereinafter. In some embodiments, there may be a single pylon (such as pylons 2066-2070) showing a single visualization and the user can toggle between the two visualizations by changing the user settings or by clicking on or tapping on the pylon with a finger (for a touch screen application) and choosing the type of visualization desired. A Social Media allocation window 2178 is also shown for the pylon 2070, which would appear when selected, as described above, or otherwise as described herein or as set by user settings. In that case, the allocation for Facebook (black) is 55% and Twitter (grey) is 45%, and there was a 0% allocation for Instagram (white) or other social media sources, meaning that zero Instragram users (and other social media users) responded to this AE.

Figure 22:
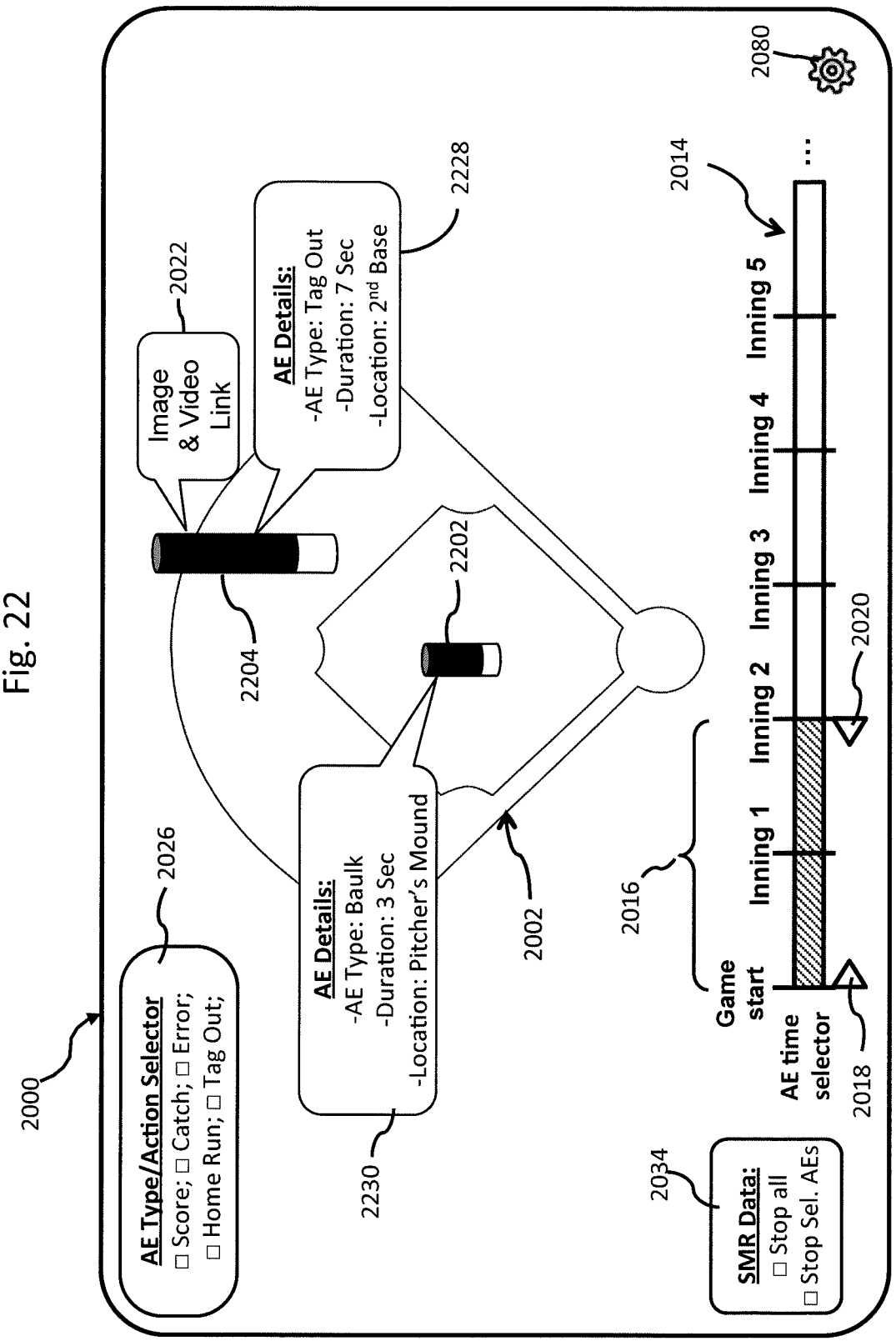
FIG. 22 is a screen illustration of a graphic user interface for a baseball application of the anomalous event software application (AE App), in accordance with embodiments of the present disclosure.

Referring to FIG. 22, a GUI showing AE's for a baseball game is shown. In that case, the play field graphic 2002 is that of a baseball field outline, and the pylons 2202, 2204 identify two AE's that happened during the time period selected by the AE time selector 2014 (during the first two innings of the game). In that case, the AE Time Selector 2014 is shown for Innings having the slider bars 2018, 2020, for setting the beginning and end of the time window to view AE's for that game. Also, the AE video segment window 2022 pop-up would provide a video viewing options for the baseball game similar to that discussed above for the football example in FIG. 20. Also, the AE Type Selector (or filter) 2026 may be adjusted for the type of game, such as having baseball specific events/actions, such as errors, home runs, tag outs, and the like as some of the options. Also, in that case, the AE details, as shown in pop-up windows 2228, 2230, would be that indicative of the AE's in the baseball game as shown. In particular, for the AE graphic 2202, the AE Details pop-up window 2230 shows it was a baulk by the pitcher, having a duration of 3 seconds, located at the pitchers mound (as also indicated visually by the location of the AE pylon graphic 2202). Also, for the AE graphic 2204, the AE Details pop-up window 2228 shows it was a tag out, having a duration of 7 seconds, located at second base (as also indicated visually by the location of the AE pylon graphic 2204). For the AE associated with the AE pylon graphic 2204, the GUI also shows an AE video segment pop-up window 2022, which may show an image from the video and a clickable link to launch the AE video segment (or clip), similar to that discussed herein with the football application (FIGS. 20-21). Also, Similar other features of the AE GUI 2000 to that described in FIGS. 20-21 would also apply for the baseball example shown in FIG. 22.

Figure 26:
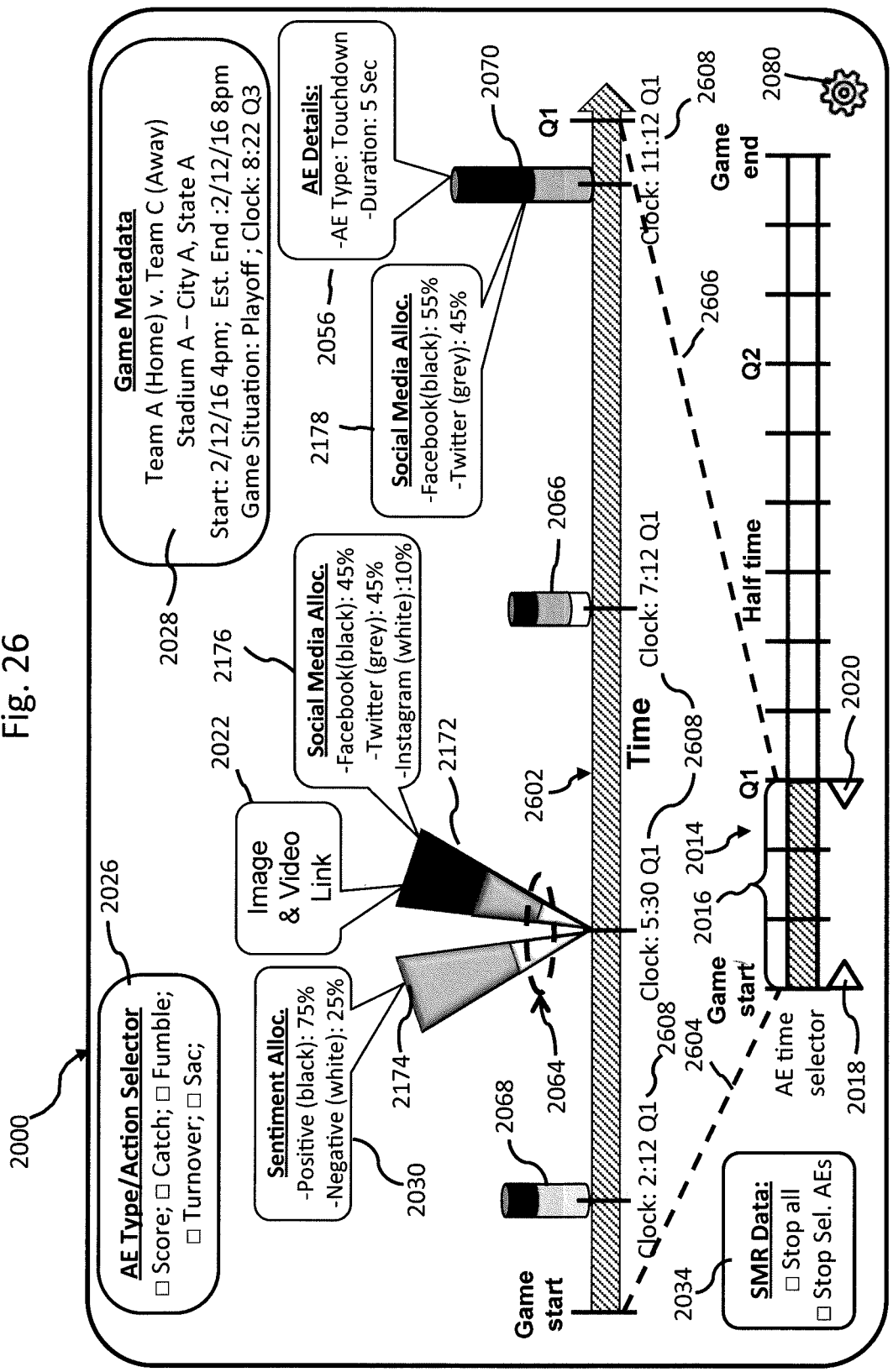
FIG. 26 is a screen illustration of a graphic user interface for another embodiment of the anomalous event software application (AE App) showing an AE timeline, in accordance with embodiments of the present disclosure.

Referring to FIG. 26, in some embodiments, the GUI 2000 may also provide a separate detailed timeline graphic 2602, which may show the AEs (e.g., AE pylon graphics 2064, 2066, 2068, 2070 from FIG. 21) chronologically in the time order in which they happened during the game along the timeline 2602 (e.g., from left-to-right pylons 2068, 2064, 2066, 2070). The detailed timeline graphic 2602 may be a magnification of the AE time selector window 2016. In particular, the left edge of the timeline 2602 may correspond to the left side 2018 of the AE time selector 2014, as shown by the dashed line 2606, and the right edge of the timeline 2062 may correspond to the right side 202 of the AE time selector 2014, as shown by the dashed line 2606. Also the game clock time 2608 may be displayed under each AE pylon graphic indicating when each AE occurred during the AE time selector window 2016. In some embodiments, the timeline may be shown without displaying the AE time selector 2014. All the same features discussed herein for the display options, pop-up displays, and the like, may function the same as described with FIGS. 20-22, if desired, e.g., game metadata, AE type selector, top social posts, sentiment charts, sentiment allocation, AE details, SMR data, AE time selector, AE video segment playing, AE user feedback, user settings, and the like. The detailed AE timeline 2602 may be displayed on separate sections of the same screen with the field graphic 2002. If shown on the same screen, to reduce redundancy and save display space, the detailed timeline may have an option to show a simple AE # indicator (e.g., arrows with labels, such as AE1, AE2, AE3, etc. along the timeline 2602) while the field graphic 2002 may show the full pylon graphic with the sentiment allocation, social media allocation and the like. In some embodiments, the user may toggle between both displays (e.g., detailed timeline AE pylons and field graphic with AE pylons), by swiping across the screen, or clicking on a black or background area, or using other techniques, if desired. The AE timeline 2602 may also be used instead of the playing field overlay 2002, e.g., if AE location tracking is not available. In that case, the AE Location Logic 308 would not be performed. Also, depending on the game/sport/event, the timeline 2602 may show game/event clock time, quarters, innings, periods, or the like, that would be appropriate for the given game/event (similar to the AE time selector 2014).

Referring to FIGS. 20-22, and 26, in the lower right corner of the display screen 2000 is a user settings menu icon 2080 ("gear" icon), which, when selected, allows the user to select various attributes and features associated with the AE App software 36, to perform the functions described herein, such as various display options, defaults, and the like, as well as to provide information about the user (user attributes) to assist in identifying AEs, for setting AE alerts, and for other purposes as described hereinafter.

In particular, referring to FIG. 23, when the Settings option 2080 is selected, a new GUI pop-up menu 2300 may appear on the display 38 (FIGS. 1,2), having a series of options or user settings to select. More specifically, the user settings are shown in three sections, a display format section 2302, a user attributes section 2304, and an alert setting section 2306. In the display format section 2302, a checkbox 2308 is provided to indicate that the shading of the AE pylon in the AE App GUI is indicative SMR Sentiment results allocation. When the box 2308 is checked, a series of options 2310 may appear to select the desired shape of the pylon, e.g., cylinder, square cylinder, and cone. In addition, a series of options 2312 also appear for AE pylon color for each sentiment option, e.g., positive, negative, neutral. For each sentiment option there is a drop-down menu with a list of colors to select from. For example, FIG. 23 shows Positive as BLACK, Negative as WHITE, and Neutral as GREY. Other color options may be used if desired.

A checkbox 2320 is also provided to indicate that the shading of the AE pylon in the AE App GUI is indicative SMR Social Media Source allocation. When the box 2320 is checked, a series of options 2324 may appear to select the desired shape of the pylon, e.g., cylinder, square cylinder, and cone. Other shapes may be used for the pylons if desired. In addition, a series of options 2326 also appear for AE pylon color for each social media source, e.g., Facebook, Twitter, Instagram, Google+, and the like. For each social media source option, there is a drop-down menu with a list of colors to select from. For example, FIG. 23 shows Facebook as BLACK, Twitter as GREY, Instagram as WHITE, and Google-plus as BLUE.

If both the boxes 2308 and 2320 are checked, the GUI may show two pylons at each AE location (see FIG. 21, pylons 2172,2174), tilted slightly but having the bottom being at the same location on the field graphic.

A checkbox 2330 is also provided to turn on (or off) the SMR posts screen section 2040 (FIG. 21), and a checkbox 2332 is provided to turn on (or off) the pylon height 2012 (FIG. 20) being proportional to the amount (or volume) of the social media response (SMR) to the AE associated with that pylon. Checkboxes 2336 (left to right) are also provided to turn on (or off), respectively, the pop-ups windows for the AE video segment 2022 (FIG. 20) and the AE details 2056 (FIG. 20) (when the user taps on the pylon), and the screen section 2028 (FIG. 20) having the Game Metadata on the GUI.

In addition, the user may set the SMR detection or sample window, which sets how long (minutes, hours, days) the Social Media Filter Logic 1000 (FIG. 10) and process 1200 (FIG. 12) looks for an SMR associated with a given AE after the AE is over, shown by selection fields 2238 (min., hrs., days). Also, boxes 2340,2344 are provided to select having a separate Sentiment graphic and Social Media graphic, respectively, on the GUI display 2000 (FIGS. 20-22). If one or both boxes 2340, 2344 are selected, the respective graphic(s) will be displayed on the GUI, such as that shown in the screen section 2050 in FIG. 21. Also, if selected, a series of options 2342, 2346, respectively, are provided to select the type of chart, e.g., pie chart, bar chart/graph, and whether the chart is indicative of all the AE's ("All AEs") for the game/event (or in the AE Time Selection window), or for just one or more specified AEs ("Specific AEs") selected by the user to examine the detailed statistics. Also, boxes 2350, 2352, 2354 are provided to allow the user to turn on (or off) the AE Time Selector 2014, the AE Type Selector 2026, and the AE Detailed Timeline 2602 (FIG. 26), respectively. Other display format settings may be provided if desired, or as needed or discussed herein to perform the functions of the present disclosure.

Also, a box 2360 is provided to select an AE filter be used to filter out or to select certain desired types of AE results. If the box 2360 is selected, a series of options 2362 are provided, such as Same Age Group (to provide AEs only from the same age group as the user), Same Fan Base (to provide AEs only from users with the same favorite teams), Same Location (to provide AEs only from users in the same location as the user, e.g., MN).

The User Attributes section 2304 allows the user to provide information about himself/herself which is placed in the User Attributes Listing table 1900 (FIG. 19) for use in determining user specific AE's, AE alerts, and other purposes, as described herein. In particular, a checkbox and corresponding drop-down menu 2370 is provided indicating which sports the user is interested in. A multi-pick dropdown menu is provided to allow the user to select all the sports desired. For each sport selected from the dropdown menu 2370, separate checkbox and corresponding dropdown menus 2372 are provided to allow the user to select the AE Types the user is interested in for each sport, e.g., Football AE types may include Scoring, Catches, Fumbles, and the like, and Baseball AE Types may include Scoring, Catches, Errors, and the like, as shown in FIG. 23. If the checkbox 2370 is not checked, no sport categories have been selected by the user. If the checkboxes associated with the dropdown menus 2372 are not checked, no AE Types have been selected for a particular sport.

Next, a series of checkboxes and corresponding drop-down menus 2374 allow the user to select Teams, Players, General AE Types, and Game Situations that the user is interested in. For example, the user may select two teams, e.g., Team A and Team B, and two players, e.g., Player A and Player B, and General AE Type (applicable to all selected sports), e.g., Fights, Catches, Drops, Fumbles, and Game Situations (fixed or variable), e.g., Playoff, Close Game, Last 2 min. Also, there may be checkboxes 2380 that allow the user to provide more information about himself/herself, such as Age Group, Location/Home Address (City and State), and Hobbies (e.g., Fishing). Other user attributes may be provided if desired, or as needed or discussed herein to perform the functions of the present disclosure.

The Alert Settings section 2306 allows the user to set-up alerts for certain types of AEs. In particular, a checkbox 2390 is provided to turn on (or off) AE alerts. Also, a checkbox 2392 is provided to turn on (or off) autonomous alerts that are automatically generated by the logic of the present disclosure based on information about the user, as discussed herein. A checkbox 2394 is provided to allow the user to select when an AE occurs that the user may be interested in, based on certain criteria. When the box 2394 is selected, a series of options 2396 are provided that allow the user to select when an AE occurs involving certain ones of the users preferences, e.g., Sports, Teams, Players, AE Types, and Game situations. Other preferences may be used if desired.

Similarly, a checkbox 2398 is provided to allow the user to select when an AE occurs that the user may be interested in, based on certain exclusionary criteria, i.e., do not send me alerts when certain criteria are met. When the box 2398 is selected, a series of options 2396 are provided that allow the user to select which items (or other information), when they occur, will NOT trigger an AE alert to the user, e.g., Sports, Teams, Players, AE Types, and Game situations (i.e., the negative preferences, or exclusionary criteria). Other negative preferences or exclusionary criteria may be used if desired. Other alert settings may be used if desired, or as needed or discussed herein to perform the functions of the present disclosure.

Referring to FIG. 24, a flow diagram 2400 illustrates one embodiment of a process or logic for providing, among other things, a graphic user interface (GUI) or visualization of the AE's and SMR's to the user 40 on the display 38 of the user device 34 (FIGS. 1,2), for receiving and displaying AE alerts, and for allowing the user to set preferences, settings and the like, which may be implemented by the App Software Logic 36 (FIGS. 1,2). The process 2400 runs when the AE App 36 is launched and begins at a block 2402, which retrieves data from the AE Server 24, the SMR Server 26, and the User Attribute Server 28, as well as input data from the user via the user device user input (e.g., touch screen display, mouse or other user input interface). Next, a block 2404 uses the data retrieved in the block 2402 (including the user settings) to calculate the needed parameters to display the AE visualization (or GUI) on the display 38 of the user device 34 (FIGS. 1,2). Next, a block 2406 displays the graphics for the AE GUI or AE visualization 2000 (see FIGS. 20-22) on the display 38 of the user device 34. In particular, the Play Field (or court), AE pylons, AE Time Selector, AE Details, Sentiment Allocation Chart, Social Media Allocation Chart, Social Media/Network Posts, Game Metadata, SMR Data Collection (SMR Sample Window), AE Type Selector, and any other display components, images, or icons discussed herein for the AE GUI.

Next, a block 2408 determines whether an AE Alert has been received. If YES, a block 2410 generates a pop-up message on the user device 34 display indicating an AE has occurred and the user can then go to the AE GUI screen 2000 (FIGS. 20-22) to view the AE. Next, or if the result of block 2408 is NO, a block 2412 checks if the "Settings" icon 2080 has been selected. If YES, a block 2414 receives input settings data from the user, e.g., for display format, user attributes, and alert settings (as discussed with FIG. 23). Next, a block 2416 saves (or updates) the settings info, based on the selections made by the user, and the process exits.

Some of the AE App settings data (FIG. 23) may be stored in the User Attributes Listing table 1900 (FIG. 19) on the User Attributes Server 28 (FIGS. 1,2), such as the User Attributes and the Alert Settings, and some settings data may be stored locally on the User Device 34, such as the Display Format settings. Any other data storage arrangement that performs the functions of the present disclosure may be used if desired.

Referring to FIG. 25, the present disclosure may be implemented in a network environment 58. In particular, various components of an embodiment of the system of the present disclosure include a plurality of computer-based user devices 34 (e.g., Device 1 to Device N), which may interact with respective users (User 1 to User N). A given user may be associated with one or more of the devices 34. In some embodiments, the AE App 36 may reside on a remote server and communicate with the user device(s) 34 via the network. In particular, one or more of the user devices 34, may be connected to or communicate with each other through a communications network 60, such as a local area network (LAN), wide area network (WAN), virtual private network (VPN), peer-to-peer network, or the internet, wired or wireless, as indicated by lines 62, by sending and receiving digital data over the communications network 60. If the user devices 34 are connected via a local or private or secured network, the devices 34 may have a separate network connection to the internet for use by web browsers running on the devices 34. The devices 34 may also each have a web browser to connect to or communicate with the internet to obtain desired content in a standard client-server based configuration to obtain the AE App 36 or other needed files to execute the logic of the present disclosure. The devices may also have local digital storage located in the device itself (or connected directly thereto, such as an external USB connected hard drive, thumb drive or the like) for storing data, images, audio/video, documents, and the like, which may be accessed by the AE App 36 running on the user devices 34.

Also, the computer-based user devices 34 may also communicate with separate computer servers via the network 60 for the AE Server 24, Social Media Response (SMR) Server 26, and the User Attribute Server 28. The servers 24,26,28 may be any type of computer server with the necessary software or hardware (including storage capability) for performing the functions described herein. Also, the servers 24,26,28 (or the functions performed thereby) may be located, individually or collectively, in a separate server on the network 60, or may be located, in whole or in part, within one (or more) of the User Devices 34 on the network 60. In addition, the Social Media Sources 20 and the Influencer Sources 18 (shown collectively as numeral 64), and the Language Sources 8 and the Topic & Sentiment Sources 22 (shown collectively as numeral 66), and the Location Tracking Sources 14, as well as the SMR Server 26, the AE Server 24 and the User Attributes Server 28, may each communicate via the network 60 with the AE & SMR Processing Logic 12, and with each other or any other network-enabled devices or logics as needed, to provide the functions described herein. Similarly, the User Devices 34 may each also communicate via the network 60 with the Servers 24,26,28 and the AE & SMR Processing Logic 12, and any other network-enabled devices or logics necessary to perform the functions described herein.

Portions of the present disclosure shown herein as being implemented outside the user device 34, may be implemented within the user device 34 by adding software or logic to the user devices, such as adding logic to the AE App software 36 or installing a new/additional application software, firmware or hardware to perform some of the functions described herein, such as some or all of the AE & SMR Processing Logic 12, or other functions, logics, or processes described herein. Similarly, some or all of the AE & SMR Processing Logic 12 of the present disclosure may be implemented by software in one or more of the Anomalous Events (AE) Server 24, the User Attributes server 28, or the Social Media Response (SMR) Server 26, to perform the functions described herein, such as some or all of the AE & SMR Processing Logic 12, or some or all of the functions performed by the AE App software 36 in the user device 34.

The system, computers, servers, devices and the like described herein have the necessary electronics, computer processing power, interfaces, memory, hardware, software, firmware, logic/state machines, databases, microprocessors, communication links, displays or other visual or audio user interfaces, printing devices, and any other input/output interfaces, to provide the functions or achieve the results described herein. Except as otherwise explicitly or implicitly indicated herein, process or method steps described herein may be implemented within software modules (or computer programs) executed on one or more general purpose computers. Specially designed hardware may alternatively be used to perform certain operations. Accordingly, any of the methods described herein may be performed by hardware, software, or any combination of these approaches. In addition, a computer-readable storage medium may store thereon instructions that when executed by a machine (such as a computer) result in performance according to any of the embodiments described herein.

In addition, computers or computer-based devices described herein may include any number of computing devices capable of performing the functions described herein, including but not limited to: tablets, laptop computers, desktop computers, smartphones, smart TVs, set-top boxes, e-readers/players, and the like.

Although the disclosure has been described herein using exemplary techniques, algorithms, or processes for implementing the present disclosure, it should be understood by those skilled in the art that other techniques, algorithms and processes or other combinations and sequences of the techniques, algorithms and processes described herein may be used or performed that achieve the same function(s) and result(s) described herein and which are included within the scope of the present disclosure.

Any process descriptions, steps, or blocks in process or logic flow diagrams provided herein indicate one potential implementation, do not imply a fixed order, and alternate implementations are included within the scope of the preferred embodiments of the systems and methods described herein in which functions or steps may be deleted or performed out of order from that shown or discussed, including substantially concurrently or in reverse order, depending on the functionality involved, as would be understood by those reasonably skilled in the art.

It should be understood that, unless otherwise explicitly or implicitly indicated herein, any of the features, characteristics, alternatives or modifications described regarding a particular embodiment herein may also be applied, used, or incorporated with any other embodiment described herein. Also, the drawings herein are not drawn to scale, unless indicated otherwise.

Conditional language, such as, among others, "can," "could," "might," or "may," unless specifically stated otherwise, or otherwise understood within the context as used, is generally intended to convey that certain embodiments could include, but do not require, certain features, elements, or steps. Thus, such conditional language is not generally intended to imply that features, elements, or steps are in any way required for one or more embodiments or that one or more embodiments necessarily include logic for deciding, with or without user input or prompting, whether these features, elements, or steps are included or are to be performed in any particular embodiment.

Although the invention has been described and illustrated with respect to exemplary embodiments thereof, the foregoing and various other additions and omissions may be made therein and thereto without departing from the spirit and scope of the present disclosure.

What is claimed is:

1. A method for identifying at least one anomalous event (AE) within a sporting event and identifying and displaying the location of the AE and a social media response to the AE, comprising:
    receiving AV media data indicative of the sporting event;
    identifying the AE within the AV media data;
    determining the location of the AE on the actual field of play, an AE time of occurrence, and identifying one or more AE features of the AE;
    receiving social media data;
    identifying at least one social media response (SMR) related to the AE within the social media data, comprising:
        analyzing the social media data within a sample window timeframe of the AE time of occurrence;
        identifying one or more SMR features of the social media data within the sample window timeframe; and
        identifying the SMR having the SMR features that match a predetermined number of the AE features, as the at least one SMR;
    determining at least one social media parameter associated with the at least one SMR, wherein the at least one social media parameter comprises at least one of: a total number of the SMRs related to the AE, a sentiment allocation for a plurality sentiments associated with the SMR related to the AE, a sentiment allocation associated with the SMR, social media sources posting the SMRs related to the AE, and an allocation of a plurality of social media sources providing the SMRs related to the AE;
    providing a graphic user interface (GUI) showing a virtual version of a field of play and at least one AE graphic on the virtual field of play, the AE graphic comprising a selectable graphical image indicative of the AE and positioned at a location indicative of real time spatial coordinates on the virtual field of play corresponding to the location of the AE on the actual field of play and at least one visual aspect of the AE graphic being indicative of the at least one social media parameter associated with the SMR related to the AE, wherein the at least one visual aspect of the AE graphic comprises at least one of: (i) a size of the AE graphic corresponding to the total number of the SMRs related to the AE and (ii) a shading of the AE graphic corresponding to the sentiment allocation associated with the SMR related to the AE or the allocation of the plurality of social media sources providing the SMRs related to the AE; and
    wherein the AE graphic is updated according to the received social media data during the sample window timeframe.

2. The method of claim 1, wherein the determining the at least one social media parameter comprises at least one of: determining an amount of the SMRs corresponding to the AE in the social media data and determining a sentiment of the at least one SMR corresponding to the AE in the social media data.

3. The method of claim 1, further comprising extracting from the AV media data an AV media segment corresponding to the AE, and displaying on the GUI an AV graphic, that, when selected, causes the AV media segment to play on the GUI.

4. The method of claim 1, wherein the AE graphic has user selectable attributes, comprising at least one of: shape and color.

5. The method of claim 1, wherein the GUI is displayed on a mobile device.

6. The method of claim 1, wherein the SMR features comprises a topic that relates to the sporting event.

7. The method of claim 1, wherein the SMR features comprises attributes of an SMR user.

8. The method of claim 1, wherein the SMRs occur during the sporting event.

9. The method of claim 1, wherein the determining the location of the AE on the actual field of play, comprises at least one of: receiving location tracking data from an AE sports object involved with the AE, and analyzing the AV media data to determine the location of an AE sports object involved with the AE.

10. The method of claim 9, wherein the analyzing the AV media data comprises at least one of: performing image processing on images or video in the AV media data, and performing audio processing of the AV media data.

11. The method of claim 1, wherein the GUI comprises displaying graphics comprising at least one of: Play Field graphic, AE graphic, AE Time Selector, AE Timeline, AE Details, Sentiment Allocation Chart, Social Media Source Allocation Chart, Social Media/Network Posts, Game Metadata, SMR Data Collection, and AE Type/Action Selector.

12. The method of claim 1, wherein the identifying the AE within the AV media data, comprises analyzing at least one of: crowd noise, commentator voice intonation, learned event attributes, commentator language/words, and influencer sources language/words.

13. The method of claim 1, wherein the identifying the AE within the AV media data, comprises using an AE identification model having model parameters.

14. The method of claim 13, further comprising adjusting the parameters in the AE identification model based on social media performance.

15. The method of claim 14, wherein the social media performance comprises at least one of: number of SMRs, number of shares of the SMRs, number of favorites of the SMRs, number of replies of the SMRs, number of re-tweets of the SMRs, and social media comments on the relevance of the AE.

16. The method of claim 1, wherein the AE features comprises an AE type/action.

17. The method of claim 1, further comprising sending an AE alert message when an AE is detected and predetermined AE alert criteria are satisfied.

18. The method of claim 17, wherein the predetermined AE alert criteria comprise at least one of: AE matching SMR user attributes, AE matching user AE likes, AE matching user Alert settings.

19. The method of claim 1, further comprising receiving a setting command from a user and displaying a settings menu configured to receive inputs from a user.

20. The method of claim 19, wherein the settings menu comprises at least one of: display format, user attributes and alert settings.

21. The method of claim 1, wherein the social media data is obtained from social media sources, comprising at least one of: Facebook, Twitter, Instagram, Google+, and internet blogs.

22. A method for identifying at least one anomalous event (AE) within a sporting event and identifying and displaying at least one of the time and location of the AE and a social media response (SMR) related to the AE, comprising:
  receiving AV media data indicative of the sporting event;
  identifying the AE within the AV media data, the location of the AE on the actual field of play, an AE time of occurrence, and one or more AE features of the AE;
  receiving social media data;
  identifying at least one social media response (SMR) related to the AE within the social media data, comprising:
    analyzing the social media data within a sample window timeframe of the AE time of occurrence;
    identifying one or more SMR features of the social media data within the sample window timeframe; and
    identifying the SMR having the SMR features that match a predetermined number of the AE features, as the at least one SMR;
  determining at least one social media parameter associated with the at least one SMR, wherein the at least one social media parameter comprises at least one of: a total number of the SMRs related to the AE, a sentiment allocation for a plurality of sentiments associated with the SMR related to the AE, a sentiment allocation associated with the SMR, social media sources posting the SMRs related to the AE, and an allocation of a plurality of social media sources providing the SMRs related to the AE; and
  providing a graphic user interface (GUI) showing:
    (i) a virtual version of the field of play and at least one AE graphic on the virtual field of play, the AE graphic comprising a selectable graphical image indicative of the AE and positioned at a location indicative of real-time spatial coordinates on the virtual field of play corresponding to the location of the AE on the actual field of play and at least one visual aspect of the AE graphic being indicative of the at least one social media parameter associated with the SMR related to the AE, wherein the at least one visual aspect of the AE graphic comprises at least one of: (i) a size of the AE graphic corresponding to the total number of the SMRs related to the AE and (ii) a shading of the AE graphic corresponding to the sentiment allocation associated with the SMR related to the AE or the allocation of the plurality of social media sources providing the SMRs related to the AE; and
    (ii) an AE timeline having the at least one AE graphic positioned along the AE timeline corresponding to the AE time of occurrence; and
  wherein the AE graphic is updated according to the received social media data during the sample window timeframe.

23. The method of claim 22 wherein the AE identification model comprises at least one of: a factor sum equation and a machine learning model.

24. The method of claim 22 wherein the machine learning model comprises a Support Vector Machine (SVM).

25. The method of claim 22, further comprising adjusting the model parameters in the AE identification model based on performance.

26. The method of claim 22, further comprising sending an alert message when an AE is detected and AE alert criteria are satisfied.

27. A method for identifying at least one anomalous event (AE) within a sporting event and identifying and displaying the time of the AE and a social media response (SMR) related to the AE, comprising:
  receiving AV media data indicative of the sporting event;
  identifying the AE within the AV media data, the location of the AE on the actual field of play, an AE time of occurrence, and one or more AE features of the AE;
  receiving social media data;
  identifying at least one SMR related to the AE within the social media data, comprising:
    analyzing the social media data within a sample window timeframe of the AE time of occurrence;
    identifying one or more SMR features of the social media data within the sample window timeframe; and
    identifying the SMR having the SMR features that match a predetermined number of the AE features, as the at least one SMR;

determining at least one social media parameter associated with the at least one SMR, wherein the at least one social media parameter comprises at least one of: a total number of the SMRs related to the AE, a sentiment allocation for a plurality of sentiments associated with the SMR related to the AE, a sentiment allocation associated with the SMR, social media sources posting the SMRs related to the AE, and an allocation of a plurality of social media sources providing the SMRs related to the AE;

providing a graphic user interface (GUI) showing a virtual version of a field of play and at least one AE graphic on the virtual field of play, the AE graphic comprising a selectable graphical image indicative of the AE and positioned at a location indicative of real-time spatial coordinates on the virtual field of play corresponding to the location of the AE on the actual field of play and at least one visual aspect of the AE graphic being indicative of the at least one social media parameter associated with the SMR related to the AE, wherein the at least one visual aspect of the AE graphic comprises at least one of: (i) a size of the AE graphic corresponding to the total number of the SMRs related to the AE and (ii) a shading of the AE graphic corresponding to the sentiment allocation associated with the SMR related to the AE or the allocation of the plurality of social media sources providing the SMRs related to the AE;

wherein the interface (GUI) also showing an AE timeline and the at least one AE graphic positioned along the AE timeline corresponding to the AE time of occurrence; and wherein the AE graphic is updated according to the received social media data during the sample window timeframe.

28. The method of claim 27, wherein the determining at least one social media parameter, comprises at least one of: determining an amount of the SMRs related to the AE in the social media data and determining a sentiment of the at least one SMR related to the AE in the social media data.

29. The method of claim 27, wherein the AE graphic has user selectable attributes, comprising at least one of: shape and color.

30. The method of claim 27, wherein the GUI is displayed on a mobile device.

31. The method of claim 27, wherein the SMR features comprises a topic that relates to the sporting event.

32. The method of claim 22, wherein the AE features comprises an AE type/action.

33. The method of claim 22 wherein the identifying the AE in the media data comprises:

analyzing the AV media data for at least one factor related to at least one of: crowd noise, commentator voice intonation, commentator language/words, AE attributes, and influencer sources language/words; and identifying the occurrence of the AE based on an AE identification model, the model having model parameters based on the at least one factor.

34. The method of claim 1 wherein the AE features comprises at least one of: sport, team, players, and action/type, and the SMR features comprises at least one of: topic and attributes.

35. The method of claim 27 wherein the AE features comprises at least one of: sport, team, players, and action/type, and the SMR features comprises at least one of: topic and attributes.

36. The method of claim 22 wherein the AE features comprises at least one of: sport, team, players, and action/type, and the SMR features comprises at least one of: topic and attributes.

* * * * *